US012672054B2

(12) United States Patent
Kuge et al.

(10) Patent No.: US 12,672,054 B2
(45) Date of Patent: Jun. 30, 2026

(54) USER EQUIPMENT (UE) AND COMMUNICATION CONTROL METHOD PERFORMED BY UE

(71) Applicant: SHARP KABUSHIKI KAISHA, Sakai City (JP)

(72) Inventors: Yoko Kuge, Sakai City (JP); Yudai Kawasaki, Sakai City (JP); Masaki Izumi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 250 days.

(21) Appl. No.: 18/284,722

(22) PCT Filed: Apr. 6, 2022

(86) PCT No.: PCT/JP2022/017137
§ 371 (c)(1),
(2) Date: Sep. 28, 2023

(87) PCT Pub. No.: WO2022/215697
PCT Pub. Date: Oct. 13, 2022

(65) Prior Publication Data
US 2024/0163784 A1 May 16, 2024

(30) Foreign Application Priority Data
Apr. 9, 2021 (JP) ................................. 2021-066217

(51) Int. Cl.
H04W 48/18 (2009.01)
H04W 40/24 (2009.01)
(Continued)

(52) U.S. Cl.
CPC ......... *H04W 48/18* (2013.01); *H04W 40/248* (2013.01); *H04W 60/04* (2013.01); *H04W 84/042* (2013.01)

(58) Field of Classification Search
CPC ... H04W 48/18; H04W 40/248; H04W 60/04; H04W 84/042; H04W 48/16; H04W 76/10
See application file for complete search history.

(56) References Cited

U.S. PATENT DOCUMENTS 12,289,674 B2 * 4/2025 Sugawara ............. H04W 76/22

OTHER PUBLICATIONS

3GPP TS 24.501 V17.2.0 (Mar. 2021) 3rd Generation Partnership Project; Technical Specification Group Core Network and Terminals; Non-Access-Stratum (NAS) protocol for 5G System (5GS); Stage 3; (Release 17).

(Continued)

*Primary Examiner* — Diane D Mizrahi
(74) *Attorney, Agent, or Firm* — ScienBiziP, P.C.

(57) ABSTRACT

A User Equipment (UE) includes a transmission and reception unit, a storage unit, and a controller, in which the transmission and reception unit is configured to receive Allowed Network Slice Selection Assistance Information (NSSAI) and one or more first mapped Single Network Slice Selection Assistance Information (S-NSSAI) for the Allowed NSSAI, and unless the storage unit stores an S-NSSAI associated with second mapped S-NSSAI in rejected NSSAI and the second mapped S-NSSAI is not included in the one or more first mapped S-NSSAI for the Allowed NSSAI, the controller removes an S-NSSAI included in the Allowed NSSAI from the rejected NSSAI stored in the storage unit.

5 Claims, 9 Drawing Sheets

(51) Int. Cl.
    *H04W 60/04*          (2009.01)
    *H04W 84/04*          (2009.01)

(56)               References Cited

OTHER PUBLICATIONS

3GPP TR 23.700-40 V17.0.0 (Mar. 2021) 3rd Generation Partnership Project; Technical Specification Group Services and System Aspects; Study on enhancement of network slicing; Phase 2 (Release 17).
Sharp, "UE behavior when the UE receives the Allowed NSSAI", C1-207645, 3GPP TSG-CT WG1 Meeting #127-e, Electronic meeting, Nov. 13-20, 2020.

* cited by examiner

USER EQUIPMENT (UE) AND COMMUNICATION CONTROL METHOD PERFORMED BY UE

TECHNICAL FIELD

The present invention relates to user equipment (UE). This application claims priority based on JP 2021-66217 filed on Apr. 9, 2021, the contents of which are incorporated herein by reference.

BACKGROUND ART

The 3rd Generation Partnership Project (3GPP), which undertakes activities for standardizing recent mobile communication systems, has studied System Architecture Evolution (SAE) which is a system architecture for Long Term Evolution (LTE).

In addition, the 3GPP has recently studied next-generation communication technologies and system architectures for a 5th generation (5G) mobile communication system which is a next generation mobile communication system, and in particular, has standardized a 5G System (5GS) as a system for realizing a 5G mobile communication system (see NPL 1 and NPL 2). In the 5GS, technical problems arising from connection of various terminals to a cellular network are extracted and solutions thereto have been standardized.

CITATION LIST

Non Patent Literature

NPL 1: 3GPP TS 24.501 V17.2.0 (2021 March); 3rd Generation Partnership Project; Technical Specification Group Core Network and Terminals; Non-Access-Stratum (NAS) protocol for 5G System (5GS); Stage 3; (Release 17)

NPL 2: 3GPP TR 23.700-40 V17.0.0 (2021 March); 3rd Generation Partnership Project; Technical Specification Group Services and System Aspects; Study on Enhancement of Network Slicing; Phase 2 (Release 17)

SUMMARY OF INVENTION

Technical Problem

For the 5G System (5GS), a 5G Core Network (5GCN) which is a new core network has been studied for the purpose of providing various services.

Furthermore, for the 5G, a network slice that corresponds to a logical network providing specific network functions and specific network characteristics has been defined for a specific service type or a specific group. For example, the network slice may be a logical network provided for terminals with a low latency function, or may be a logical network provided for sensor terminals used in the Internet of Things (IoT).

The 3GPP has studied Enhancement of Network Slicing (eNS) to study further functions associated with network slices. Furthermore, as a study about phase 2 of eNS, the 3GPP has studied addition of a function for managing the number of pieces of UE or the number of sessions for connection that is allowed for each slice.

Furthermore, the 3GPP has studied a control function using mapped S-NSSAI of rejected NSSAI.

However, there is no obvious implementation method for satisfying the above-described demands.

An aspect of the present invention has been made in light of the above circumstances, and provides a method of implementing a function for eNS in the 5GS.

Solution to Problem

An aspect of the present invention is a User Equipment (UE) including a transmission and reception unit, a storage unit, and a controller, in which the transmission and reception unit is configured to receive Allowed Network Slice Selection Assistance Information (NSSAI) and one or more first mapped Single Network Slice Selection Assistance Information (S-NSSAI) for the Allowed NSSAI, and unless the storage unit stores an S-NSSAI associated with second mapped S-NSSAI in rejected NSSAI and the second mapped S-NSSAI is not included in the one or more first mapped S-NSSAI for the Allowed NSSAI, the controller removes an S-NSSAI included in the Allowed NSSAI from the rejected NSSAI stored in the storage unit.

An aspect of the present invention is a User Equipment (UE) including a transmission and reception unit, a storage unit, and a controller, in which the transmission and reception unit is configured to receive Allowed Network Slice Selection Assistance Information (NSSAI) and one or more first mapped Single Network Slice Selection Assistance Information (S-NSSAI) for the Allowed NSSAI, and unless an S-NSSAI included in rejected NSSAI stored in the storage unit is associated with second mapped S-NSSAI in rejected NSSAI and the second mapped S-NSSAI is not included in the one or more first mapped S-NSSAI for the Allowed NSSAI, the controller removes an S-NSSAI included in the Allowed NSSAI from the rejected NSSAI stored in the storage unit.

An aspect of the present invention is a communication control method performed by a User Equipment (UE), the communication control method including receiving Allowed Network Slice Selection Assistance Information (NSSAI) and one or more first mapped Single Network Slice Selection Assistance Information (S-NSSAI) for the Allowed NSSAI; and unless an S-NSSAI included in rejected NSSAI stored in the UE is associated with second mapped S-NSSAI in rejected NSSAI and the second mapped S-NSSAI is not included in the one or more first mapped S-NSSAI for the Allowed NSSAI, removing an S-NSSAI included in the Allowed NSSAI from the rejected NSSAI stored in the UE.

Advantageous Effects of Invention

According to an aspect of the present invention, in the 5GS, eNS can be supported, which enables management of mapped S-NSSAI of rejected NSSAI at the time of roaming.

DESCRIPTION OF EMBODIMENTS

A preferred embodiment for carrying out the present invention will be described below with reference to the drawings. Note that an embodiment of a mobile communication system to which an aspect of the present invention is applied will be described as an example in the present embodiment.

1. Overview of System

Figure 1:
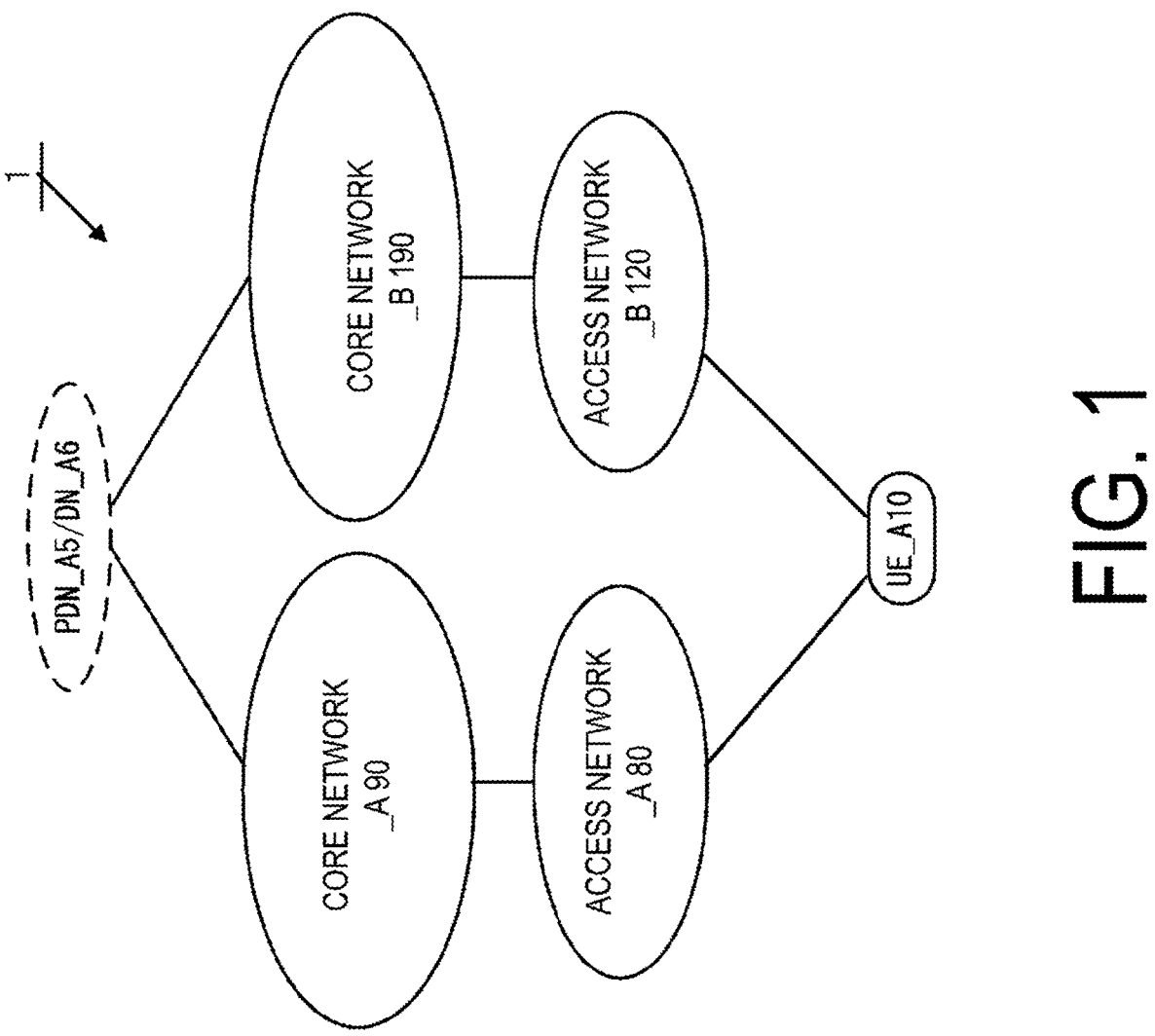
FIG. 1 is a diagram illustrating an overview of a mobile communication system (EPS/5GS).
Figure 2:
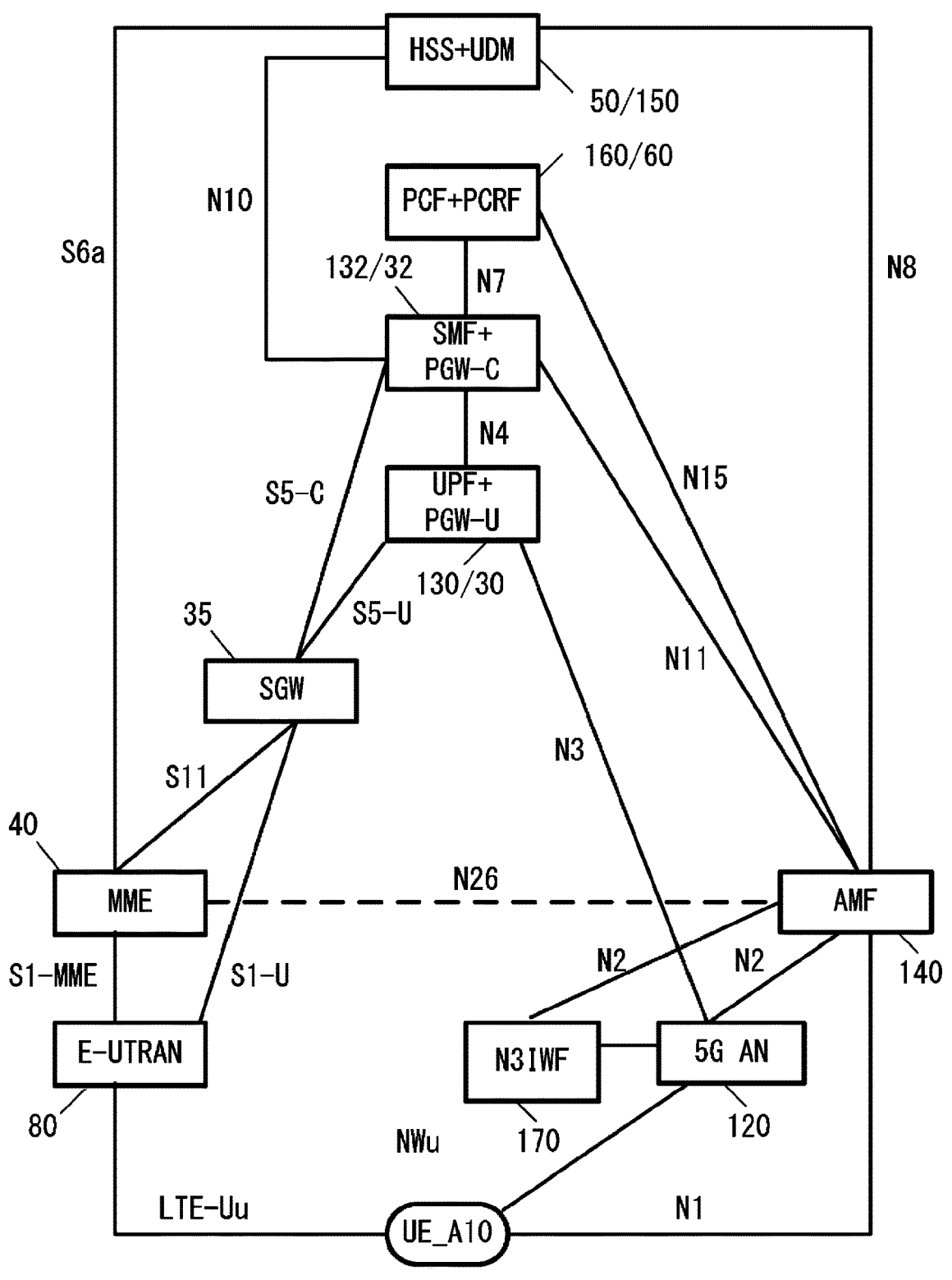
FIG. 2 is a diagram illustrating a detailed configuration of the mobile communication system (EPS/5GS).

First, FIG. 1 is a diagram illustrating an overview of a mobile communication system 1 used in each embodiment, and FIG. 2 is a diagram illustrating a detailed configuration of the mobile communication system 1.

FIG. 1 illustrates the mobile communication system 1 including UE_A 10, an access network_A 80, a core network_A 90, a Packet Data Network (PDN)_A 5, an access network_B 120, a core network_B 190, and a Data Network (DN)_A 6.

In the following description, the reference numerals of these apparatuses and functions may be omitted, as in UE, an access network_A, a core network_A, a PDN, an access network_B, a core network_B, a DN, and the like.

In addition, FIG. 2 illustrates apparatuses and functions such as the UE_A 10, an E-UTRAN 80, an MME 40, an SGW 35, a PGW-U 30, a PGW-C 32, a PCRF 60, an HSS 50, a 5G AN 120, an AMF 140, a UPF 130, an SMF 132, a PCF 160, a UDM 150, and an N3IWF 170, and interfaces for connecting these apparatuses and functions to each other.

In the following description, the reference numerals of these apparatuses and functions may be omitted as in UE, an E-UTRAN, an MME, an SGW, a PGW-U, a PGW-C, a PCRF, an HSS, a 5G AN, an AMF, a UPF, an SMF, a PCF, a UDM, an N3IWF, and the like.

Note that an Evolved Packet System (EPS) that is a 4G system includes an access network_A and a core network_A and may further include UE and/or a PDN. In addition, a 5G System (5GS) that is a 5G system includes UE, an access network_B, and a core network_B and may further include a DN.

The UE is an apparatus that can be connected to a network service over 3GPP access (also referred to as a 3GPP access network or a 3GPP AN) and/or non-3GPP access (also referred to as a non-3GPP access network or a non-3GPP AN). The UE may be a terminal apparatus capable of performing radio communication, such as a mobile phone or a smartphone, and may be a terminal apparatus that can be connected to both the EPS and the 5GS. The UE may include a Universal Integrated Circuit Card (UICC) and an Embedded UICC (eUICC). Note that the UE may be referred to as user equipment or a terminal apparatus.

In addition, the access network_A corresponds to an Evolved Universal Terrestrial Radio Access Network (E-UTRAN) and/or a wireless LAN access network. In the E-UTRAN, one or multiple evolved Node-B (eNBs) 45 are deployed. Note that, in the following description, the reference numeral of the eNB 45 may be omitted as in eNB. In addition, in a case that there are multiple eNBs, the eNBs are connected to each other via, for example, an X2 interface. In addition, one or multiple access points are deployed on the wireless LAN access network.

In addition, the access network_B corresponds to a 5G access network (5G AN). The 5G AN includes an NG Radio Access Network (NG-RAN) and/or a non-3GPP access network. One or multiple NR Node-Bs (gNBs) 122 are deployed on the NG-RAN. Note that, in the following description, the reference numeral of the gNB 122 may be omitted, as in eNB. The gNB is a node that provides a New Radio (NR) user plane and control plane to the UE, and is connected to a 5GCN via an NG interface (including an N2 interface or an N3 interface). In other words, the gNB is a base station apparatus newly designed for the 5GS and has functions different from those of the base station apparatus (eNB) used in the EPS that is a 4G system. In addition, in a case that there are multiple gNBs, the gNBs are connected to each other via, for example, an Xn interface.

In addition, a non-3GPP access network may be an untrusted non-3GPP access network or a trusted non-3GPP access network. Here, the untrusted non-3GPP access network may be a non-3GPP access network that does not manage security on the access network, for example, a public wireless LAN. On the other hand, the trusted non-3GPP access network may be an access network defined by the 3GPP and may include a trusted non-3GPP access point (TNAP) and a trusted non-3GPP Gateway function (TNGF).

In addition, in the following description, the E-UTRAN and the NG-RAN may be referred to as 3GPP access. In addition, the wireless LAN access network and the non-3GPP AN may be referred to as non-3GPP access. In addition, nodes deployed on the access network_B may also be collectively referred to as NG-RAN nodes.

In addition, in the following description, the access network_A, and/or the access network_B, and/or an apparatus included in the access network_A, and/or an apparatus included in the access network_B may be referred to as an access network or an access network apparatus.

The core network_A corresponds to an Evolved Packet Core (EPC). In the EPC, for example, a Mobility Management Entity (MME), a Serving Gateway (SGW), a Packet Data Network Gateway (PGW)-U, a PGW-C, a Policy and Charging Rules Function (PCRF), a Home Subscriber Server (HSS), and the like are deployed.

In addition, the core network_B corresponds to a 5G Core Network (5GCN). An Access and Mobility Management Function (AMF), a User Plane Function (UPF), a Session Management Function (SMF), a Policy Control Function (PCF), a Unified Data Management (UDM), and the like are deployed on the 5GCN. Here, the 5GCN may be referred to as a 5GC.

In addition, in the following description, the core network_A, and/or the core network_B, an apparatus included in the core network_A, and/or an apparatus included in the core network_B may be referred to as a core network, a core network apparatus, or an intra-core network apparatus.

The core network (the core network_A and/or the core network_B) may refer to an IP mobile communication network operated by a mobile communication (mobile network operator (MNO)) connecting the access network (the access network_A and/or the access network_B) and the PDN and/or the DN, a core network for a mobile communication operator that operates and manages the mobile communication system 1, or a core network for a virtual mobile communication operator and a virtual mobile communication service provider such as a Mobile Virtual Network Operator (MVNO) and a Mobile Virtual Network Enabler (MVNE).

The core network (the core network_A and/or the core network_B) and the access network (access network_A and/or the access network_B) may differ for each mobile communication operator.

In addition, although FIG. 1 illustrates a case that the PDN and the DN are the same, the PDN and the DN may be different. The PDN may be a Data Network (DN) that provides communication services to the UE. Note that the DN may be configured as a packet data service network or may be configured for each service. In addition, the PDN may include a connected communication terminal. Thus, "to be connected to the PDN" may mean "to be connected to a communication terminal and a server apparatus deployed in the PDN". In addition, "to transmit and/or receive user data to and/or from the PDN" may mean "to transmit and/or receive user data to and/or from a communication terminal and a server apparatus deployed in the PDN". Note that the PDN may be referred to as a DN, and the DN may be referred to as a PDN.

In addition, in the following, at least some of the access network_A, the core network_A, the PDN, the access network_B, the core network_B, and the DN, and/or one or multiple apparatuses included in these may be referred to as a network or a network apparatus. In other words, the expression that "the network and/or the network apparatus transmits and/or receives a message and/or performs a procedure" means that "at least some of the access network_A, the core network_A, the PDN, the access network_B, the core network_B, and the DN, and/or one or multiple apparatuses included in these transmit and/or receive a message and/or perform a procedure".

In addition, the UE can be connected to the access network. In addition, the UE can be connected to the core network over the access network. Furthermore, the UE can be connected to the PDN or the DN over the access network and the core network. In other words, the UE can transmit and/or receive (communicate) user data to and/or from the PDN or the DN. In a case that user data is transmitted and/or received, not only Internet Protocol (IP) communication but also non-IP communication may be used.

Here, IP communication refers to data communication using an IP, and data is transmitted and/or received using IP packets. Each IP packet includes an IP header and a payload part. In the payload part, data transmitted and/or received by the apparatuses and functions included in the EPS and the apparatuses and functions included in the 5GS may be included. In addition, non-IP communication refers to data communication performed using no IP, in which data is transmitted and/or received in a form different from the structure of an IP packet. For example, non-IP communication may be data communication implemented through transmission and/or reception of application data to which an IP header is not added, or user data transmitted and/or received by the UE may be transmitted and/or received with another header such as a MAC header and an Ethernet (trade name) frame header added.

In addition, apparatuses which are not illustrated in FIG. 2 may be included in the access network_A, the core network_A, the access network_B, the core network_B, the PDN_A, and the DN_A. For example, the core network_A and/or the core network_B and/or the PDN_A and/or the DN_A may include an Authentication Server Function (AUSF) and an Authentication, authorization, and accounting (AAA) server (AAA-S). The AAA server may be deployed outside the core network.

Here, the AUSF is a core network apparatus provided with an authentication function for 3GPP access and non-3GPP access. Specifically, the AUSF is a network function unit that receives an authentication request for 3GPP access and/or non-3GPP access from the UE and performs an authentication procedure.

Also, the AAA server is an apparatus that is connected directly to the AUSF or indirectly to the AUSF via another network apparatus and has authentication, approval, and billing functions. The AAA server may be a network apparatus within the core network. Note that the AAA server may not be included in the core network_A and/or the core network_B and may be included in a Public land mobile network (PLMN). In other words, the AAA server may be a core network apparatus or may be an apparatus outside the core network. For example, the AAA server may be a server apparatus within the PLMN managed by a 3rd party.

Note that, although each of the apparatuses and functions is illustrated one by one for simplicity in FIG. 2, multiple similar apparatuses and functions may be included in the mobile communication system 1. Specifically, multiple apparatuses and functions such as multiple pieces of UE_A 10, E-UTRANs 80, MMEs 40, SGWs 35, PGW-Us 30, PGW-Cs 32, PCRFs 60, HSSs 50, 5G ANs 120, AMEs 140, UPFs 130, SMFs 132, PCFs 160, and/or UDMs 150 may be included in the mobile communication system 1.

2. Configuration of Each Apparatus

Next, a configuration of each apparatus (the UE, and/or the access network apparatus, and/or the core network apparatus) used in each embodiment will be described with reference to the drawings. Note that each apparatus may be configured as physical hardware, may be configured as logical (virtual) hardware configured in general-purpose hardware, or may be configured as software. In addition, at least a part (including all) of the functions of each apparatus may be configured as physical hardware, logical hardware, or software.

Note that each storage unit (a storage unit_A 340, a storage unit_A 440, a storage unit_B 540, a storage unit_A 640, and a storage unit_B 740) in each apparatus and function to be described later includes, for example, a semiconductor memory, a solid state drive (SSD), a hard disk drive (HDD), or the like. In addition, each storage unit can store not only information originally configured at the time of being shipped, but also various pieces of information transmitted and/or received to and/or from apparatuses and functions (for example, the UE, and/or the access network apparatus, and/or the core network apparatus, and/or the PDN, and/or the DN) other than the apparatus and functions of each storage unit. In addition, each storage unit can store identification information, control information, flags, parameters, and the like included in a control message transmitted and/or received in various communication procedures to be described later. In addition, each storage unit may store these pieces of information for each UE. In addition, in a case that each storage unit performs interworking between the 5GS and the EPS, each storage unit can store a control message and user data transmitted and/or received to and/or from the apparatuses and functions included in the 5GS and/or the EPS. In this case, not only data transmitted and/or received over the N26 interface but also data transmitted and/or received without using the N26 interface can be stored.

2.1. Apparatus Configuration of UE

Figure 3:
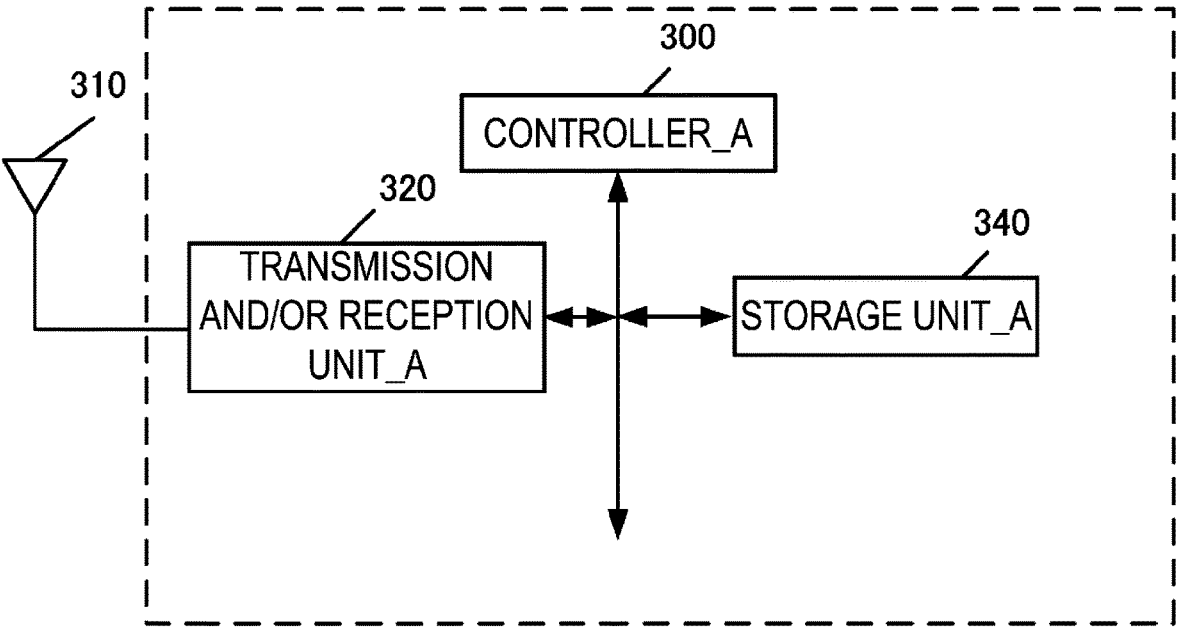
FIG. 3 is a diagram illustrating an apparatus configuration of UE.

First, an apparatus configuration example of the user equipment (UE) will be described with reference to FIG. 3.

The UE includes a controller_A 300, an antenna 310, a transmission and/or reception unit_A 320, and a storage unit_A 340. The controller_A 300, the transmission and/or reception unit_A 320, and the storage unit_A 340 are connected via a bus. The transmission and/or reception unit_A 320 is connected to the antenna 310.

The controller_A 300 is a function unit that controls overall operations and functions of the UE. The controller_A 300 reads and performs various programs stored in the storage unit_A 340 as necessary, and thereby implements various types of processing in the UE.

The transmission and/or reception unit_A 320 is a function unit that performs radio communication with a base station apparatus (the eNB or the gNB) within the access network via the antenna. In other words, with the use of the transmission and/or reception unit_A 320, the UE can transmit and/or receive user data and/or control information to and/or from the access network apparatus, and/or the core network apparatus, and/or the PDN, and/or the DN.

To provide detailed description with reference to FIG. 2, by using the transmission and/or reception unit_A 320, the UE can communicate with the base station apparatus (eNB) within the E-UTRAN over an LTE-Uu interface. In addition, the UE can communicate with the base station apparatus (gNB) within the 5G AN with the use of the transmission and/or reception unit_A 320. In addition, the UE can transmit and/or receive a Non-Access-Stratum (NAS) message to and/or from the AMF over an N1 interface with the use of the transmission and/or reception unit_A 320. However, the N1 interface is a logical interface, and thus communication between the UE and the AMF is actually performed over the 5G AN.

The storage unit_A 340 is a function unit that stores programs, user data, control information, and the like necessary for each operation of the UE.

2.2. Apparatus Configuration of gNB

Figure 4:
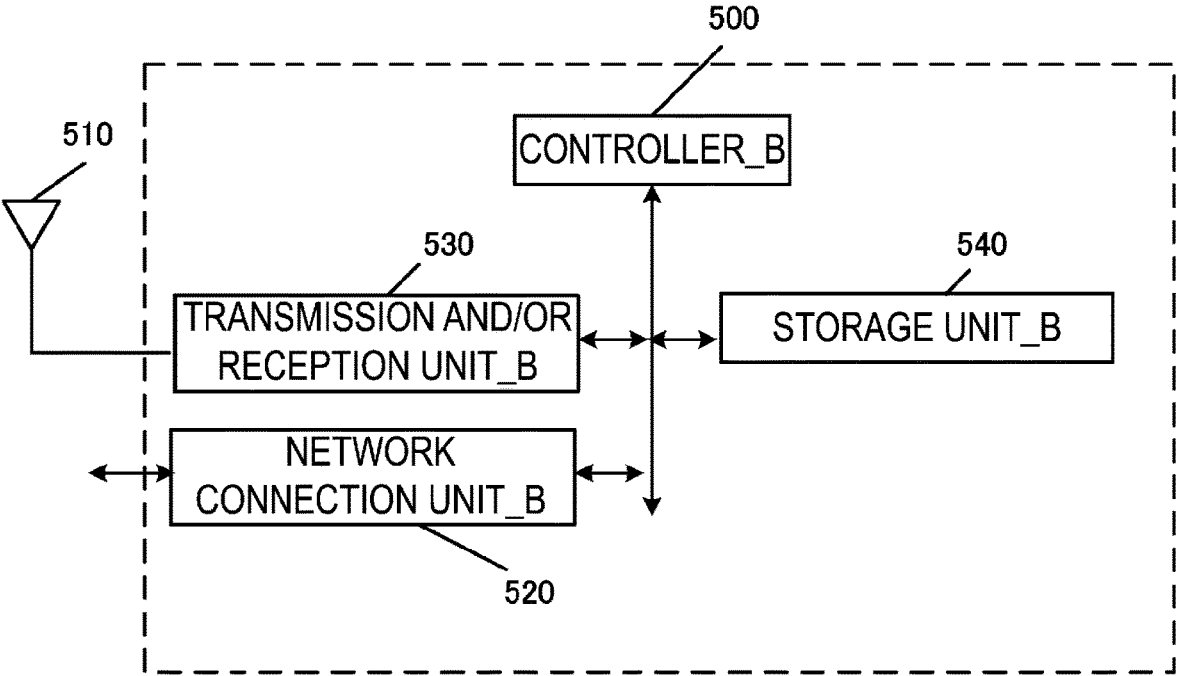
FIG. 4 is a diagram illustrating a configuration of an access network apparatus (gNB) in the 5GS.

Next, an apparatus configuration example of the gNB will be described with reference to FIG. 4. The gNB includes a controller_B 500, an antenna 510, a network connection unit_B 520, a transmission and/or reception unit_B 530, and a storage unit_B 540. The controller_B 500, the network connection unit_B 520, the transmission and/or reception unit_B 530, and the storage unit_B 540 are connected via a bus. The transmission and/or reception unit_B 530 is connected to the antenna 510.

The controller_B 500 is a function unit that controls overall operations and functions of the gNB. The controller_B 500 reads and performs various programs stored in the storage unit_B 540 as necessary, and thereby implements various types of processing in the gNB.

The network connection unit_B 520 is a function unit for the gNB to communicate with the AMF and/or the UPF. In other words, with the use of the network connection unit_B 520, the gNB can transmit and/or receive user data and/or control information to and/or from the AMF and/or the UPF.

The transmission and/or reception unit_B 530 is a function unit that performs radio communication with the UE via the antenna 510. In other words, with the use of the transmission and/or reception unit_B 530, the gNB can transmit and/or receive user data and/or control information to and/or from the UE.

To provide detailed description with reference to FIG. 2, by using the network connection unit_B 520, the gNB within the 5G AN can communicate with the AMF over the N2 interface and can communicate with the UPF over the N3 interface. In addition, the gNB can communicate with the UE with the use of the transmission and/or reception unit_B 530.

The storage unit_B 540 is a function unit that stores programs, user data, control information, and the like necessary for each operation of the gNB.

2.3. Apparatus Configuration of AMF

Figure 5:
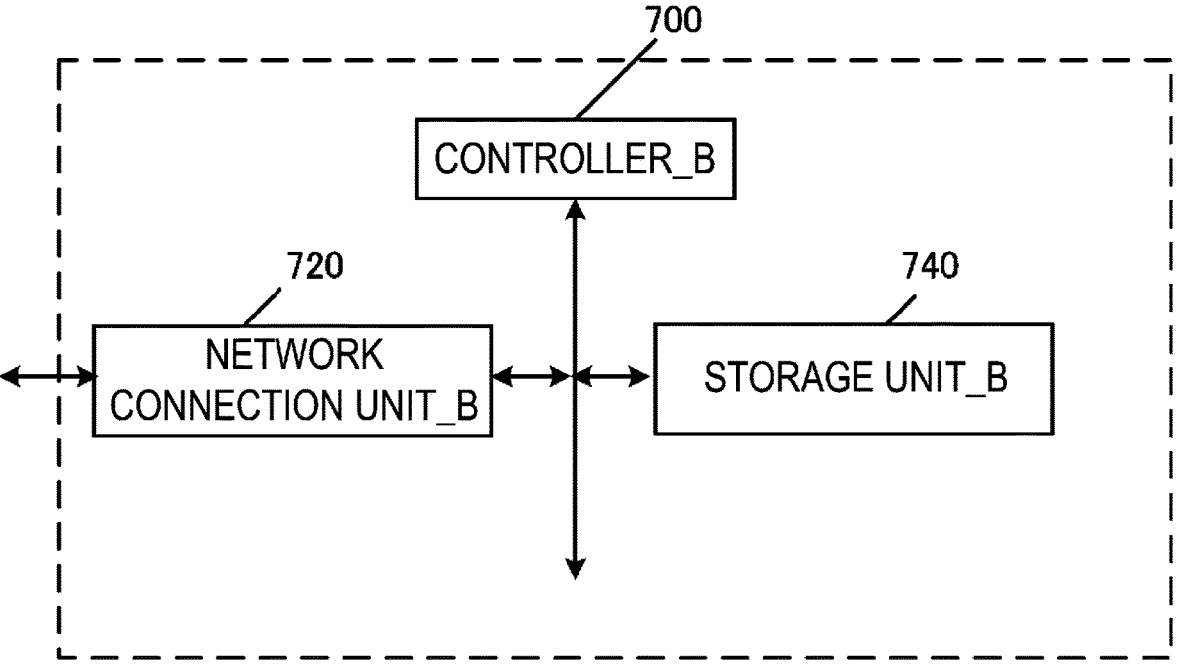
FIG. 5 is a diagram illustrating a configuration of a core network apparatus (AMF/SMF/UPF) in the 5GS.

Next, an apparatus configuration example of the AMF will be described with reference to FIG. 5. The AMF includes a controller_B 700, a network connection unit_B 720, and a storage unit_B 740. The controller_B 700, the network connection unit_B 720, and the storage unit_B 740 are connected via a bus. The AMF may be a node that handles a control plane.

The controller_B 700 is a function unit that controls overall operations and functions of the AMF. The controller_B 700 reads and performs various programs stored in the storage unit_B 740 as necessary, and thereby implements various types of processing in the AMF.

The network connection unit_B 720 is a function unit for the AMF to connect to the base station apparatus (gNB) within the 5G AN, and/or the SMF, and/or the PCF, and/or the UDM, and/or an SCEF. In other words, with the use of the network connection unit_B 720, the AMF can transmit and/or receive user data and/or control information to and/or from the base station apparatus (gNB) in the 5G AN, and/or the SMF, and/or the PCF, and/or the UDM, and/or the SCEF.

To provide detailed description with reference to FIG. 2, by using a network connection unit_A 620, the AMF within the 5GCN can communicate with the gNB over the N2 interface, can communicate with the UDM over an N8 interface, can communicate with the SMF over an N11 interface, and can communicate with the PCF over an N15 interface. In addition, the AMF can transmit and/or receive a NAS message to and/or from the UE over the N1 interface with the use of the network connection unit_A 620. However, the N1 interface is a logical interface, and thus communication between the UE and the AMF is actually performed over the 5G AN. In addition, in a case that the AMF supports an N26 interface, the AMF can communicate with the MME over the N26 interface with the use of the network connection unit_A 620.

The storage unit_B 740 is a function unit that stores programs, user data, control information, and the like necessary for each operation of the AMF.

Note that the AMF has a function of exchanging a control message with the RAN using the N2 interface, a function of exchanging a NAS message with the UE using the N1 interface, a function of performing encryption and integrity protection of a NAS message, a Registration management (RM) function, a Connection management (CM) function, a Reachability management function, a Mobility management function for the UE or the like, a function of transferring a Session Management (SM) message between the UE and the SMF, an Access Authentication (Access Authorization) function, a security anchor function (Security Anchor Functionality (SEA)), a Security Context Management (SCM) function, a function of supporting the N2 interface for a Non-3GPP Interworking Function (N3IWF), a function of supporting transmission and/or reception of a NAS signal to an/or from the UE via the N3IWF, a function of authenticating the UE connected via the N3IWF, and the like.

In addition, in registration management, an RM state for each piece of UE is managed. The RM state may be synchronized between the UE and the AMF. The RM state includes a deregistered state (RM-DEREGISTERED state) and a registered state (RM-REGISTERED state). In the RM-DEREGISTERED state, because the UE is not registered with the network, the AMF is in a state of being unable to reach the UE, because a UE context in the AMF does not have location information and routing information that are valid for the UE. In addition, in the RM-REGISTERED state, because the UE is registered in the network, the UE can receive a service that requires registration with the network. Note that the RM state may be referred to as a 5GMM state. In this case, the RM-DEREGISTERED state may be referred to as a 5GMM-DEREGISTERED state, and the RM-REGISTERED state may be referred to as a 5GMM-REGISTERED state.

In other words, 5GMM-REGISTERED may be a state in which each apparatus establishes a 5GMM context, or may be a state in which each apparatus establishes a PDU session context. Note that, in a case that each apparatus is in 5GMM-REGISTERED, the UE_A 10 may initiate transmission and/or reception of user data and a control message, or may respond to paging. Furthermore, in a case that each apparatus is in 5GMM-REGISTERED, the UE_A 10 may perform a registration procedure other than a registration procedure for initial registration, and/or a service request procedure.

In addition, 5GMM-DEREGISTERED may be a state in which each apparatus does not establish the 5GMM context, may be a state in which the location information of the UE_A 10 is not known to the network, or may be a state in which the network is unable to reach the UE_A 10. Note that, in a case that each apparatus is in 5GMM-DEREGISTERED, the UE_A 10 may initiate the registration procedure, or may perform the registration procedure to thereby establish the 5GMM context.

In addition, in connection management, a CM state for each UE is managed. The CM state may be synchronized between the UE and the AMF. The CM state includes a non-connected state (CM-IDLE state) and a connected state (CM-CONNECTED state). In the CM-IDLE state, the UE is in the RM-REGISTERED state, but does not have NAS signaling connection established with the AMF via the N1 interface. In addition, the CM-IDLE state, the UE has neither connection of the N2 interface (N2 connection) nor connection of the N3 interface (N3 connection). On the other hand, in the CM-CONNECTED state, the UE has NAS signaling connection established with the AMF via the N1 interface. In addition, in the CM-CONNECTED state, the UE may have connection of the N2 interface (N2 connection) and/or connection of the N3 interface (N3 connection).

Furthermore, in connection management, management may be performed separately for the CM state in 3GPP access and the CM state in non-3GPP access. In this case, the CM state in 3GPP access may include a non-connected state in 3GPP access (CM-IDLE state over 3GPP access) and a connected state in 3GPP access (CM-CONNECTED state over 3GPP access). Furthermore, the CM state in non-3GPP access may include a non-connected state in non-3GPP access (CM-IDLE state over non-3GPP access) and a connected state in non-3GPP access (CM-CONNECTED state over non-3GPP access). Note that the non-connected state may be referred to as an idle mode, and a connected state mode may be referred to as a connected mode.

Note that the CM state may be referred to as a 5GMM mode. In this case, the non-connected state may be referred to as a 5GMM non-connected mode (5GMM-IDLE mode), and the connected state may be referred to as a 5GMM connected mode (5GMM-CONNECTED mode). In addition, the non-connected state in 3GPP access may be referred to as a 5GMM non-connected mode in 3GPP access (5GMM-IDLE mode over 3GPP access), and the connected state in 3GPP access may be referred to as a 5GMM connected mode in 3GPP access (5GMM-CONNECTED mode over 3GPP access). In addition, the non-connected state in non-3GPP access may be referred to as a 5GMM non-connected mode in non-3GPP access (5GMM-IDLE mode over non-3GPP access), and the connected state in non-3GPP access may be referred to as a 5GMM connected mode in non-3GPP access (5GMM-CONNECTED mode over non-3GPP access). Note that the 5GMM non-connected mode may be referred to as an idle mode, and the 5GMM connected mode may be referred to as a connected mode.

In addition, one or multiple AMFs may be deployed within the core network_B. In addition, the AMF may be an NF that manages one or multiple Network Slice Instances (NSIs).

In addition, the AMF may be a common CP function (Common Control Plane Network Function (CPNF) (CCNF)) shared among multiple NSIs.

Note that, in a case that the UE connects to the 5GS over non-3GPP access, the N3IWF is an apparatus and/or a function deployed between non-3GPP access and the 5GCN.

2.4. Apparatus Configuration of SMF

Next, an apparatus configuration example of the SMF will be described with reference to FIG. 5. The SMF includes a controller_B 700, a network connection unit_B 720, and a storage unit_B 740. The controller_B 700, the network connection unit_B 720, and the storage unit_B 740 are connected via a bus. The SMF may be a node that handles the control plane.

The controller_B 700 is a function unit that controls overall operations and functions of the SMF. The controller_B 700 reads and performs various programs stored in the storage unit_B 740 as necessary, and thereby implements various types of processing in the SMF.

The network connection unit_B 720 is a function unit for the SMF to connect to the AMF, and/or the UPF, and/or the PCF, and/or the UDM. In other words, with the use of the network connection unit_B 720, the SMF can transmit and/or receive user data and/or control information to and/or from the AMF, and/or the UPF, and/or the PCF, and/or the UDM.

To provide detailed description with reference to FIG. 2, by using of the network connection unit_A 620, the SMF in the 5GCN can communicate with the AMF over the N11 interface, can communicate with the UPF over the N4 interface, can communicate with the PCF over an N7 interface, and can communicate with the UDM over an N10 interface.

The storage unit_B 740 is a function unit that stores programs, user data, control information, and the like necessary for each operation of the SMF.

The SMF has a Session Management function for managing establishment, modification, and release of a PDU session, a function of IP address allocation to the UE and management thereof, a function of selection and control of the UPF, a function of configuring the UPF for routing traffic to an appropriate destination (transmission destination), a function of transmitting and/or receiving an SM part of a NAS message, a function of signaling arrival of downlink data (Downlink Data Notification), a function of providing SM information specific to an (for each AN) that is transmitted to the AN through the AMF over the N2 interface, a function of determining a Session and Service Continuity mode (SSC mode) for a session, a roaming function, and the like.

2.5. Apparatus Configuration of UPF

Next, an apparatus configuration example of the UPF will be described with reference to FIG. 5. The UPF includes a controller_B 700, a network connection unit_B 720, and a storage unit_B 740. The controller_B 700, the network connection unit_B 720, and the storage unit_B 740 are connected via a bus. The UPF may be a node that handles the control plane.

The controller_B 700 is a function unit that controls overall operations and functions of the UPF. The controller_B 700 reads and performs various programs stored in the storage unit_B 740 as necessary, and thereby implements various types of processing in the UPF.

The network connection unit_B 720 is a function unit for the UPF to connect to the base station apparatus (gNB) within the 5G AN, and/or the SMF, and/or the DN. In other words, with the use of the network connection unit_B 720, the UPF can transmit and/or receive user data and/or control information to and/or from the base station apparatus (gNB) within the 5G AN, and/or the SMF, and/or the DN.

To provide detailed description with reference to FIG. 2, by using the network connection unit_A 620, the UPF within the 5GCN can communicate with the gNB over the N3 interface, can communicate with the SMF over the N4 interface, can communicate with the DN over an N6 interface, and can communicate with another UPF over an N9 interface.

The storage unit_B 740 is a function unit that stores programs, user data, control information, and the like necessary for each operation of the UPF.

The UPF has a function as an anchor point for intra-RAT mobility or inter-RAT mobility, a function as an external PDU session point to be mutually connected with the DN (that is, a function of transferring user data as a gateway between the DN and the core network_B), a function of routing and transferring packets, an Uplink Classifier (UL CL) function of supporting routing of multiple traffic flows for one DN, a Branching point function of supporting a multi-homed PDU session, a Quality of Service (QoS) processing function for the user plane, a function of verifying uplink traffic, a function of triggering buffering of downlink packets and Downlink Data Notification, and the like.

In addition, the UPF may be a gateway for IP communication and/or non-IP communication. In addition, the UPF may have a function of transferring IP communication, or a function of conversion between non-IP communication and IP communication. Furthermore, multiple deployed gateways may be gateways for connecting the core network_B and a single DN. Note that the UPF may have connectivity with another NF, and may be connected to each apparatus via another NF.

Note that a user plane refers to user data that is transmitted and/or received between the UE and a network. The user plane may be transmitted and/or received using a PDN connection or a PDU session. Furthermore, in a case of the EPS, the user plane may be transmitted and/or received using an LTE-Uu interface, and/or an S1-U interface, and/or an S5 interface, and/or an S8 interface, and/or an SGi interface. Furthermore, in a case of the 5GS, the user plane may be transmitted and/or received over the interface between the UE and the NG RAN, and/or the N3 interface, and/or the N9 interface, and/or the N6 interface. The user plane may be hereinafter referred to as a U-Plane.

In addition, a control plane refers to a control message that is transmitted and/or received in order to perform communication control of the UE or the like. The control plane may be transmitted and/or received using Non-Access-Stratum (NAS) signaling connection between the UE and the MME. In addition, in a case of the EPS, the control plane may be transmitted and/or received using the LTE-Uu interface and an S1-MME interface. Furthermore, in a case of the 5GS, the control plane may be transmitted and/or received using the interface between the UE and the NG RAN and the N2 interface. The control plane may be hereinafter referred to as a control plane, or may be hereinafter referred to as a C-Plane.

Furthermore, the U-Plane (user plane (UP)) may be a communication path for transmitting and/or receiving user data, and may include multiple bearers. Furthermore, the C-Plane (control plane (CP)) may be a communication path for transmitting and/or receiving a control message, and may include multiple bearers.

2.6. Description of Other Apparatuses and/or Functions and/or Terminology/Identification Information According to Present Embodiment Next, other apparatuses and/or functions and/or terminology and/or identification information transmitted and/or received, stored, and managed by each apparatus and/or messages will be described.

A network refers to at least some of the access network_B, the core network_B, and the DN. One or multiple apparatuses included in at least a part of the access network_B, the core network_B, and the DN may be referred to as a network or a network apparatus. In other words, "a network transmits and/or receives a message and/or performs processing" may mean "an apparatus (a network apparatus and/or a control apparatus) in the network transmits and/or receives the message and/or performs the processing". Conversely, "an apparatus in a network transmits and/or receives a message and/or performs processing" may mean "the network transmits and/or receives the message and/or performs the processing".

A session management (SM) message (also referred to as a Non-Access-Stratum (NAS) SM message) may be a NAS message used in a procedure for SM, or may be a control message transmitted and/or received between the UE_A 10 and the SMF_A 230 via the AMF_A 240. Furthermore, the SM message may include a PDU session establishment request message, a PDU session establishment accept message, a PDU session reject message (PDU session establishment reject message), a PDU session modification request message, a PDU session modification command message, a PDU session modification completion message (PDU session modification complete), a PDU session modification command reject message, a PDU session modification reject message, a PDU session release request message, a PDU session release reject message, a PDU session release command message, a PDU session release completion message, and the like.

The procedure for SM or the SM procedure may include a PDU session establishment procedure, a PDU session modification procedure, and a PDU session release procedure (UE-requested PDU session release procedure). Note that each procedure may be a procedure initiated by the UE, or may be a procedure initiated by the network (NW).

A mobility management (MM) message (also referred to as a NAS MM message) may be a NAS message used in a procedure for MM, or may be a control message transmitted and/or received between the UE_A 10 and the AMF_A 240. Furthermore, the MM message may include a Registration request message, a Registration accept message, a Registration reject message, a Deregistration request message, a Deregistration accept message, a configuration update command message, a configuration update completion message, a Service request message, a Service accept message, a Service reject message, a Notification message, a Notification response message, and the like.

The procedure for MM or the MM procedure may include a Registration procedure, a Deregistration procedure, a Generic UE configuration update procedure, an authentication and authorization procedure, a Service request procedure, a Paging procedure, and a Notification procedure.

A 5G System (5GS) service may be a connection service provided using the core network_B 190. In addition, the 5GS service may be a service different from an EPS service, or may be a service similar to the EPS service.

A non 5GS service may be a service other than the 5GS service and may include an EPS service and/or a non EPS service.

A Packet Data Network (PDN) type indicates a type of PDN connection and includes IPv4, IPv6, IPv4v6, and non-IP. In a case that IPv4 is specified, it is indicated that transmission and/or reception of data is performed using IPv4. In a case that IPv6 is specified, it is indicated that transmission and/or reception of data is performed using IPv6. In a case that IPv4v6 is specified, it is indicated that transmission and/or reception of data is performed using IPv4 or IPv6. In a case that non-IP is specified, it is indicated that communication is performed using a communication method other than the IP, not communication using the IP.

Although a Protocol Data Unit/Packet Data Unit (PDU) session can be defined as a relationship between the DN that provides a PDU connectivity service and the UE, the PDU session may be connectivity established between the UE and an external gateway. In the 5GS, the UE establishes a PDU session via the access network_B and the core network_B, and can thereby perform transmission and/or reception of user data to and/or from the DN by using the PDU session. Here, the external gateway may be a UPF, an SCEF, or the like. The UE can perform transmission and/or reception of user data to and/or from an apparatus deployed in the DN, such as an application server, by using the PDU session.

Note that each apparatus (the UE, and/or the access network apparatus, and/or the core network apparatus) may associate one or multiple pieces of identification information with a PDU session for management. Note that these pieces of identification information may include one or multiple of a DNN, a QoS rule, a PDU session type, application identification information, NSI identification information, access network identification information, and an SSC mode, and may further include other pieces of information. In addition, in a case that multiple PDU sessions are established, pieces of identification information associated with the PDU sessions may have the same or different contents.

The Data Network Name (DNN) may be identification information for identifying the core network and/or an external network such as the DN. In addition, the DNN can also be used as information for selecting a gateway such as the PGW_A 30/UPF_A 235 connecting the core network_B 190. In addition, the DNN may correspond to an Access Point Name (APN).

A Protocol Data Unit/Packet Data Unit (PDU) session type indicates a type of PDU session and includes IPv4, IPv6, Ethernet, and Unstructured. In a case that IPv4 is specified, it is indicated that transmission and/or reception of data is performed using IPv4. In a case that IPv6 is specified, it is indicated that transmission and/or reception of data is performed using IPv6. In a case that Ethernet is specified, it is indicated that transmission and/or reception of an Ethernet frame is performed. Alternatively, Ethernet may indicate that communication using the IP is not performed. In a case that Unstructured is specified, it is indicated that data is transmitted and/or received to and/or from an application server in the DN or the like by using a Point-to-Point (P2P) tunneling technique. For the P2P tunneling technique, for example, a UDP/IP encapsulation technique may be used. Note that the PDU session type may include the IP, in addition to the above. The IP can be specified in a case that the UE can use both of IPv4 and IPv6.

The Public land mobile network (PLMN) is a communication network that provides mobile radio communication services. The PLMN is a network managed by an operator who is a (mobile) network operator, and the operator can be identified by a PLMN ID. In the present document, the PLMN may mean the PLMN ID. A PLMN that matches a Mobile Network Code (MNC) and a Mobile Country Code (MCC) of an International Mobile Subscriber Identity (IMSI) of the UE may be a Home PLMN (HPLMN). The PLMN may mean a core network.

Furthermore, the UE may hold, in a USIM, an Equivalent HPLMN list for identifying one or multiple Equivalent HPLMNs (EPLMNs). A PLMN different from the HPLMN and/or the EPLMN may be a Visited PLMN (VPLMN).

The PLMN that the UE has successfully registered may be a Registered PLMN (RPLMN). Each apparatus may receive and/or hold and/or store, from the RPLMN, an Equivalent PLMN list for identifying one or multiple Equivalent PLMNs (EPLMNs) that can be used equivalently to the RPLMN in the PLMN selection performed by the UE.

The current PLMN may be a PLMN requested by the UE and/or a PLMN selected by the UE and/or the RPLMN and/or the PLMN allowed by the network and/or the PLMN to which the core network apparatus transmitting and/or receiving messages belongs to.

The requested PLMN means a message transmission destination network in a case that the UE transmits a message. Specifically, the requested PLMN may be a PLMN selected by the UE in a case that the UE transmits a message. The requested PLMN may be a current PLMN requested by the UE. Also, the requested PLMN may be a registered PLMN in a case that the UE is in a registered state.

A Stand-alone Non-Public Network (SNPN) is a network that is identified by an SNPN ID composed of a combination of a PLMN ID and a network identifier (NID) and to which only specific UE is allowed to connect. The SNPN may mean a core network. Here, the UE that is allowed to access the SNPN may be an SNPN-enabled UE.

Furthermore, the UE may hold, in the USIM, an Equivalent SNPN list for identifying one or multiple Equivalent SNPNs (ESNPNs). An SNPN different from a HSNPN and/or an ESNPN may be a Visited PLMN (VPLMN).

The SNPN with which the UE has been successfully registered may be a Registered SNPN (RSNPN). Each apparatus may receive and/or hold and/or store, from the RSNPN, equivalent SNPN list for identifying one or multiple Equivalent PLMNs (ESNPNs) that can be used equivalently to the RSNPN in the PLMN selection or SNPN selection performed by the UE.

In addition, a network slice (NS) is a logical network that provides specific network capability and network characteristics. The UE and/or the network can support the network slice (NW slice (NS)) in the 5GS. The network slice may be referred to simply as a slice.

In addition, a network slice instance (NSI) includes a set of an instance (entity) of a network function (NF) and necessary resources and forms a network slice to be mapped. Here, the NF is a processing function for a network, and is adopted or defined by the 3GPP. The NSI is an entity of one or multiple NSs configured in the core network_B. In addition, the NSI may include a virtual Network Function (NF) generated using a Network Slice Template (NST).

Here, the NST is associated with a resource request for provision of a requested communication service and capability, and is a logical expression of one or multiple NFs. In other words, the NSI may be a set of multiple NFs on the core network_B 190. The NSI may be a logical network configured for classifying user data to be delivered depending on a service or the like. In the NS, one or multiple NFs may be configured. Each NF configured in the NS may or may not be an apparatus shared with another NS.

The UE and/or the apparatus in the network can be allocated to one or multiple NSs, based on an NSSAI, and/or an S-NSSAI, and/or a UE usage type, and/or registration information such as one or multiple NSI IDs, and/or an APN. Note that the UE usage type is a parameter value included in registration information of the UE, which is used for identifying the NSI. The UE usage type may be stored in the HSS. The AMF may select the SMF and the UPF based on the UE usage type.

In addition, Single Network Slice Selection Assistance Information (S-NSSAI) is information for identifying the NS. The S-NSSAI may include only a Slice/Service type (SST), or may include both of an SST and a Slice Differentiator (SD). Here, the SST is information indicating an operation of the NS expected in terms of functions and services. In addition, the SD may be information for interpolating an SST in a case that one NSI is selected out of multiple NSIs indicated by the SST. The S-NSSAI may be information unique to each PLMN or may be standard information common to PLMNs.

In addition, a network may store one or multiple pieces of S-NSSAI in the registration information of the UE as default S-NSSAI. Note that, in a case that the S-NSSAI is default S-NSSAI and the UE does not transmit, to a network, valid S-NSSAI in a registration request message, the network may provide an NS related to the UE.

In addition, the S-NSSAI transmitted and/or received between the UE and the NW may be referred to as an S-NSSAI information element (IE). Furthermore, the S-NSSAI IE transmitted and/or received between the UE and the NW may include the S-NSSAI including the SST and/or the SD of the registered PLMN and/or the SST and/or the SD indicating the S-NSSAI of the HPLMN to which the S-NSSAI is mapped. One or multiple pieces of S-NSSAI stored in the UE and/or the NW may include the SST and/or the SD, or include the S-NSSAI including the SST and/or the SD and/or the SST and/or the SD indicating the S-NSSAI of the HPLMN to which the S-NSSAI is mapped.

In addition, the Network Slice Selection Assistance Information (NSSAI) is a set of pieces of the S-NSSAI. Each piece of the S-NSSAI included in the NSSAI is information for assisting the access network or the core network to select an NSI. The UE may store the NSSAI allowed by the network for each PLMN. In addition, the NSSAI may be information used for selecting the AMF. The UE may apply, to the PLMN and the EPLMN, each piece of NSSAI (allowed NSSAI and/or configured NSSAI and/or rejected NSSAI and/or pending NSSAI and/or first NSSAI).

The mapped S-NSSAI is the S-NSSAI of the HPLMN mapped to the S-NSSAI of the registered PLMN in a roaming scenario. The UE may store one or multiple pieces of mapped S-NSSAI mapped to the S-NSSAI included in the configured NSSAI and the allowed NSSAI of each access type. Furthermore, the UE may store one or multiple pieces of mapped S-NSSAI of the S-NSSAI included in the first NSSAI and/or the rejected NSSAI and/or the pending NSSAI.

A network slice-specific authentication and authorization (NSSAA) function is a function for implementing network slice-specific authentication and authorization. The network slice-specific authentication and authorization allows the UE to be authenticated and authorized outside the core network, such as in a 3rd Party. The PLMN and the network apparatus having the NSSAA function can perform an NSSAA procedure on certain S-NSSAI, based on registration information of the UE. Furthermore, the UE having the NSSAA function can manage, store, and transmit and/or receive the pending NSSAI and the third rejected NSSAI. In the present application, NSSAA may be referred to as a network slice-specific authentication and authorization procedure or an authentication and authorization procedure.

The S-NSSAI that requires NSSAA is S-NSSAI that requires NSSAA managed by the core network and/or the core network apparatus. Furthermore, at the time of roaming, the S-NSSAI requiring the NS SAA may be S-NSSAI other than that of the HPLMN or HSNPN, which is managed by the core network and/or the core network apparatus, and in which the S-NSSAI of the HPLMN or HSNPN requiring the NSSAA is mapped S-NSSAI.

The core network and/or the core network apparatus may store the S-NSSAI that requires NSSAA by associating the S-NSSAI with information indicating whether NSSAA is required. Furthermore, the core network and/or the core network apparatus may store the S-NSSAI requiring the NSSAA in association with information indicating whether NSSAA has completed or information indicating that NSSAA has completed and been allowed or succeeded. The core network and/or the core network apparatus may manage the S-NSSAI requiring NSSAA as information unrelated to the access network.

In addition, configured NSSAI is NSSAI fed and stored in the UE. The UE may store the configured NSSAI for each PLMN. The UE may store the configured NSSAI in association with the PLMN. Note that, in the present application, the configured NSSAI associated with the PLMN may be referred to as configured NSSAI with respect to the PLMN, configured NSSAI of the PLMN, configured NSSAI for the PLMN, or configured NSSAI associated with the PLMN. In addition, the UE may store configured NSSAI that is not associated with the PLMN and is valid for all PLMNs, and such configured NSSAI may be defined as "default configured NSSAI".

The configured NSSAI may be associated with multiple PLMNs, and these multiple PLMNs may be EPLMNs.

The configured NSSAI may be information configured by the network (or PLMN). The S-NSSAI included in the configured NSSAI may be referred to as configured S-NSSAI. The configured S-NSSAI may include S-NSSAI and mapped S-NSSAI. Alternatively, the S-NSSAI of the PLMN may be referred to as "configured S-NSSAI", and the S-NSSAI in which the configured S-NSSAI is mapped to the HPLMN may be referred to as "mapped S-NSSAI with respect to configured NSSAI for the PLMN".

In other words, at the time of roaming, the UE may store the configured NSSAI in which the S-NSSAI of the current PLMN is configured and the list of pieces of mapped S-NSSAI of the configured NSSAI. The list of pieces of mapped S-NSSAI of the configured NSSAI may be mapped S-NSSAI(s) for the configured NSSAI in the 3GPP.

The configured NSSAI may be updated by the NW at an arbitrary timing, and the updated configured NSSAI may be transmitted from the NW to the UE based on the update.

In addition, requested NS SAI is NSSAI provided to the network from the UE during the registration procedure. In the registration procedure, the S-NSSAI included in the requested NSSAI transmitted by the UE may be S-NSSAI included in the allowed NSSAI or the configured NSSAI stored in the UE. In the PDU session establishment procedure, the S-NSSAI included in the requested NSSAI transmitted by the UE may be S-NSSAI included in the allowed NSSAI stored in the UE.

The requested NSSAI may be information indicating a network slice requested by the UE. The S-NSSAI included in the requested NSSAI may be referred to as requested S-NSSAI. For example, the requested NSSAI is included in a Non-Access-Stratum (NAS) message transmitted from the UE to the network, such as a registration request message or a PDU session establishment request message, or in a Radio Resource Control (RRC) message including the NAS message and then transmitted and/or received. Here, in a roaming case, the requested NSSAI may include S-NSSAI of a VPLMN and the S-NSSAI of a mapped HPLMN. In other words, the S-NSSAI included in the requested NSSAI (requested S-NSSAI) may include S-NSSAI and mapped S-NSSAI.

In addition, the allowed NSSAI is information indicating one or multiple network slices allowed for the UE. In other words, the allowed NSSAI is information identifying a network slice to which the UE is allowed to connect by the network. The allowed NSSAI may be allowed NSSAI stored in the UE and/or the NW, or allowed NS SAI transmitted from the NW to the UE. In this case, the allowed NSSAI may refer to an allowed NSSAI IE in the 3GPP.

The allowed NSSAI IE transmitted from the NW to the UE may include a list of pieces of the S-NSSAI of the current PLMN or SNPN that are valid for the current PLMN or SNPN at the time of no roaming.

At the time of roaming, the allowed NSSAI IE transmitted from the NW to the UE may include a list of pieces of the S-NSSAI of the current PLMN or SNPN that are valid for the current PLMN or SNPN and also a list of pieces of mapped S-NSSAI that is the S-NSSAI of the HPLMN or HSNPN to which the S-NSSAI of the current PLMN or SNPN is further mapped.

Note that the list of pieces of S-NSSAI of the current PLMN or SNPN that are included in the allowed NSSAI IE and are valid for the current PLMN or SNPN may be referred to as allowed NSSAI, and the list of pieces of mapped S-NSSAI that are S-NSSAI of the HPLMN or HSNPN to which the S-NSSAI of the current PLMN or SNPN is mapped may be referred to as a list of pieces of mapped S-NSSAI of the allowed NSSAI. Here, the list of pieces of mapped S-NSSAI of the allowed NSSAI may be mapped S-NSSAI(s) for the allowed NSSAI in the 3GPP. Similarly, the allowed NSSAI may mean allowed NSSAI for a PLMN or an SNPN in the 3GPP.

The UE and/or the NW may store and manage the allowed NSSAI for each access (the 3GPP access or the non-3GPP access), as information regarding the UE. The UE and/or the NW may further manage the allowed NSSAI in association with the registration area.

Furthermore, the UE and/or the NW may store and manage the allowed NSSAI in association with the PLMN, as information regarding UE. The allowed NSSAI may be associated with multiple PLMNs, and these multiple PLMNs may be EPLMNs.

Note that in the present document, the allowed NSSAI associated with the PLMN and the access type may be referred to as allowed NSSAI with respect to the PLMN and the access type or allowed NSSAI with respect to the access type of the PLMN. The S-NSSAI included in the allowed NSSAI may be referred to as an allowed S-NSSAI. The allowed S-NSSAI may include S-NSSAI and mapped S-NSSAI.

In addition, the rejected NSSAI is information indicating one or multiple network slices not allowed for the UE to use or request. In other words, the rejected NSSAI is information identifying a network slice to which the UE is not allowed to connect by the network. The rejected NSSAI transmitted from the NW to the UE may be included in a rejected NSSAI IE or an Extended rejected NSSAI IE. The rejected NSSAI transmitted and/or received by using the rejected NSSAI IE may be information including one or multiple combinations of S-NSSAI and a reject cause value. The rejected NSSAI transmitted and/or received by using the Extended rejected NSSAI IE may be information including one or multiple combinations of S-NSSAI, mapped S-NSSAI, and a reject cause value at the time of roaming.

Here, the S-NSSAI included in the rejected NSSAI may be associated with a PLMN ID or an SNPN ID. Note that a PLMN or a SNPN indicated by a PLMN ID or an SNPN ID with which the S-NSSAI included in the rejected NSSAI is associated may be the current PLMN or the current SNPN. Alternatively, the PLMN ID or the SNPN ID with which the S-NSSAI included in the rejected NSSAI is associated may be information indicating the HPLMN or the HSNPN regardless of the current PLMN or SNPN.

Here, the reject cause value is information indicating the reason that the network rejects the corresponding S-NSSA or a combination (if any) of the corresponding S-NSSAI and the mapped S-NSSAI. The UE and/or network may store and manage each piece of S-NSSAI and/or mapped S-NSSAI (if any) as appropriate rejected NSSAI and/or mapped S-NSSAI of the rejected NSSAI based on the reject cause value with which each S-NSSA or a combination of the corresponding S-NSSAI and the mapped S-NSSAI is associated.

Furthermore, the rejected NSSAI may be included in the NAS message transmitted from the network to the UE, such as a registration accept message, a configuration update command, or a registration reject message, or in an RRC message including a NAS message. The S-NSSAI included in the rejected NSSAI may be referred to as rejected S-NSSAI.

The rejected NSSAI may be transmitted by using a Rejected NSSAI IE or may be transmitted by using an Extended rejected NSSAI IE in a case that the UE is roaming. The Extended rejected NSSAI IE may include one or multiple rejected S-NSSAI IEs including the S-NSSAI of the current PLMN or SNPN, the mapped S-NSSAI, and the reject cause value, and it may be understood that the UE has been rejected to request the S-NSSAI of the current PLMN or SNPN to the NW together with the received mapped S-NSSAI. Meanwhile, the Rejected NSSAI IE may include the rejected S-NSSAI IE according to the S-NSSAI of the current PLMN or SNPN and the reject cause value, and it may be understood that the UE has been rejected to request the received S-NSSAI of the current PLMN or SNPN from the NW.

The rejected NSSAI may be any one of the first to third rejected NSSAI, the pending NSSAI, the first NSSAI, the list (set) of pieces of mapped S-NSSAI of the first rejected NSSAI, the list (set) of pieces of mapped S-NSSAI of the second rejected NSSAI, the set (list) of pieces of pending mapped S-NSSAI, and the set (list) of mapped S-NSSAI of the first NSSAI, or may be a combination thereof. The S-NSSAI included in the rejected NSSAI may be referred to as rejected S-NSSAI. The rejected S-NSSAI may include the S-NSSAI and the mapped S-NSSAI.

The UE and/or the NW may store and manage the rejected NSSAI in association with the PLMN, as information regarding the UE. The rejected NSSAI may be associated with multiple PLMNs, and these multiple PLMNs may be EPLMNs.

Note that, in the present application, the rejected NSSAI associated with the PLMN may be referred to as rejected NSSAI with respect to the PLMN or rejected NSSAI of the PLMN. The UE and/or the NW may further store second rejected NSSAI and/or second rejected S-NSSAI in association with a registration area. The UE and/or the NW may store the second rejected NSSAI and/or the second rejected S-NSSAI in association with an access type and/or a registration area.

Here, the first rejected NSSAI is a set of one or multiple pieces of the S-NSSAI available in the current PLMN or the current SNPN. The first rejected NSSAI may be rejected NSSAI for the current PLMN or SNPN in the 5GS, may be rejected S-NSSAI for the current PLMN or SNPN, may be S-NSSAI included in the rejected NSSAI for the current PLMN or SNPN, may be mapped S-NSSAI(s) for rejected S-NSSAI for the current PLMN or SNPN, or may be S-NSSAI included in mapped S-NSSAI(s) for rejected S-NSSAI for the current PLMN or SNPN. Then list (set) of pieces of mapped S-NSSAI of the first rejected NSSAI may be mapped S-NSSAI(s) for rejected S-NSSAI for current PLMN or SNPN. The first rejected NSSAI may be rejected NSSAI stored in the UE or the NW, or may be rejected NSSAI transmitted from the NW to the UE.

If the first rejected NSSAI is rejected NSSAI transmitted from the NW to the UE, one or multiple pieces of S-NSSAI rejected because they are unavailable in the current PLMN or the current SNPN among pieces of the S-NSSAI included in the requested NSSAI transmitted from the UE to the NW are included. In this case, the first rejected NSSAI may be information including one or multiple combinations of the S-NSSAI and the reject cause value. The reject cause value at this time may be "S-NSSAI not available in the current PLMN or SNPN" or may be information indicating that the S-NSSAI associated with the reject cause value is not available in the current PLMN or SNPN. The S-NSSAI included in the first rejected NSSAI may be referred to as first rejected S-NSSAI.

In a case that the first rejected NSSAI is rejected NSSAI transmitted from the NW to the UE, the first rejected NS SAI may be transmitted and/or received by being included in the rejected NSSAI IE. The rejected NSSAI IE may include at least one combination of the S-NSSAI of the current PLMN or SNPN and the reject cause value. In a case that the UE is roaming, the foregoing combination may further include mapped S-NSSAI that is S-NSSAI of the HPLMN.

In other words, in a roaming case, the first rejected NSSAI transmitted from the NW to the UE may include at least one combination of the S-NSSAI of the current PLMN or SNPN, the mapped S-NSSAI, and the reject cause value.

The first rejected NSSAI may be applied to all of registered PLMNs or SNPNs. The UE and/or NW may handle the first rejected NSSAI and the S-NSSAI included in the first rejected NSSAI as information regardless of the access type. In other words, the first rejected NSSAI may be information valid for 3GPP access and non-3GPP access.

In a case that the UE transitions to a deregistered state on both the 3GPP access and the non-3GPP access for the current PLMN, the UE may delete the first rejected NSSAI from storage. In other words, the UE deletes the first rejected NSSAI in a case that the UE transitions to the deregistered state for the current PLMN via certain access, in a case that the UE successfully registers with a new PLMN via certain access, in a case that the UE fails to register with a new PLMN via certain access and transitions to the deregistered state, or in a case that the UE is not registered (deregistered state) via other access. In other words, in a case that the UE transitions to a deregistered state with respect to the current PLMN via certain access and the UE is registered (registered state) with the current PLMN via the other access, the UE need not delete the first rejected NSSAI.

The S-NSSAI included in the first rejected NSSAI or the first rejected NSSAI may be referred to as S-NSSAI of the current PLMN. In other words, the S-NSSAI included in the first rejected NSSAI or the first rejected NSSAI may be stored and/or managed and/or transmitted and/or received only in association with the current PLMN ID or SNPN ID. Additionally or alternatively, the S-NSSAI included in the first rejected NSSAI may be S-NSSAI of the HPLMN, or may be an S-NSSAI of the current PLMN.

Second rejected NSSAI is a set of one or multiple pieces of the S-NSSAI that are not available in the current registration area. The second rejected NSSAI may be rejected NSSAI for the current registration area of the 5GS, mapped S-NSSAI(s) for rejected NSSAI for the current registration area, or S-NSSAI included in the mapped S-NSSAI(s) for rejected NSSAI for the current registration area. Then list (set) of pieces of mapped S-NSSAI of the second rejected NSSAI may be mapped S-NSSAI(s) for rejected S-NSSAI for the current registration area. The second rejected NSSAI may be rejected NSSAI stored in the UE or the NW, or may be rejected NSSAI transmitted from the NW to the UE. In a case that the second rejected NSSAI is rejected NSSAI transmitted from the NW to the UE, the second rejected NSSAI may be information including one or multiple combinations of S-NSSAI and a cause value. The reject cause value at this time may be "S-NSSAI not available in the current registration area" or may be information indicating that the S-NSSAI associated with the cause value is not available in the current registration area. The S-NSSAI included in the second rejected NSSAI may be referred to as second rejected S-NSSAI.

In a case that the second rejected NSSAI is rejected NSSAI transmitted from the NW to the UE, one or multiple pieces of S-NSSAI rejected because they are unavailable in the current registration area among pieces of the S-NSSAI included in the requested NSSAI by the UE are included. In this case, the second rejected NSSAI may be included in a rejected NSSAI IE and transmitted and/or received. The rejected NSSAI IE may include at least one combination of the S-NSSAI of the current PLMN or SNPN and the reject cause value. In a case that the UE is roaming, the foregoing combination may further include mapped S-NSSAI that is S-NSSAI of the HPLMN.

In other words, in the roaming case, the second rejected NSSAI transmitted from the NW to the UE may include at least one combination of the S-NSSAI of the current PLMN or SNPN, the mapped S-NSSAI, and the reject cause value.

The second rejected NSSAI may be valid within the current registration area and may be applied to the current registration area. The UE and/or the NW may handle the second rejected NSSAI and the S-NSSAI included in the second rejected NSSAI as information for each access type. In other words, the second rejected NSSAI may be valid information for each of 3GPP access and non-3GPP access. In other words, once the UE transitions to the deregistered state with respect to certain access, the UE may delete the second rejected NSSAI associated with the access from the storage.

The S-NSSAI included in the second rejected NSSAI or the second rejected NSSAI may be referred to as S-NSSAI of the current PLMN. In other words, the S-NSSAI included in the second rejected NSSAI or the second rejected NSSAI may be stored and/or managed and/or transmitted and/or received only in association with the current PLMN ID or SNPN ID. Additionally, the S-NSSAI included in the second rejected NSSAI may be S-NSSAI of the HPLMN, or may be an S-NSSAI of the current PLMN.

The third rejected NSSAI is S-NSSAI that requires NSSAA and is a set of one or multiple pieces of S-NSSAI for which the NSSAA for the S-NSSAI is failed or revoked. The third rejected NSSAI may be NSSAI stored in the UE and/or the NW or NSSAI transmitted and/or received between the NW and the UE. In a case that the third rejected NSSAI is transmitted from the NW to the UE, the third rejected NSSAI may be information including one or multiple combinations of S-NSSAI and a reject cause value. The reject cause value at this time may be "S-NSSAI not available due to the failed or revoked NSSAA" and may be information indicating that the NSSAA for the S-NSSAI associated with the reject cause value has been failed or revoked. The S-NSSAI included in the third rejected NSSAI may be referred to as third rejected S-NSSAI.

The third rejected NSSAI may be applied to all registered PLMNs, or may be applied to the registered PLMNs and/or EPLMNs, or may be applied to all PLMNs. The fact that the third rejected NSSAI is applied to all the PLMNs may mean that the third rejected NSSAI is not associated with the PLMNs or may mean that the third rejected NSSAI is associated with the HPLMN.

Furthermore, the UE and/or the NW may handle the third rejected NSSAI and the third rejected S-NSSAI as information regardless of the access type. In other words, the third rejected NSSAI may be valid information for 3GPP access and non-3GPP access. The third rejected NSSAI may be NSSAI different from the rejected NSSAI. The third rejected NSSAI may be the first rejected NSSAI. The third rejected NSSAI may be rejected NSSAI for the failed or revoked NSSAA of the 5GS, or may be rejected S-NSSAI for the failed or revoked NSSAA, or may be S-NSSAI included in the rejected NSSAI for the failed or revoked NSSAA.

The third rejected NSSAI is rejected NSSAI allowing the UE to identify the slice that is rejected due to failure or revocation of NSSAA from the core network. Specifically, the UE does not initiate the registration request procedure for the S-NSSAI included in the third rejected NSSAI while storing the third rejected NSSAI. The third rejected NSSAI may be identification information including one or multiple pieces of S-NSSAI received from the core network in association with the reject cause value indicating failure of NSSAA.

The third rejected NSSAI is information regardless of the access type. Specifically, in a case that the UE stores the third rejected NSSAI, the UE may not attempt to transmit, either on 3GPP access or on non-3GPP access, a registration request message including the S-NSSAI included in the third rejected NSSAI. Alternatively, the UE can transmit, based on a UE policy, the registration request message including the S-NSSAI included in the third rejected NSSAI.

Alternatively, the UE may delete the third rejected NSSAI based on the UE policy, and may transition to a state in which the UE can transmit the registration request message including the S-NSSAI included in the third rejected NSSAI. In other words, in a case that the UE transmits, based on the UE policy, the registration request message including the S-NSSAI included in the third rejected NSSAI, the UE may delete the S-NSSAI from the third rejected NSSAI.

The S-NSSAI included in the third rejected NSSAI at the time of roaming may be referred to as S-NSSAI of the HPLMN. In other words, the third rejected NSSAI received by the UE from the VPLMN may include the S-NSSAI of the HPLMN.

Alternatively, the S-NSSAI included in the third rejected NSSAI at the time of roaming may be referred to as S-NSSAI of the current PLMN. In other words, the S-NSSAI included in the third rejected NSSAI may be stored and/or managed and/or transmitted and/or received only in association with the current PLMN ID or SNPN ID.

The first NSSAI is information including one or multiple pieces of S-NSSAI that have reached the maximum number of pieces of UE for each network slice. The first NSSAI may be rejected NSSAI, may be allowed NSSAI, or may be pending NSSAI. The first NSSAI may be NSSAI stored in the UE and/or the NW, or NSSAI transmitted from the NW to the UE.

In a case that the first NSSAI is transmitted from the NW to the UE, the first NSSAI may be information including one or multiple pieces of information including at least one of the S-NSSAI and the mapped S-NSSAI, the reject cause value, the value of a back-off timer, and information indicating the validity range of the value of the back-off timer. The reject cause value at this time may be "S-NSSAI having reached the maximum number of pieces of UE for each network slice" and may be information indicating that the S-NSSAI has reached the maximum number of pieces of UE that can be allowed for the S-NSSAI associated with the reject cause value.

Here, the reject cause value may be a reject cause value included in the rejected NSSAI, may be flag information, or may be a 5GMM cause. Furthermore, in this case, the value of the back-off timer may be information indicating the duration for which the UE is prohibited from transmitting an MINI message and transmitting an SM message using the corresponding S-NSSAI or the S-NSSAI related to the mapped S-NSSAI.

Furthermore, the information indicating the validity range of the value of the back-off timer may be information indicating whether the value of the back-off timer is applied to the current Public Land Mobile Network (PLMN), or is applied to all PLMNs, or is valid in the current registration area.

The first NSSAI may be applied to all registered PLMNs, may be valid for or applied to all PLMNs, may be valid within the registration area, may be applied to the registered PLMNs and EPLMNs, or may be applied to one or multiple PLMNs to which TAI included in a TA list (a TAI list or a registration area) belongs. The fact that the first NSSAI is applied to all the PLMNs may mean that the first NSSAI is not associated with the PLMNs or may mean that the first NSSAI is associated with the HPLMNs.

In a case that the first NSSAI is valid for all the registered PLMNs, or is applied to all the PLMNs, or is applied to the registered PLMNs and/or EPLMNs, the UE and/or the NW may handle the first NSSAI and the S-NSSAI included in the first NSSAI as information regardless of the access type. In a case that the first NSSAI is valid within the registration area or is applied to one or multiple PLMNs to which TAI included in the TA LIST (the TAI list or the registration area) belongs to, the UE and/or the NW may handle the first NSSAI and the S-NSSAI included in the first NSSAI as information for each access type.

The first NSSAI may be allowed NSSAI, rejected NSSAI, pending NSSAI, or information different from these types of information.

In a case that the first NSSAI is NSSAI transmitted from the NW to the UE, the first NSSAI may be a set of combinations of S-NSSAI and mapped S-NSSAI.

The S-NSSAI included in the third rejected NSSAI at the time of roaming may be referred to as S-NSSAI of the HPLMN. In other words, the third rejected NSSAI received by the UE from the PLMN may include the S-NSSAI of the HPLMN. In that case, the third rejected NSSAI may be associated with the HPLMN and stored and/or managed in the UE and/or the NW. Alternatively, the third rejected NSSAI may not be associated with a PLMN ID and may be stored and/or managed in the UE and/or the NW as information common to all PLMNs.

The pending NSSAI is a set of one or multiple pieces of S-NSSAI that are pending and/or unavailable for use by the UE. The pending NSSAI is the S-NSSAI for which the network requires network slice-specific authentication and may be a set of pieces of S-NSSAI for which the network slice-specific authentication has not been completed.

The pending NSSAI may be pending NSSAI of the 5GS. The pending NSSAI may be NSSAI stored in the UE and/or the NW or may be NSSAI transmitted and/or received between the NW and the UE.

In a case that the pending NSSAI is NSSAI transmitted from the NW to the UE, the pending NSSAI may be information including one or multiple combinations of S-NSSAI and a reject cause value. The reject cause value at this time may be "NSSAA is pending for the S-NSSAI" or may be information indicating that the S-NSSAI associated with the reject cause value is prohibited or pending for use by the UE until the NSSAA for the S-NSSAI is completed.

In a case that the pending NSSAI is NSSAI transmitted from the NW to the UE, the pending NSSAI may be a set of combinations of S-NSSAI and mapped S-NSSAI.

The pending NSSAI may be applied to all registered PLMNs, may be applied to the registered PLMNs and one or multiple EPLMNs of the registered PLMNs, or may be applied to all the PLMNs. The fact that the pending NSSAI is applied to all the PLMNs may mean that the pending NSSAI is not associated with the PLMNs or may mean that the pending NSSAI is associated with the HPLMNs.

The UE and/or the NW may handle the S-NSSAI included in the pending NSSAI as information regardless of the access type. In other words, the pending NSSAI may be information valid for 3GPP access and non-3GPP access. The pending NS SAI may be NSSAI different from the rejected NSSAI. The pending NSSAI may be first rejected NSSAI.

The pending NSSAI is NSSAI including one or multiple pieces of S-NSSAI identifying slices for which the UE is pending the procedure. Specifically, while storing the pending NSSAI, the UE does not initiate the registration request procedure for the S-NSSAI included in the pending NSSAI or mapped S-NSSAI of the pending NSSAI.

In other words, the UE does not use the S-NSSAI included in the pending NSSAI during the registration procedure until NSSAA for the S-NSSAI included in the pending NSSAI is completed. The pending NSSAI is information regardless of the access type. Specifically, in a case that the UE stores the pending NSSAI, the UE does not attempt to transmit, either on 3GPP access or on non-3GPP access, a registration request message including the S-NSSAI included in the pending NSSAI.

During roaming (roaming scenario), the S-NSSAI included in the pending NSSAI may be the S-NSSAI of the HPLMN. In other words, the pending NSSAI received by the UE from the VPLMN may include the S-NSSAI of the HPLMN.

A tracking area is a single or multiple ranges that can be expressed using location information of the UE_A 10 managed by the core network. The tracking area may include multiple cells. Furthermore, the tracking area may be a range in which a control message such as paging is broadcast, or may be a range in which the UE_A 10 can move without performing a handover procedure. Furthermore, the tracking area may be a routing area, may be a location area, or may be any area similar to these. The tracking area may be hereinafter a TA. The tracking area may be identified by a Tracking Area Identity (TAI) including a Tracking area code (TAC) and a PLMN.

The registration area is a set of one or multiple TAs allocated to the UE by the AMF. Note that, while moving within one or multiple TAs included in a registration area, the UE_A 10 may be able to move without transmitting and/or receiving a signal for updating the tracking area. In other words, the registration area may be an information group indicating an area in which the UE_A 10 can move without performing a tracking area update procedure. The registration area may be identified by a TAI list configured by one or multiple TAIs.

A TAI included in the TAI list may belong to one PLMN or multiple PLMNs. In a case that multiple TAIs included in the TAI list belong to different PLMNs, the PLMNs may be EPLMNs.

A UE ID is information for identifying the UE. Specifically, the UE ID may be a Subscription Concealed Identifier (SUCI), or a Subscription Permanent Identifier (SUPI), or a Globally Unique Temporary Identifier (GUTI), or an International Mobile Subscriber Identity (IMEI), or an IMEI Software Version (IMEISV), or a Temporary Mobile Subscriber Identity (TMSI), for example. Alternatively, the UE ID may be other information configured by an application or within the network. Moreover, the UE ID may be information for identifying the user.

Management of the maximum number of UE connected to a slice is to manage the maximum number of UE that can be registered with the network slice or S-NSSAI at the same time. Here, the UE registered with the network slice or the S-NSSAI may refer to the S-NSSAI indicating the network slice included in allowed NSSAI for storage. An apparatus within a network, the apparatus supporting the function to manage the maximum number of UE connected to a slice can store, for each piece of S-NSSAI, information as to whether the management of the maximum number of UE connected to the slice is required and can further check, during the registration procedure, whether the number of registered UE has reached a certain constant corresponding to the maximum number. Furthermore, each apparatus that supports the function to manage the maximum number of UE connected to the slice may be able to store first NSSAI. In this specification, the maximum number of UE connected to a slice may be referred to as the maximum number of UE connected per slice, or the maximum number of UE that can be registered with a network slice or S-NSSAI, or the maximum number of UE, or a constant.

A back-off timer is a timer for prohibiting the transmission of an MM message performed by the UE and/or the initiation of the procedure using an SM message. The back-off timer is managed and implemented by the UE. The back-off timer may be associated with the S-NSSAI or NSSAI. For the UE, while the back-off timer associated with the S-NSSAI is valid, transmission of the MM message and/or the SM message using the S-NSSAI may be prohibited, or regulated, or limited. These regulations may be regulations based on congestion control in the 5GS, may be regulations including regulations based on the congestion control in the 5GS, or may be regulations independent from the congestion control in the 5GS.

The back-off timer may be a timer that is started and/or stopped in units of S-NSSAI and/or NSSAI and/or PLMNs and/or SNPNs.

Specifically, the back-off timer may be associated with the S-NSSAI, and may be a timer for prohibiting transmission of the MM message and/or SM message using specific S-NSSAI. In other words, the UE may be configured not to transmit the MM message and/or SM message using specific S-NSSAI during counting of the timer.

Alternatively, the back-off timer may be associated with NSSAI, and may be a timer for prohibiting transmission of the MM message and/or SM message using S-NSSAI included in specific NSSAI. In other words, the UE may be configured not to transmit the MM message and/or SM message using the S-NSSAI included in the specific NSSAI during counting of the timer.

Furthermore, the UE may be configured such that, during the counting of the timer, the transmission of the MM message and/or SM message prohibited in the original PLMN is allowed in a new PLMN, based on a specific condition described below. Note that the expression of allowance of transmission of the MM message and/or the SM message prohibited in the original PLMN may mean allowance of transmission of the MM message and/or the SM message using the same S-NSSAI as that associated with the back-off timer, and/or the S-NSSAI associated with the same S-NSSAI, and/or the S-NSSAI associated with the mapped S-NSSAI of the same S-NSSAI.

Furthermore, the back-off timer may be a timer for prohibiting transmission of the MM message using specific NSSAI. In other words, the UE may be configured not to transmit the MA/I message using the specific NSSAI and/or the NSSAI including the specific S-NSSAI during the counting of the timer.

Furthermore, the UE may be configured such that, during the counting of the timer, the UE is allowed for transmission of the MM message prohibited in the original PLMN in a new PLMN based on the specific condition described below. Note that the expression of allowance of transmission of the MM message prohibited in the original PLMN may mean allowance of transmission of the MM message using the same NSSAI as the NSSAI associated with the back-off timer and/or the NSSAI including the same S-NSSAI as the S-NSSAI associated with the back-off timer. Furthermore, the expression of allowance of transmission of the MM message prohibited in the original PLMN may mean allowance of transmission of the MM message using the NSSAI including the S-NSSAI associated with the S-NSSAI associated with the back-off timer and/or the NSSAI including the S-NSSAI associated with the mapped S-NSSAI of the S-NSSAI associated with the back-off timer.

In addition, the back-off timer may be a timer associated with no NSSAI and used for prohibiting transmission of an MM message using no NSSAI. In other words, the UE_A 10 may be configured not to transmit the MM message using the no NSSAI during counting of the timer. Furthermore, the UE_A 10 may be configured such that, during the counting of the timer, the UE_A 10 is allowed for transmission of the MM message prohibited in the original PLMN in a new PLMN based on the specific condition described below. Note that the expression of allowance of transmission of the MM message prohibited in the original PLMN may mean allowance of the MM message using the no NSSAI.

Furthermore, the back-off timer may be a timer of 5GMM, and/or a timer of EPS mobility management (EMM). Furthermore, the back-off timer may be a timer T3448, or may be a timer equivalent to the timer T3448. In other words, the back-off timer may be the same timer as or similar to a timer for regulating communication of user data via the control plane.

Next, identification information transmitted and/or received and stored and managed by apparatuses will be described in the present embodiment.

First identification information is information indicating a network slice requested by the UE. The first identification information may be information including one or multiple pieces of S-NSSAI associated with a network slice requested by the UE. Note that the network slice requested by the UE may be a network slice that the UE wants to use, or a network slice that the UE requests to be allowed to use by the network. The S-NSSAI included in the first identification information may be S-NSSAI included in configured NSSAI associated with the current PLMN, or may be S-NSSAI included in allowed NSSAI associated with the current PLMN.

In other words, the first identification information may be S-NSSAI included in the configured NSSAI associated with one or multiple current PLMNs, or S-NSSAI included in the allowed NSSAI associated with one or multiple current PLMNs, or a combination of the two configurations described above. More specifically, the allowed NSSAI associated with the current PLMN may be allowed NSSAI associated with the current PLMN and the current access type. Furthermore, the first identification information may be requested NS SAI in the 5GS.

Note that the S-NSSAI included in the first identification information may be an S-NSSAI that is not included in the rejected NSSAI that is stored in the UE and associated with the current PLMN, and/or S-NSSAI that is not included in the pending NSSAI that is stored in the UE and associated with the current PLMN, or S-NSSAI that is not included in the first NSSAI that is stored in the UE and associated with the current PLMN.

In addition, at the time of roaming, in a case that the pending NSSAI and/or the rejected NSSAI and/or the S-NSSAI included in first NSSAI is S-NSSAI of the HPLMN, the S-NSSAI included in the first identification information may be the pending NSSAI and/or the rejected NSSAI stored in the UE and/or the S-NSSAI included in the first NSSAI may be the S-NSSAI of the current PLMN that is not the mapped S-NSSAI.

Furthermore, the S-NSSAI included in the first identification information may be the S-NSSAI for which the back-off timer associated with the S-NSSAI or the mapped S-NSSAI of the S-NSSAI is not running for the UE.

Second identification information may be information indicating that the UE supports a function to manage the maximum number of UE connected to a slice. Alternatively, the second identification information may be information indicating whether the UE supports the function to manage the maximum number of UE connected to a slice. The second identification information may be 5GMM capability information. The second identification information may be information indicating that the UE can perform storage.

10th identification information may be information indicating the S-NSSAI having reached the maximum number of UE that can be registered with a network slice or the S-NSSAI. The 10th identification information may be included in the allowed NSSAI transmitted from the network, may be included in the rejected NSSAI transmitted from the network, may be included in the pending NSSAI transmitted from the network, or may be transmitted from the network as information different from the above-described types of information.

Furthermore, the 10th identification information may be NSSAI. Furthermore, the 10th identification information may be allowed NSSAI, or may be rejected NSSAI. Furthermore, the 10th identification information may be pending NSSAI, or may be NSSAI different from the above-described types of NSSAI.

The 10th identification information may be the first NSSAI or the S-NSSAI included in the first NSSAI. The 10th identification information may include at least one piece of 11th to 16th identification information. Specifically, the 10th identification information may include at least one or multiple pieces of information of the S-NSSAI having reached the maximum number of UE that can be registered with the network slice or the S-NSSAI, the mapped S-NSSAI of the S-NSSAI, the cause value indicating that the maximum number of UE that can be registered with the network slice or the S-NSSAI has been reached, the value of the back-off timer indicating the period during which the UE is prohibited from transmitting a registration request message using the S-NSSAI, and information indicating the valid range of the back-off timer.

Furthermore, the 10th identification information may further include at least one or multiple pieces of information of the cause value indicating that the maximum number of UE that can be registered with the network slice has been reached, the value of the back-off timer indicating the period during which transmission of the registration request message using no NSSAI is prohibited, and the information indicating the valid range of the back-off timer. Note that the cause value indicating that the maximum number of UE that can be registered with the network slice has been reached, the value of the back-off timer indicating the period during which transmission of the registration request message using the no NSSAI is prohibited, and the information indicating the valid range of the back-off timer need not be included in the 10th identification information and may be separately transmitted and/or received. Here, in a case that the 10th identification information is included in the rejected NSSAI, the cause value included in the 10th identification information may be the reject cause value.

11th identification information may be information and/or a cause value indicated to the UE by the network and indicating that the maximum number of UE that can be registered with the network slice or the S-NSSAI has been reached. The 11th identification information may be information and/or a cause value indicating that the use of S-NSSAI is rejected or restricted because the maximum number of UE connected to each slice has been reached. In other words, the 11th identification information is information or a cause value indicating that the use of S-NSSAI is rejected or restricted for the UE by the network because the maximum number of UE connected to each slice has been reached.

The 11th identification information may be included in the 10th identification information, and may be associated with the S-NSSAI indicated in 14th identification information included in the same 10th identification information, and/or mapped S-NSSAI indicated in the 15th identification information. The 11th identification information may be associated with each piece of identification information included in the same 10th identification information. In a case that the 11th identification information is included in the rejected NSSAI, the 11th identification information may be a reject cause value. The 11th identification information may be flag information.

Furthermore, the 11th identification information may be a cause value indicating that connection to a slice is limited and/or is not allowed. Furthermore, the 11th identification information may be a cause value indicating that registration with a slice is limited and/or is not allowed.

Furthermore, the 11th identification information may be a 5G Mobility Management (5GMM) cause. Furthermore, the 11th identification information may be a 22nd 5GMM cause. Here, the 22nd 5GMM cause may be a cause value indicating a congestion. Furthermore, the 22nd 5GMM cause may be information transmitted to the UE due to congestion in the network.

Furthermore, the 11th identification information may be a 5GMM cause other than the 22nd 5GMM cause. For example, the 11th identification information may be information transmitted to the UE due to congestion in a network slices. Furthermore, the 11th identification information may be information transmitted to the UE due to the lack of resources of network slices. Furthermore, the 11th identification information may be a cause value indicating a failure to provide a requested service due to insufficient resources of specific slices.

The 12th identification information may be the value of the back-off timer. Specifically, the 12th identification information may be information indicating the period in which the network prohibits the UE from transmitting the MINI message using the S-NSSAI indicated in 14th identification information and/or 15th identification information included in the same 10 identification information, or transmitting the SM message other than a PDU connection release request message. In other words, the 12th identification information may be information indicating the period in which the network prohibits the UE from transmitting a registration request message using the S-NSSAI indicated in the 14th identification information and/or the 15th identification information included in the same 10 identification information.

The 12th identification information may be included in the 10th identification information, and may be associated with the S-NSSAI indicated in the 14th identification information included in the same 10th identification information, and/or with the mapped S-NSSAI indicated in the 15th identification information. The 12th identification information may be associated with the different pieces of identification information included in the same 10th identification information.

The 12th identification information may be information included in the MM message, independent from the 10th identification information. The 12th identification information may be associated with multiple pieces of S-NSSAI. Specifically, in a case that multiple pieces of 10th identification information are included in the same MINI message including the 12th identification information, the value of the value of the back-off timer included in the 12th identification information may be associated with each piece of the S-NSSAI included in the multiple of 10th identification information.

13th identification information is information indicating the valid range of the back-off timer. Specifically, the 13th identification information may be information indicating the valid range of the back-off timer counted by the UE, with use of the value of the corresponding back-off timer. More specifically, the 13th identification information may be information indicating that the corresponding back-off timer is applied to the current PLMN (the PLMN requested by the UE or the RPLMN) or to all the PLMNs. Furthermore, alternatively, the 13th identification information may be information indicating that the back-off timer is applied to the current registration area.

The 13th identification information may be information indicating the range indicating a regulated range, or may be information indicating the range to which a regulation is applied. Note that the regulation may be based on congestion control. More specifically, the regulation may limit the transmission of the MINI message performed by the UE. Furthermore, the regulation may be implemented by the back-off timer.

The 13th identification information may be information indicating whether the S-NSSAI included in the same 10 identification information is the S-NSSAI of the HPLMN or the S-NSSAI of the current PLMN. Specifically, the 13th identification information may be information indicating that the same 10 identification information includes the 14th identification information or may be information indicating that the same 10 identification information includes the 15th identification information. The 13th identification information may be included in the 10th identification information, and in that case, the value of the corresponding back-off timer may be a value indicated by the 12th identification information included in the same 10th identification information. Furthermore, in that case, the 13th identification information may be associated with the different pieces of identification information included in the same 10th identification information.

The 14th identification information is information indicating the S-NSSAI having reached the maximum number of UE that can be registered for each piece of the S-NSSAI. The 14th identification information may be the S-NSSAI included in the 10th identification information, and may be associated with the mapped S-NSSAI indicated by the 15th identification information included in the same 10th identification information. The 14th identification information may be associated with the different pieces of identification information included in the same 10th identification information. Furthermore, the 14th identification information may be S-NSSAI.

The 15th identification information is the S-NSSAI of the HPLMN associated with the corresponding S-NSSAI. Specifically, in a case that the current PLMN (current PLMN, or the PLMN requested by the UE, or RPLMN, or a PLMN selected by the UE) or is not the HPLMN, the 15th identification information may be information indicating the S-NSSAI of the HPLMN mapped to the S-NSSAI of the current PLMN. The 15th identification information may be mapped S-NSSAI.

The 15th identification information may be the mapped S-NSSAI included in the 10th identification information, and may be associated with the S-NSSAI indicated by the 14th identification information included in the same 10th identification information, and in that case, the 15th identification information may be the mapped S-NSSAI of the S-NSSAI indicated by the 14th identification information. The 15th identification information may be associated with the different pieces of identification information included in the same 10th identification information. Furthermore, the 15th identification information may be the mapped S-NSSAI of the S-NSSAI indicated by the 14th identification information.

16th identification information is information indicating the valid ranges of the S-NSSAI and the mapped S-NSSAI of the current PLMN included in the rejected S-NSSAI included in the rejected NSSAI. Specifically, the 16th identification information may indicate that the relevant rejected S-NSSAI is rejected for the entire S-NSSAI of the current PLMN or may indicate that only the combination of the S-NSSAI of the current PLMN of the relevant rejected S-NSSAI and the mapped S-NSSAI is rejected, or may indicate that the entire mapped S-NSSAI of the relevant rejected S-NSSAI is rejected.

That is, in a case that the UE receives the 16th identification information "indicating that the relevant rejected S-NSSAI is rejected for the entire S-NSSAI of the current PLMN" in association with the combination of S-NSSAI #1 and mapped S-NSSAI #a included in an Extended rejected NSSAI IE, it may be understood that the S-NSSAI #1 of the current PLMN is rejected even in combination with other mapped S-NSSAI.

Alternatively, the 16th identification information may be information indicating that the relevant S-NSSAI is to be deleted from the allowed NSSAI, the pending NSSAI, or the rejected NSSAI, or information indicating that the related S-NSSAI is not to be deleted.

Similarly, in a case that the UE receives the 16th identification information "indicating that the relevant rejected S-NSSAI is rejected for the entire mapped S-NSSAI" in association with the combination of the S-NSSAI #1 and the mapped S-NSSAI #a included in the Extended rejected NSSAI IE, it may be understood that the UE is rejected for the combination of the S-NSSAI #1 and mapped S-NSSAI #a is rejected. That is, it may be understood that the UE is not rejected to use S-NSSAI(s) in a combination other than that of the S-NSSAI #1 and mapped S-NSSAI #a.

Similarly, in a case that the UE receives the 16th identification information "indicating that the relevant rejected S-NSSAI is rejected for the entire mapped S-NSSAI" in association with the combination of the S-NSSAI #1 and the mapped S-NSSAI #a included in the Extended rejected NSSAI IE, it may be understood that the UE is rejected for the combination of the S-NSSAI #1 and mapped S-NSSAI #a is rejected.

The 16th identification information may be included in the Extended rejected NSSAI IE. Alternatively, by transmitting specific S-NSSAI or mapped S-NSSAI in the rejected S-NSSAI IE included in the Extended rejected NSSAI IE, it may be indicated that the UE is rejected for the entire S-NSSAI of the current PLMN or SNPN, or indicated the UE is rejected for the entire mapped S-NSSAI. Specifically, the 16th identification information may be a first indication for the NW to cause the UE to restrict deletion of the allowed NSSAI based on the rejected NSSAI or restrict deletion of the rejected NSSAI based on the allowed NSSAI, or a second indication for the NW to cause the UE to delete the allowed NSSAI based on the rejected NSSAI or delete the rejected NSSAI based on the allowed NSSAI.

3. Description of Procedures Used in Each Embodiment

Next, procedures used in each embodiment will be described. Note that the procedures used in each embodiment include a Registration procedure, a Network Slice-Specific Authentication and Authorization procedure, a UE configuration update procedure (Generic UE configuration update procedure), and a Network-initiated deregistration procedure. Is included. Each procedure will be described below.

Note that, in each embodiment, a case that each of the HSS and the UDM, the PCF and the PCRF, the SMF and the PGW-C, and the UPF and the PGW-U is configured as a single apparatus (that is, the same physical hardware, or the same logical hardware, or the same software) as illustrated in FIG. 2 will be described as an example. However, the details described in the present embodiment can also be applied to a case that each of the combinations is configured as different apparatuses (that is, different pieces of physical hardware, or different pieces of logical hardware, or different pieces of software). For example, between the apparatuses/functions, data may be directly transmitted and/or received, data may be transmitted and/or received via an N26 interface between the AMF and the MME, or data may be transmitted and/or received via the UE.

3.1. Registration Procedure

First, a registration procedure will be described with reference to FIG. 6. Hereinafter, the registration procedure will be referred to as the present procedure. The registration procedure is a procedure for registration with the access network_B, and/or the core network_B, and/or the DN initiated by the UE. In a case that the UE is in a state of not being registered with the network, for example, the UE can perform the present procedure at any timing, for example, a power input time. In other words, the UE can initiate the present procedure at any timing as long as the UE is in the deregistered state (5GMM-DEREGISTERED state). In addition, each apparatus (in particular, the UE and the AMF) can transition to the registered state (5GMM-REGISTERED state), based on completion of the registration procedure. Note that each registered state may be managed by each apparatus for each access. Specifically, each apparatus may independently manage the registration state (registered state or deregistered state) for 3GPP access and the registration state for non-3GPP access.

In addition, the registration procedure may be a procedure for updating position registration information of the UE on the network, and/or periodically signaling the state of the UE from the UE to the network, and/or updating a specific parameter related to the UE on the network.

The UE may initiate the registration procedure at the time of having mobility across tracking areas (TAs). In other words, the UE may initiate the registration procedure in a case that the UE moves to a TA that is different from the TA indicated by a TA list (or registration area) held by the UE. Furthermore, the UE may initiate the present procedure in a case that the running back-off timer or any other timer expires. In addition, the UE may initiate the registration procedure in a case that a context of each apparatus needs to be updated due to disconnection and/or invalidation of a PDU session. Furthermore, in a case that there is a change in capability information and/or a preference, related to PDU session establishment of the UE, the UE may initiate the registration procedure. In addition, the UE may periodically initiate the registration procedure. Furthermore, the UE may initiate the registration procedure based on completion of the UE configuration update procedure, or based on completion of the registration procedure, or based on completion of the PDU session establishment procedure, or based on completion of the PDU session management procedure, or based on information received from the network in each procedure, or based on expiry or stop of the back-off timer. Note that the UE is not limited to this configuration, and can perform the registration procedure at any timing.

Note that the above-described procedure for the UE to transition from a state of not being registered with the network to a state of being registered with the network may be considered to be an initial registration procedure or a registration procedure for initial registration, and the registration procedure performed for the UE being registered with the network may be considered to be a registration procedure for mobility and periodic registration update or a mobility and periodic registration procedure.

Figure 6:
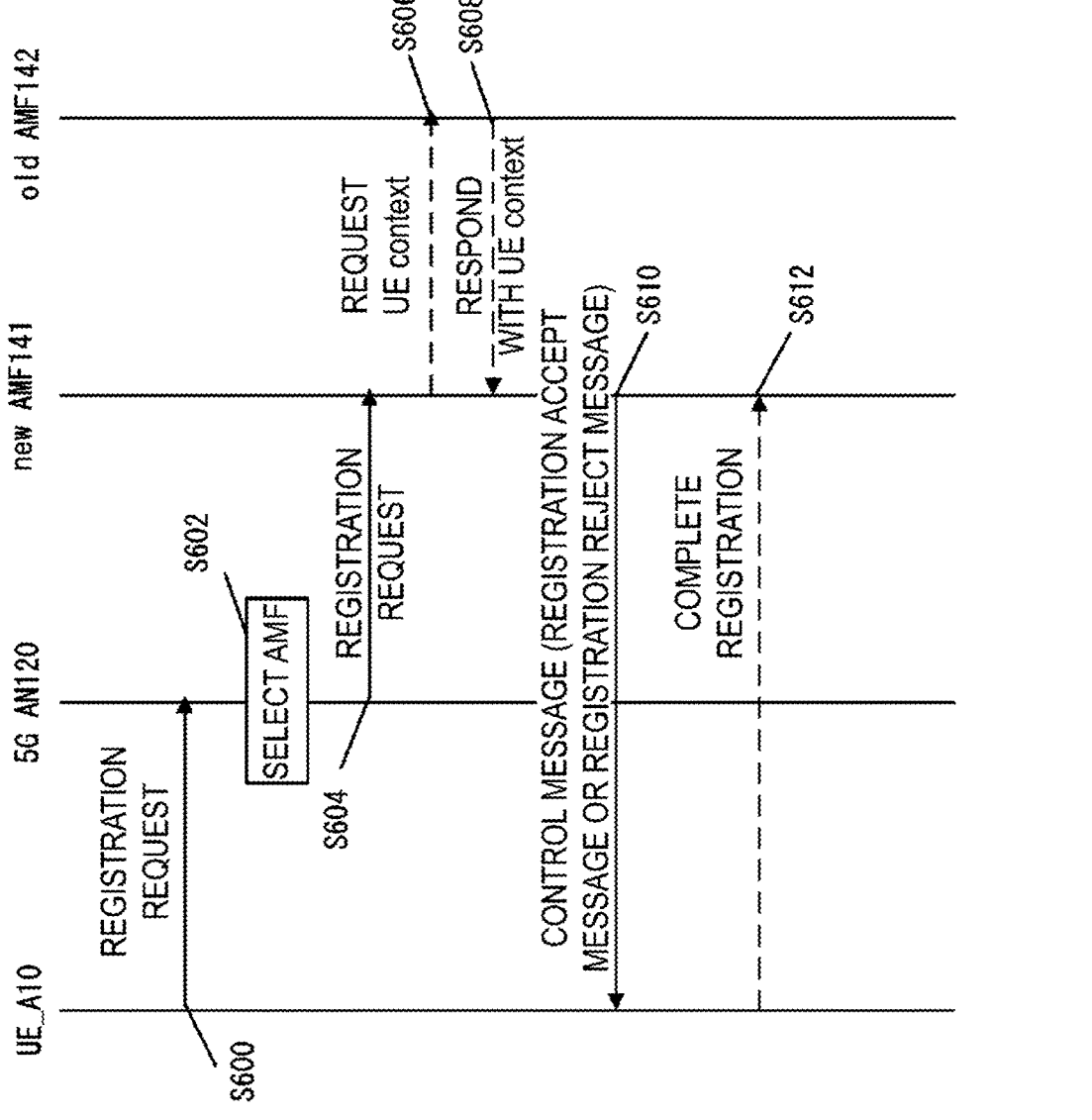
FIG. 6 is a diagram illustrating a registration procedure.

A new AMF 141 in FIG. 6 indicates an AMF with which the UE_A 10 is registered through the present procedure, and an old AMF 142 means an AMF with which the UE has been registered in a procedure before the present procedure. In a case that no change in AMF occurs in the present procedure, an interface between the old AMF 142 and the new AMF 141 and a procedure between the old AMF 142 and the new AMF 141 do not occur, and the new AMF 141 may be the same apparatus as the old AMF 142. In the present embodiment, a description of the AMF may mean the new AMF 141, the old AMF 142, or both. Note that the new AMF 141 and the old AMF 142 may be AMFs 140.

First, the UE_A 10 initiates the registration procedure by transmitting a registration request message to the new AMF 141 (S600), (S602), and (S604). Specifically, the UE transmits an RRC message including the registration request message to the 5G AN 120 (or the gNB) (S600). Moreover, the registration request message is a NAS message transmitted and/or received over the N1 interface. In addition, the RRC message may be a control message transmitted and/or received between the UE and the 5G AN 120 (or the gNB). In addition, the NAS message is processed in the NAS layer, and the RRC message is processed in the RRC layer. Note that the NAS layer is a layer higher than the RRC layer.

Here, the UE_A 10 can include and transmit one or multiple pieces of identification information of at least the first and the second identification information in the registration request message and/or the RRC message. Furthermore, the UE_A 10 may include identification information indicating the type of the present procedure in the registration request message and/or the RRC message and transmit the identification information. Here, the identification information indicating the type of the present procedure may be a 5GS registration type IE, and may be information indicating that the present procedure is the registration procedure performed for initial registration, or for update of the registration information associated with movement, or for periodic update of the registration information, or for registration at the time of emergency.

The UE_A 10 may include UE capability information in a registration request message to signal the functions supported by the UE_A 10 to the network. Here, the UE capability information may be 5GMM capability in the 5GS.

The UE_A 10 may include the identification information in a control message that is different from the above messages, for example, a control message of a lower layer than the RRC layer (e.g., a MAC layer, an RLC layer, or a PDCP layer) and transmit the message. Note that the UE_A 10 may indicate that the UE_A 10 supports each function, may indicate a request of the UE, or may indicate both, by transmitting these pieces of identification information. Furthermore, in a case that multiple pieces of identification information are transmitted and/or received, two or more pieces of identification information of these pieces of identification information may be configured as one or multiple pieces of identification information. Note that information indicating support of each function and information indicating a request for use of each function may be transmitted and/or received as the same piece of identification information, or may be transmitted and/or received as different pieces of identification information.

Note that the UE_A 10 may select or determine whether to transmit the first and second identification information to the network based on the UE capability information and/or the UE policy and/or the UE state and/or the registration information of the user and/or a context held in the UE and/or the like.

The UE_A 10 may transmit the second identification information in a case that the UE has a function to manage the maximum number of UE connected to a slice, or requests at least one piece of S-NSSAI that requires to be managed for management of the maximum number of UE connected to a slice. By transmitting the second identification information, the UE_A 10 may signal the fact that the UE includes a function to store the first NSSAI to the network.

Furthermore, in a case that the UE_A 10 includes an NSSAA function, or requests at least one piece of S-NSSAI for identifying a slice that requires NSSAA, the UE may include capability information indicating that the UE supports the NSSAA function in the registration request message and transmit the message. By transmitting the capability information indicating that the UE_A 10 supports the NSSAA function, the UE may request the network to treat the UE as UE with the NSSAA function and to perform an authentication and authorization procedure based on the NSSAA function in the procedure related to the UE.

In a case that the UE stores "allowed NSSAI associated with the PLMN requested by the UE and the access type requested by the UE" and/or the UE stores "configured NSSAI for the requested PLMN" and/or the UE stores "default configured NSSAI", the UE may include the first identification information in the registration request message and transmit the message to the requested PLMN.

Alternatively, in a case that the UE stores "allowed NSSAI associated with a PLMN that is different from the PLMN requested by the UE and the access type requested by the UE", and the allowed NSSAI or TAI included in a registration area associated with the S-NSSAI included in the allowed NSSAI belongs to the PLMN requested by the UE, the UE may include the first identification information in the registration request message and transmit the message to the requested PLMN.

The UE_A 10 may determine information included in the first identification information based on one or multiple pieces of NSSAI stored in the UE. The one or multiple pieces of NSSAI stored in the UE may be, for example, allowed NSSAI associated with the requested PLMN and the requested access type and/or configured NSSAI associated with the requested PLMN and/or default configured NSSAI and/or rejected NSSAI associated with the requested PLMN. Additionally or alternatively, the one or multiple pieces of NSSAI stored in the UE may be pending NSSAI and/or the first NSSAI, or may be rejected NSSAI that is not associated with the requested PLMN.

Additionally or alternatively, the one or multiple pieces of NSSAI stored in the UE may be allowed NSSAI associated with a PLMN other than the PLMN requested by the UE and the access type requested by the UE and/or access type and/or second rejected NSSAI associated with a PLMN other than the requested PLMN and the current registration area. Furthermore, the UE_A 10 may also store the mapped S-NSSAI of the S-NSSAI included in each piece of the NSSAI stored in the UE.

The UE may select one or multiple pieces of S-NSSAI from the stored allowed NSSAI and/or configured NSSAI, and include the S-NSSAI in the first identification information and transmit the information.

To be specific, in a case that the UE_A 10 stores the allowed NSSAI associated with the requested PLMN and the requested access type, the UE_A 10 may include the allowed NSSAI or one or multiple pieces of S-NSSAI included in the allowed NSSAI in the first identification information and transmit the information.

Additionally or alternatively, in a case that the UE_A 10 stores the configured NSSAI associated with the requested PLMN, the UE_A 10 may include the configured NSSAI or one or multiple pieces of S-NSSAI included in the configured NSSAI in the first identification information and transmit the information.

Furthermore, in a case that the UE_A 10 stores the list of the mapped S-NSSAI of the configured NSSAI associated with the requested PLMN, the UE_A 10 may include the mapped S-NSSAI included in the list of the mapped S-NSSAI of the configured NSSAI in the first identification information and transmit the information as the mapped S-NSSAI of the S-NSSAI included in the first identification information.

In other words, at the time of roaming, the UE_A 10 may include the S-NSSAI of the current PLMN or SNPN and the mapped S-NSSAI of the HPLMN or HSNPN in the registration request message in the first identification information and transmit the information.

Additionally or alternatively, in a case that the UE_A 10 stores "allowed NSSAI associated with a PLMN other than the requested PLMN and the requested access type", and in a case that the TAI included in a registration area (TAI list) associated with the allowed NSSAI or the S-NSSAI included in the allowed NSSAI is further associated with the requested PLMN, the UE_A 10 may include the allowed NSSAI or one or multiple pieces of S-NSSAI included in the allowed NSSAI and in the first identification information and transmit the information.

In other words, the UE_A 10 may include, in the first identification information, "the S-NSSAI included in the allowed NSSAI associated with the PLMN other than the requested PLMN and the registration area" or "the S-NSSAI associated with the registration area included in the allowed NSSAI associated with the PLMN other than the requested PLMN" stored in the UE, and at least one TAI included in this registration area may belong to the first PLMN.

The first identification information may include one or multiple pieces of the S-NSSAI. However, the UE_A 10 may perform control such that one or multiple pieces of the S-NSSAI included in the first identification information do not overlap.

Furthermore, in a case that rejected NSSAI is stored in the PLMN requested by the UE_A 10, the UE_A 10 may transmit the S-NSSAI included in the rejected NSSAI without including the S-NSSAI in the first identification information.

Specifically, in a case that the UE_A 10 stores "first rejected NSSAI associated with the requested PLMN", the UE_A 10 may transmit the S-NSSAI included in the first rejected NSSAI without including the S-NSSAI in the first identification information. In other words, the UE_A 10 may perform control such that the one or multiple pieces of S-NSSAI included in the first identification information are not the S-NSSAI included in the "first rejected NSSAI associated with the requested PLMN" stored in the UE.

However, in a case that the UE_A 10 also stores the list of mapped S-NSSAI of the "first rejected NSSAI associated with the requested PLMN", and that one or multiple pieces of mapped S-NSSAI that is not included in the list of mapped S-NSSAI of the first rejected NSSAI but included in the list of mapped S-NSSAI of the configured NSSAI are stored, the UE_A 10 may perform control such that the S-NSSAI of the current PLMN or SNPN to which the mapped S-NSSAI is mapped can be included in the first identification information.

In other words, in a case that the UE_A 10 does not store the mapped S-NSSAI of the first rejected NSSAI and stores the first rejected NSSAI, the S-NSSAI of the current PLMN or SNPN included in the registration request message may be controlled by the UE_A 10 such that the S-NSSAI is not included in the first rejected NSSAI stored by the UE_A 10.

Furthermore, in a case that the UE_A 10 stores the first rejected NSSAI together with the mapped S-NSSAI of the first rejected NSSAI during roaming, and further in a case that the UE_A 10 stores mapped S-NSSAI that is not included in the mapped S-NSSAI of the first rejected NSSAI stored by the UE_A 10 but included in the list of mapped S-NSSAI of the configured NSSAI, the UE_A 10 may perform control such that the S-NSSAI of the current PLMN or SNPN included in the registration request message may be S-NSSAI included in the first rejected NSSAI stored by the UE_A 10.

Note that, in a case that the UE_A 10 stores the first rejected NSSAI together with the mapped S-NSSAI of the first rejected NSSAI during roaming, the mapped S-NSSAI included in the registration request message may be controlled by the UE_A 10 such that the mapped S-NSSAI is mapped S-NSSAI not included in the list of the mapped S-NSSAI of the first rejected NSSAI stored by the UE_A 10.

Furthermore, in a case that the UE_A 10 stores at least one piece of "second rejected NSSAI associated with the requested PLMN or EPLMN and the current registration area", the UE_A 10 may transmit the S-NSSAI included in the second rejected NSSAI without including the S-NSSAI in the first identification information. In other words, the UE_A 10 may perform control such that the one or multiple pieces of the S-NSSAI included in the first identification information are not the S-NSSAI included in the "second rejected NSSAI associated with the requested PLMN or EPLMN and the current registration area" stored in the UE_A 10.

In a case that the information indicating the current registration area stored in the UE_A 10 includes the TAI belonging to one or multiple PLMNs different from the requested PLMN, the one or multiple different PLMNs may be EPLMNs of the requested PLMN, and the UE_A 10 may perform control such that the one or multiple pieces of S-NSSAI included in the first identification information are not the S-NSSAI included in the "second rejected NSSAI associated with one PLMN of the one or multiple different PLMNs and the current registration area" stored in the UE_A 10.

In other words, in a case that the information indicating the current registration area stored in the UE_A 10 includes the TAI belonging to one or multiple PLMNs different from the requested PLMN, the UE_A 10 may not include the S-NSSAI included in each piece of the "second rejected NSSAI associated with one PLMN of the different one or multiple PLMNs and the current registration area" in the first identification information.

However, in a case that the UE_A 10 also stores the list of mapped S-NSSAI of the "second rejected NSSAI associated with the requested PLMN or EPLMN and the current registration area", and that one or multiple pieces of mapped S-NSSAI that is not included in the list of mapped S-NSSAI of the second rejected NSSAI but is included in the list of mapped S-NSSAI of the configured NSSAI are stored, the UE_A 10 may perform control such that the S-NSSAI of the current PLMN or SNPN to which the mapped S-NSSAI is mapped can be included in the first identification information.

In other words, in a case that the UE_A 10 does not store the mapped S-NSSAI of the second rejected NSSAI and stores the second rejected NSSAI, the S-NSSAI of the current PLMN or SNPN included in the registration request message may be controlled by the UE_A 10 such that the S-NSSAI is not included in the second rejected NSSAI stored in the UE_A 10.

Furthermore, in a case that the UE_A 10 stores the second rejected NSSAI together with the mapped S-NSSAI of the second rejected NSSAI during roaming, and further in a case that the UE_A 10 stores mapped S-NSSAI that is not included in the mapped S-NSSAI of the second rejected NSSAI stored in the UE_A 10 but is included in the list of mapped S-NSSAI of the configured NSSAI, the UE_A 10 may perform control such that the S-NSSAI of the current PLMN or SNPN included in the registration request message may be S-NSSAI included in the second rejected NSSAI stored in the UE_A 10.

Note that, in a case that the UE_A 10 stores the second rejected NSSAI together with the mapped S-NSSAI of the second rejected NSSAI during roaming, the mapped S-NS-SAI included in the registration request message may be controlled by the UE_A 10 such that the mapped S-NSSAI is mapped S-NSSAI not included in the list of the mapped S-NSSAI of the second rejected NSSAI stored in the UE_A 10.

Furthermore, in a case that the UE_A 10 stores "third rejected NSSAI associated with the requested PLMN", the UE_A 10 may transmit the S-NSSAI included in the third rejected NSSAI without including the S-NSSAI in the first identification information. In other words, the UE_A 10 may perform control such that the one or multiple pieces of S-NSSAI included in the first identification information are not the S-NSSAI included in the "third rejected NSSAI associated with the requested PLMN" stored in the UE_A 10.

Furthermore, in a case that the UE_A 10 stores at least one piece of the "third rejected NSSAI associated with the EPLMN of the requested PLMN", the UE_A 10 may transmit the S-NSSAI included in the third rejected NSSAI without including the S-NSSAI in the first identification information. In other words, the UE_A 10 may perform control such that the one or multiple pieces of S-NSSAI included in the first identification information are not the S-NSSAI included in each piece of the "third rejected NSSAI associated with the EPLMN of the requested PLMN" stored in the UE_A 10.

Furthermore, in a case that the UE_A 10 stores "third rejected NSSAI valid for all PLMNs", the UE_A 10 may transmit the S-NSSAI included in the third rejected NSSAI, or the S-NSSAI to which the S-NSSAI is mapped, or the S-NSSAI associated with the S-NSSAI, or the mapped S-NSSAI of the S-NSSAI without including the S-NSSAI in the first identification information. In other words, the UE_A 10 may perform control such that one or multiple pieces of S-NSSAI included in the first identification information are not the S-NSSAI included in each piece of the "third rejected NSSAI valid for all PLMNs" stored in the UE_A 10, or the S-NSSAI to which the S-NSSAI is mapped, or the S-NSSAI associated with the S-NSSAI, or the mapped S-NSSAI of the S-NSSAI. Note that the "third rejected NSSAI valid for all PLMNs" may mean third rejected NSSAI that is not associated with the PLMNs or may mean third rejected NSSAI associated with the HPLMN.

Hereinafter, a method of controlling the S-NSSAI and/or the mapped S-NSSAI included in the first identification information and/or a method of generating the first identification information in a case that the UE_A 10 stores at least one of the first to third rejected NSSAI will be collectively described. Note that, the first to third rejected NSSAI may herein mean first to third rejected NSSAI associated with a requested PLMN or EPLMN.

In a case that first UE_A 10 stores neither the mapped S-NSSAI of the first rejected NSSAI nor the mapped S-NS-SAI of the second rejected NSSAI, the UE_A 10 may perform control such that the S-NSSAI of the current PLMN or SNPN included in a registration request message is included in neither the first rejected NS SAI nor the second rejected NSSAI.

Furthermore, in a case that the UE_A 10 is roaming, in a case that the UE_A 10 stores the mapped S-NSSAI of the first rejected NSSAI or the mapped S-NSSAI of the second rejected NSSAI, and further in a case that the UE_A 10 stores the mapped S-NSSAI that is included neither in the list of the mapped S-NSSAI of the first rejected NSSAI stored in the UE_A 10 nor in the list of the mapped S-NSSAI of the second rejected NSSAI stored in the UE_A 10 but is included in the list of the mapped S-NSSAI of the configured NSSAI, the UE_A 10 may perform control such that the S-NSSAI of the current PLMN or SNPN included in the registration request message is included in the first rejected NSSAI or the second rejected NSSAI stored in the UE_A 10.

Further, regardless of whether the UE_A 10 stores the mapped S-NSSAI of the first rejected NSSAI or the mapped S-NSSAI of the second rejected NSSAI, the UE_A 10 may perform control such that the S-NSSAI of the current PLMN or SNPN include in the registration request message is not be included in the third rejected NSSAI.

In other words, the UE_A 10 may perform control such that the S-NSSAI of the current PLMN and/or SNPN included in the registration request message is included in neither the first rejected NSSAI stored in the UE_A 10 nor the second rejected NSSAI stored in the UE_A 10 nor the third rejected NSSAI stored in the UE_A 10. However, in a case that the UE_A 10 is roaming, in a case that the UE_A 10 stores the mapped S-NSSAI of the first rejected NSSAI and/or the mapped S-NS SAI of the second rejected NS SAI, and further in a case that the UE_A 10 stores the mapped S-NSSAI that is included neither in the list of the mapped S-NSSAI of the first rejected NSSAI stored in the UE_A 10 nor in the list of the mapped S-NSSAI of the second rejected NSSAI stored in the UE_A 10 but is included in the list of the mapped S-NSSAI of the configured NSSAI, the UE_A 10 may perform control such that the S-NSSAI of the current PLMN or SNPN to which the mapped S-NSSAI is mapped can be included in the registration request message.

The S-NSSAI of the current PLMN or SNPN to which the mapped S-NSSAI is mapped may mean S-NSSAI of the current PLMN or SNPN that is mapped to the mapped S-NSSAI.

Performing control such that the S-NSSAI of the current PLMN or SNPN mapped to the mapped S-NSSAI can be included in the registration request message means that the S-NSSAI of the current PLMN or SNPN mapped to the mapped S-NSSAI is stored and/or managed as available S-NSSAI.

In addition, in a case that the UE_A 10 is roaming, in a case that the UE_A 10 stores the mapped S-NSSAI of the first rejected NSSAI and/or the mapped S-NSSAI of the second rejected NSSAI, and further in a case that the UE_A 10 stores the mapped S-NSSAI that is included neither in the list of the mapped S-NSSAI of the first rejected NSSAI stored in the UE_A 10 nor in the list of the mapped S-NSSAI of the second rejected NSSAI stored in the UE_A 10 but is included in the list of the mapped S-NSSAI of the configured NSSAI, the UE_A 10 may perform control such that S-NSSAI of the current PLMN or SNPN to which the mapped S-NSSAI is mapped can be included in the registration request message along with the mapped S-NSSAI.

Note that, in a case that the UE_A 10 is roaming, in a case that the UE_A 10 stores the mapped S-NSSAI of the first rejected NSSAI and/or the mapped S-NSSAI of the second rejected NSSAI, the UE_A 10 may perform control such that the mapped S-NSSAI included in the registration request message is mapped S-NSSAI that is included neither in the list of the mapped S-NSSAI of the first rejected NSSAI stored in the UE_A 10 nor in the list of the mapped S-NSSAI of the second rejected NSSAI stored in the UE_A 10.

Furthermore, in a case that the UE stores the "pending NSSAI associated with the requested PLMN", the UE may transmit the S-NSSAI included in the pending NSSAI without including the S-NSSAI in the first identification information. In other words, the UE may perform control such that the one or multiple pieces of S-NSSAI included in the first identification information are not the S-NSSAI included in the "pending associated with the requested PLMN" stored in the UE.

Furthermore, in a case that the UE stores at least one piece of the "pending NSSAI associated with the EPLMN of the requested PLMN", the UE may transmit the S-NSSAI included in the pending NSSAI without including the S-NS-SAI in the first identification information. In other words, the UE may perform control such that the one or multiple pieces of S-NSSAI included in the first identification information are not the S-NSSAI included in each piece of the "pending NSSAI associated with the EPLMN of the requested PLMN".

However, in a case that the UE_A 10 also stores the list of the mapped S-NSSAI of the "pending NSSAI associated with the requested PLMN or EPLMN" ("pending NSSAI" below) and one or multiple pieces of mapped S-NSSAI that is not included in the list of mapped S-NSSAI of the pending NSSAI but is included in the list of mapped S-NSSAI of the configured NSSAI are stored, the UE_A 10 may perform control such that the S-NSSAI of the current PLMN or SNPN to which the mapped S-NSSAI is mapped can be included in the first identification information.

In other words, in a case that the UE_A 10 does not store the mapped S-NSSAI of the pending NSSAI but stores the pending NSSAI, the UE_A 10 may control such that the S-NSSAI of the current PLMN or SNPN included in the registration request message is the S-NSSAI not included in the pending NSSAI stored in the UE_A 10.

Furthermore, in a case that the UE_A 10 is roaming, in a case that the UE_A 10 stores the pending NSSAI together with the mapped S-NSSAI of the pending NSSAI, and further in a case that the UE_A 10 stores mapped S-NSSAI that is not included in the mapped S-NSSAI of the pending NSSAI stored in the UE_A 10 but is included in the list of the mapped S-NSSAI of the configured NSSAI, the UE_A 10 may perform control such that the S-NSSAI of the current PLMN or SNPN included in the registration request message may be S-NSSAI included in the pending NSSAI stored in the UE_A 10.

Note that, in a case that the UE_A 10 is roaming, in a case that the UE_A 10 stores the pending NSSAI together with the mapped S-NSSAI of the pending NSSAI, the UE_A 10 may perform control such that the mapped S-NSSAI included in the registration request message may be mapped S-NSSAI that is not included in the list of the mapped S-NSSAI of the pending NSSAI stored in the UE_A 10.

Furthermore, in a case that the UE stores "pending NSSAI valid for all PLMNs" (hereinafter, "pending NSSAI"), the UE may transmit the S-NSSAI included in the pending NSSAI, or the S-NSSAI to which the S-NSSAI is mapped, or the S-NSSAI associated with the S-NSSAI, or the mapped S-NSSAI of the S-NSSAI without including the S-NSSAI in the first identification information. In other words, the UE may perform control such that one or multiple pieces of S-NSSAI and/or the mapped S-NSSAI included in the first identification information are not the S-NSSAI included in each piece of the "pending NSSAI valid for all PLMNs", or the S-NSSAI to which the S-NSSAI is mapped, or the S-NSSAI associated with the S-NSSAI, or the mapped S-NSSAI of the S-NSSAI. Note that the "pending NSSAI valid for all PLMNs" may mean pending NSSAI that is not associated with the PLMNs or may mean pending NSSAI is associated with the HPLMNs.

Hereinafter, a method of controlling the S-NSSAI and/or the mapped S-NSSAI included in the first identification information and/or a method of generating the first identification information in a case that the UE_A 10 stores S-NSSAI in at least one of the first to third rejected NSSAI and the pending NSSAI will be collectively described. Note that the first to third rejected NSSAI and the pending NSSAI may mean the first to third rejected NSSAI and the pending NSSAI associated with the requested PLMN or EPLMN.

In a case that the UE_A 10 stores neither the mapped S-NSSAI of the first rejected NSSAI nor the mapped S-NS-SAI of the second rejected NSSAI nor the mapped S-NSSAI of the pending NSSAI, the UE_A 10 may perform control such that the S-NSSAI of the current PLMN or SNPN included in a registration request message is included in neither the first rejected NSSAI nor the second rejected NSSAI nor the pending NSSAI.

Furthermore, in a case that the UE_A 10 stores the mapped S-NSSAI of the first rejected NSSAI and/or the mapped S-NSSAI of the second rejected NSSAI and/or the mapped S-NSSAI of the pending NSSAI, and further in a case that the UE_A 10 stores the mapped S-NSSAI that is included neither in list of the mapped S-NSSAI of the first rejected NSSAI stored in the UE_A 10 nor in the list of the mapped S-NSSAI of the second rejected NSSAI stored in the UE_A 10 nor in the list of the mapped S-NSSAI of the pending NSSAI stored in the UE_A 10 but is included in the list of the mapped S-NSSAI of the configured NSSAI, the UE_A 10 may perform control such that the S-NSSAI of the current PLMN or SNPN in the registration request message may be included in the first rejected NSSAI or the second rejected NSSAI or the pending NSSAI.

In other words, the UE_A 10 may perform control such that the S-NSSAI of the current PLMN or SNPN included in the registration request message is included neither in the first rejected NSSAI nor the second rejected NSSAI nor the third rejected NSSAI, nor the pending NSSAI. However, in a case that the UE_A 10 is roaming, in a case that the UE_A 10 stores the mapped S-NSSAI of the first rejected NSSAI or the mapped S-NSSAI of the second rejected NSSAI or the list of the mapped S-NSSAI of the pending NSSAI, and further in a case that the UE_A 10 stores the mapped S-NSSAI that is included neither in the list of the mapped S-NSSAI of the first rejected NSSAI stored in the UE_A 10 nor in the list of the mapped S-NSSAI of the second rejected NSSAI stored in the UE_A 10 nor in the list of the mapped S-NSSAI of the pending NSSAI stored in the UE_A 10 but is included in the list of the mapped S-NSSAI of the configured NSSAI, the UE_A 10 may perform control such that the S-NSSAI of the current PLMN or SNPN to which the mapped S-NSSAI is mapped can be included in the registration request message.

The S-NSSAI of the current PLMN or SNPN to which the mapped S-NSSAI is mapped may mean S-NSSAI of the current PLMN or SNPN that is mapped to the mapped S-NSSAI.

Performing control such that the S-NSSAI of the current PLMN or SNPN mapped to the mapped S-NSSAI can be included in the registration request message means that the S-NSSAI of the current PLMN or SNPN mapped to the mapped S-NSSAI is stored and/or managed as available S-NSSAI.

However, in a case that the UE_A 10 is roaming, in a case that the UE_A 10 stores the mapped S-NSSAI of the first rejected NSSAI or the mapped S-NSSAI of the second rejected NSSAI or the list of the mapped S-NSSAI of the pending NSSAI, and further in a case that the UE_A 10 stores the mapped S-NSSAI that is included neither in the list of the mapped S-NSSAI of the first rejected NSSAI stored in the UE_A 10 nor in the list of the mapped S-NSSAI of the second rejected NSSAI stored in the UE_A 10 nor in the list of the mapped S-NSSAI of the pending NSSAI stored in the UE_A 10 but is included in the list of the mapped S-NSSAI of the configured NSSAI, the UE_A 10 may perform control such that the S-NSSAI of the current PLMN or SNPN to which the mapped S-NSSAI is mapped can be included in the registration request message together with the mapped S-NSSAI.

Note that, in a case that the UE_A 10 is roaming, in a case that the UE_A 10 stores the mapped S-NSSAI of the first rejected NSSAI and/or the mapped S-NSSAI of the second rejected NSSAI and/or the pending NSSAI, the UE_A 10 may perform control such that the mapped S-NSSAI included in the registration request message is mapped S-NSSAI that is included neither in the list of the mapped S-NSSAI of the first rejected NSSAI stored in the UE_A 10 nor the list of the mapped S-NSSAI of the second rejected NSSAI stored in the UE_A 10 nor the pending NSSAI stored in the UE_A 10.

Furthermore, in a case that the back-off timer associated with certain S-NSSAI is valid, in other words, the back-off timer is running, or until the back-off timer is stopped, the UE_A 10 may transmit the S-NSSAI or S-NSSAI related to the S-NSSAI without including the S-NSSAI in the first identification information. Specifically, in a case that the S-NSSAI with which the back-off timer is associated is the S-NSSAI associated with the requested PLMN or S-NSSAI included in NSSAI associated with the requested PLMN, the UE_A 10 may transmit the S-NSSAI without including the S-NSSAI in the first identification information during counting of the back-off timer or until the back-off timer expires or stops.

Hereinafter, a case that a back-off timer associated with S-NSSAI included in the first NSSAI is valid and/or the back-off timer is running may mean that the S-NSSAI is valid and/or the first NSSAI is valid.

Furthermore, in a case that the UE_A 10 stores a list of mapped S-NSSAI of the first NSSAI, that the first NSSAI is valid may also mean that the list of mapped S-NSSAI of the first NSSAI and the mapped S-NSSAIs of the first NSSAI are valid.

In a case that the first NSSAI and/or the list of the mapped S-NSSAI of the first NSSAI is managed by the UE_A 10 regardless of whether the back-off timer is running, the valid first NSSAI and/or the list of the mapped S-NSSAI of the valid first NSSAI may be first NSSAI stored in the UE_A 10 and/or a list of the mapped S-NSSAI of the first NSSAI stored in the UE_A 10.

Alternatively, in a case that the S-NSSAI with which the back-off timer is associated is associated with the HPLMN, the UE_A 10 may transmit the S-NSSAI of the requested PLMN to which the S-NSSAI is mapped without including the S-NSSAI in the first identification information. Note that, the fact that the S-NSSAI with which the back-off timer is associated is associated with the HPLMN may mean that the back-off timer is valid for all PLMNs or may mean that the back-off timer is not associated with a PLMN.

Furthermore, in a case that the UE stores "first NSSAI associated with the requested PLMN", the UE may transmit the S-NSSAI included in the first NSSAI without including the S-NSSAI in the first identification information. In other words, the UE may perform control such that one or multiple pieces of S-NSSAI included in the first identification information are not the S-NSSAI included in the "first NSSAI associated with the requested PLMN" stored in the UE.

Furthermore, in a case that the UE stores at least one piece of the "first NSSAI associated with the EPLMN of the requested PLMN", the UE may transmit the S-NSSAI included in the first NSSAI without including the S-NSSAI in the first identification information. In other words, the UE may perform control such that the one or multiple pieces of S-NSSAI included in the first identification information are not the S-NSSAI included in each piece of the "first NSSAI associated with the EPLMN of the requested PLMN".

Furthermore, in a case that the UE stores "first NSSAI valid for all PLMNs", the UE may transmit the S-NSSAI included in the first NSSAI or the S-NSSAI to which the S-NSSAI is mapped without including the S-NSSAI in the first identification information. In other words, the UE may perform control such that one or multiple pieces of S-NSSAI included in the first identification information are not the S-NSSAI included in each piece of the "first NSSAI valid for all PLMNs" or the S-NSSAI to which the S-NSSAI is mapped. Note that the "first NSSAI valid for all PLMNs" may mean first NSSAI that is not associated with the PLMNs or may mean first NSSAI associated with the HPLMN.

In a case that rejected NSSAI and/or pending NSSAI and/or the first NSSAI includes the S-NSSAI of the HPLMN during roaming, the UE_A 10 may perform control such that the one or multiple pieces of S-NSSAI included in the first identification information do not include the S-NSSAI of the HPLMN included in the rejected NS SAI and/or the pending NSSAI and/or the first NSSAI stored in the UE_A 10 as mapped S-NSSAI. In other words, the UE_A 10 may perform control such that the S-NSSAI of the current PLMN to which the S-NSSAI included in the rejected NSSAI and/or the pending NSSAI and/or the first NSSAI is mapped is not included in the first identification information.

Furthermore, in other words, for the S-NSSAI included in the first identification information generated by the UE_A 10, mapped S-NSSAI of the S-NSSAI is not included in the rejected NSSAI, and/or the pending NSSAI, and/or the first NSSAI stored in the UE_A 10. Here, the rejected NSSAI may be at least one of the first to third rejected NSSAI or may include the S-NSSAI of the HPLMN.

Furthermore, in a case that the UE_A 10 is roaming, in a case that the UE_A 10 stores mapped S-NSSAI of valid first NSSAI, and further in a case that the UE_A 10 stores mapped S-NSSAI that is not included in a list of the mapped S-NSSAI of first rejected NSSAI stored in the UE_A 10 but is included in the list of the mapped S-NSSAI of the configured NSSAI, the UE_A 10 may perform control such that the S-NSSAI of the current PLMN or SNPN included in the registration request message may be included in the first NSSAI.

In other words, the UE_A 10 may perform control such that the S-NSSAI of the current PLMN or SNPN included in the registration request message is not included in the first NSSAI. However, in a case that the UE_A 10 is roaming, in a case that the UE_A 10 stores the list of the mapped S-NSSAI of the first NSSAI, and further in a case that the UE_A 10 stores mapped S-NSSAI that is not included in the list of the mapped S-NSSAI of the first NSSAI stored in the UE_A 10 but is included in the list of the mapped S-NSSAI of the configured NSSAI, the UE may perform control such that the S-NSSAI of the current PLMN or SNPN to which the mapped S-NSSAI is mapped can be included in the registration request message.

The S-NSSAI of the current PLMN or SNPN to which the mapped S-NSSAI is mapped may mean S-NSSAI of the current PLMN or SNPN that is mapped to the mapped S-NSSAI.

Performing control such that the S-NSSAI of the current PLMN or SNPN mapped to the mapped S-NSSAI can be included in the registration request message means that the S-NSSAI of the current PLMN or SNPN mapped to the mapped S-NSSAI is stored and/or managed as available S-NSSAI.

In addition, in a case that the UE_A 10 is roaming, in a case that the UE_A 10 stores the list of the mapped S-NSSAI of the first NSSAI, and further in a case that the UE_A 10 stores mapped S-NSSAI that is not included in the list of the mapped S-NSSAI of the first NSSAI stored in the UE_A 10 but is included in the list of the mapped S-NSSAI of the configured NSSAI, the UE may perform control such that the S-NSSAI of the current PLMN or SNPN to which the mapped S-NSSAI is mapped can be included in the registration request message together with the mapped S-NSSAI. The UE_A 10 may include identification information other than the first and second identification information in the registration request message and/or the RRC message including the registration request message, and may include and transmit, for example, the UE ID and/or the PLMN ID and/or AMF identification information. Here, the AMF identification information may be information for identifying the AMF or a set of AMFs, for example, a 5G S-Temporary Mobile Subscription Identifier (5G S-TMSI) or a Globally Unique AMF Identifier (GUAMI).

In addition, the UE_A 10 may include and transmit an SM message (for example, a PDU session establishment request message) in the registration request message, or may transmit an SM message (for example, a PDU session establishment request message) together with the registration request message to thereby initiate a PDU session establishment procedure during the registration procedure.

In a case that the 5G AN 120 (or the gNB) receives an RRC message including the registration request message, then the 5G AN 120 (or the gNB) selects an AMF to transfer the registration request message (S602). Note that the 5G AN 120 (or the gNB) can select an AMF based on one or multiple pieces of identification information included in the registration request message and/or the RRC message including the registration request message. Specifically, the 5G AN (or the gNB) may select a new AMF as a transmission destination of the registration request message based on at least one piece of identification information included in the first and second identification information.

For example, the 5G AN 120 (or gNB) may select an AMF based on the first identification information. Specifically, the 5G AN (or gNB) may select an AMF included in the network slice identified by the S-NSSAI included in the first identification information or an AMF having connectivity to the network slice.

Furthermore, for example, the 5G AN 120 (or gNB) may select, based on the second identification information, an AMF including a function to manage the maximum number of UE connected to a slice and/or an AMF having connectivity to a network including the function to manage the maximum number of UE connected to a slice.

Note that the method of selecting an AMF is not limited to thereto and the 5G AN (or the gNB) may select an AMF based on other conditions. The 5G AN (or the gNB) extracts the registration request message from the received RRC message and transfers the registration request message to the selected new AMF (S604). Note that in a case that at least one piece of identification information of the first and second identification information is not included in the registration request message but is included in the RRC message, the identification information included in the RRC message may be transferred to the selected AMF (new AMF 141) together with the registration request message (S604).

In a case that the registration request message has been received, the new AMF 141 can perform first condition fulfillment determination. The first condition fulfillment determination is performed by the network (or the new AMF 141) to determine whether to accept the request from the UE. In a case that the first condition fulfillment determination is true, the new AMF 141 performs the procedure from S606 to S612. On the other hand, in a case that the first condition fulfillment determination is false, the new AMF 141 may skip the procedure from S606 to S608 and perform the procedure of S610.

Alternatively, the new AMF 141 may perform the first condition fulfillment determination after requesting a UE context from the old AMF 142 and then receiving the UE context from the old AMF 142 (S606 and S608). In that case, the new AMF 141 may perform S610 and/or S612 in a case that the first condition fulfillment determination is true. On the other hand, in a case that the first condition fulfillment determination is false, the new AMF 141 may perform S610.

Note that in this regard, in a case that the first condition fulfillment determination is true, the control message transmitted and received in S610 may be a registration accept message, and in a case that the first condition fulfillment determination is false, the control message transmitted and received in S610 may be a registration reject message.

Note that the first condition fulfillment determination may be performed based on reception of the registration request message, and/or each piece of identification information included in the registration request message, and/or subscriber information, and/or capability information of the network, and/or the operator policy, and/or a state of the network, and/or registration information of the user, and/or a context stored in the AMF, and/or the like.

For example, the first condition fulfillment determination may be true in a case that the network allows the request from the UE, and the first condition fulfillment determination may be false in a case that the network does not allow the request from the UE. In addition, in a case that a network with which the UE is to be registered and/or an apparatus in the network supports the function requested by the UE, the first condition fulfillment determination may be true, whereas in a case that the network and/or the apparatus does not support the function requested by the UE, the first condition fulfillment determination may be false. Furthermore, in a case that the transmitted and/or received identification information is allowed, the first condition fulfillment determination may be true, whereas in a case that the transmitted and/or received identification information is not allowed, the first condition fulfillment determination may be false.

In addition, in a case that the S-NSSAI included in the requested NSSAI received by the AMF from the UE is information for identifying a slice that requires the NSSAA procedure, and further in a case that the AMF stores that the result of the NSSAA procedure of the S-NSSAI for the UE is successful, the first condition fulfillment determination may be true. Alternatively, the first condition fulfillment determination may be false in a case that no S-NSSAI is allowed for the UE and that no allowed NSSAI is expected to be allocated to the UE in the future as well.

In addition, the first condition fulfillment determination may be true in a case that the S-NSSAI included in the requested NSSAI received by the AMF from the UE is information for identifying a slice requiring management of the maximum number of UE connected to the slice and further in a case that the maximum number of UE has not been reached. Alternatively, in a case that no S-NSSAI is allowed for the UE as well and in a case that the allowed NSSAI is expected to be allocated to the UE in the future, the first condition fulfillment determination may be true.

For the AMF, the first condition fulfillment determination may be true or may be false in a case that no S-NSSAI is allowed for the UE and that the first NSSAI is allocated to the UE.

The new AMF 141 performs the procedure of S606 and S608 in a case that the AMF indicated by the AMF identification information included in the message received by the new AMF 141 from the UE is the old AMF 142, and does not perform the procedure of S606 and S608 in a case that the AMF indicated by the AMF identification information included in the message received by the new AMF 141 from the UE_A 10 is the new AMF 141. In other words, the procedure of S606 and S608 is performed in a case that a change occurs in the AMF (AMF change) due to the present procedure, and the procedure of S606 and S608 is skipped in a case that no change occurs in the AMF.

A UE context transfer procedure will be described (S606 and S608). The new AMF 141 transmits a UE context request message to the old AMF 142 (S606). The old AMF 142 transmits the UE context to the new AMF 141 based on the received UE context request message. The new AMF 141 generates a UE context based on the received UE context.

Here, the UE context transmitted from the new AMF 141 to the old AMF 142 may include the UE ID and the allowed NSSAI. Furthermore, the UE context may include the configured NSSAI and/or rejected NSSAI, the NSSAI and/or pending NSSAI, and/or the first NSSAI. In addition, information as to whether signaling to the UE has been completed may be linked to the allowed NSSAI and/or the configured NSSAI and/or the rejected NSSAI and/or the pending NSSAI, and/or the first NSSAI included in the UE context and the S-NSSAI included in each piece of NSSAI.

In addition, the UE context may include information of the S-NSSAI that requires the NSSAA procedure, and/or information indicating authentication that the NSSAA procedure has completed for the UE is successful, and/or information indicating that the authentication has failed.

In addition, the UE context may include the information of the S-NSSAI requiring management of the maximum number of UE connected to a slice, and/or information indicating that the maximum number of UE has been reached, and/or information indicating whether the maximum number of UE connected to a slice has been reached.

Note that the information regarding the characteristics of the S-NSSAI may be managed as one piece of information, and specifically, the network may associate, with each piece of S-NSSAI, information indicating whether the NSSAA is required, whether the NSSAA is successful, whether the maximum number of UE connected to a slice requires to be managed, and whether the maximum number of UE connected to a slice has been reached to be stored.

The new AMF 141 may transmit the control message to the UE based on the determination of the first condition fulfillment determination and/or based on the UE context received from the old AMF 142 (S610). The control message may be a registration accept message, or may be a registration reject message.

The new AMF 141 may include one or multiple pieces of 10th identification information in the control message and transmit the message. Alternatively, the new AMF 141 may include one or multiple pieces of identification information of at least the 10th to the 16th identification information in the control message and transmit the message. Note that, by transmitting these pieces of identification information and/or the control message, the new AMF 141 may indicate that the network supports the functions, may indicate that the request from the UE has been accepted, may indicate that the request from the UE is not allowed, or may indicate information obtained by combining the above-described pieces of information. Furthermore, in a case that multiple pieces of identification information are transmitted and/or received, two or more pieces of identification information of these pieces of identification information may be configured as one or multiple pieces of identification information. Note that information indicating support of each function and information indicating a request for use of each function may be transmitted and/or received as the same pieces of identification information, or may be transmitted and/or received as different pieces of identification information.

In a case that the first identification information and/or the second identification information are received from the UE, the new AMF 141 may include at least one piece of identification information of the 10th to the 16th identification information in the control message and transmit the message.

Furthermore, the new AMF 141 may transmit at least one of the tenth to 16th identification information in a case that the configuration information of the UE has been updated.

The new AMF 141 may further transmit, to the UE_A 10, the configured NSSAI and/or the allowed NSSAI and/or the rejected NSSAI and/or the pending NSSAI and/or the first NSSAI by including them in the control message. Note that the message transmitted by the new AMF 141 to the UE may be based on information received from the UE. To be specific, the S-NSSAI included in the rejected NSSAI transmitted by the new AMF 141 to the UE may be the S-NSSAI included in the first identification information received from the UE.

Note that the 10th to the 16th identification information may be included in the allowed NSSAI, and/or the rejected NSSAI, and/or the pending NSSAI and/or the first NSSAI and transmitted, or may be NSSAI of the above-described NSSAI.

At the time of transmission of the control message, in a case that there is no S-NSSAI (allowed NSSAI) allowed for the UE, but there is a schedule to perform the NSSAA procedure after completion of or in parallel with the present procedure, or in a case that the NSSAA procedure is being performed between the UE and the network, or in a case that the pending NSSAI is included in the control message and transmitted, the new AMF 141 may include an empty value in the allowed NSSAI and transmit the allowed NSSAI.

At the time of transmission of the control message, in a case that there is no S-NSSAI (allowed NSSAI) allowed for the UE but the 10th identification information is included in the control message, or in a case that the first NSSAI is signaled to the UE before the present procedure, the new AMF 141 may include an empty value in the allowed NSSAI and transmit the allowed NSSAI.

In a case that the 13th identification information indicating application to all the PLMNs is included in the control message, the new AMF 141 may include the 15th identification information in the control message as well.

In a case that the rejected NSSAI is included in the control message by using an extended rejected NSSAI IE, the new AMF 141 may include the 16th identification information in the control message and transmit the control message. Alternatively, the new AMF 141 may include the 16th identification information in the extended rejected NSSAI IE and transmit the extended rejected NS SAI IE.

The UE_A 10 receives, from the network, the control message and/or one or multiple pieces of information of the 10th to the 16th identification information. More specifically, the UE receives, from the new AMF 141, the control message and/or one or multiple pieces of information of the 10th to the 16th identification information.

The UE_A 10 may recognize the received information based on the reception of at least one piece of information of the 10th to the 16th identification information. Specifically, the UE may perform storage and/or update of information about the NSSAI, and start and/or stop of a back-off timer, and details thereof are described in the NSSAI update procedure in section 3.5.

Since the maximum number of UE connected to each slice has been reached, the UE_A 10 may recognize a state in which the UE is temporarily prohibited from transmitting the MM message and/or the SM message using the S-NSSAI indicated by the 10th identification information, and/or the S-NSSAI indicated by the 14th identification information, and/or the S-NSSAI related to the mapped S-NSSAI indicated by the 16th identification information. Note that, here, the MM procedure may be a registration request message, and the SM message may be a PDU session establishment request message.

In addition, the UE_A 10 may appropriately store each piece of the received NSSAI. Furthermore, the stored information about the NS SAI of the UE_A 10 may be updated based on the received NSSAI. Furthermore, the information about the NSSAI stored in the UE_A 10 may be deleted and/or updated based on the state of the UE_A 10. The specific behavior of the method for updating the storage of the NSSAI by the UE_A 10 and the condition for updating are described in the NSSAI update procedure in section 3.5.

Note that the NSSAI update procedure in section 3.5 may be performed during the present procedure or after completion of the present procedure or may be performed based on completion of the present procedure after completion of the present procedure.

Note that the AMF may select and determine which identification information of the 10th to the 16th identification information is to be included in the control message based on each piece of received identification information, and/or subscriber information, and/or capability information of the network, and/or the operator policy, and/or a state of the network, and/or registration information of the user, and/or a context stored in the AMF, and/or the like.

In a case that the control message is a registration accept message, the AMF can either include an SM message (for example, a PDU session establishment accept message) in the registration accept message and transmit the message, or transmit an SM message (for example, a PDU session establishment accept message) together with the registration accept message. However, such a transmission method may be performed in a case that an SM message (for example, a PDU session establishment request message) is included in the registration request message. In addition, the transmission method may be performed in a case that the SM message (for example, the PDU session establishment request message) is transmitted along with the registration request message. By performing such a transmission method as described above, the AMF can indicate that a procedure for SM has been accepted in the registration procedure.

In addition, by transmitting a registration accept message based on each piece of the received identification information, and/or subscriber information, and/or capability information of the network, and/or the operator policy, and/or a state of the network, and/or the registration information of the user, and/or the context stored in the AMF, and/or the like, the AMF may indicate that the request from the UE has been accepted, or by transmitting a registration reject message, the AMF may indicate that the request from the UE has been rejected.

The UE receives the control message via the 5G AN (gNB) (S608). In a case that the control message is a registration accept message, then by receiving the registration accept message, the UE can recognize that the request from the UE on the registration request message has been accepted, and recognize the details of the various pieces of identification information included in the registration accept message. Alternatively, in a case that the control message is a registration reject message, then by receiving the registration reject message, the UE can recognize that the request from the UE using the registration request message has been rejected and recognize the details of the various pieces of identification information included in the registration reject message. In addition, in a case that the UE does not receive the control message even after a prescribed period of time has elapsed after transmitting the registration request message, the UE may recognize that the request from the UE has been rejected.

Furthermore, in a case that the control message is a registration accept message, the UE can further transmit to the AMF a registration complete message as a response message to the registration accept message via the 5G AN (gNB) (S610). Note that, in a case that the UE receives the SM message such as the PDU session establishment accept message, the UE may include the SM message such as the PDU session establishment completion message in the registration complete message and transmit the message, or may indicate that the procedure for SM has been completed by including the SM message. Here, although the registration complete message is a NAS message transmitted and/or received over the N1 interface, the registration complete message is transmitted and/or received between the UE and the 5G AN (gNB) by being included in an RRC message.

The AMF receives the registration complete message via the 5G AN (gNB) (S612). In addition, each apparatus completes the present procedure based on transmission and/or reception of the registration accept message and/or the registration complete message.

Alternatively, each apparatus may complete the registration procedure based on the transmission and/or the reception of the registration reject message.

Note that each apparatus may transition to or maintain a state in which the UE is registered with the network (an RM_REGISTERED state or a 5GMM-REGISTERED state) based on the transmission and/or reception of the registration accept message and/or the registration complete message or may transition to or maintain a state in which the UE is not registered with the network (an RM_DEREGIS-TERED state or a 5GMM-DEREGISTERED state) over the access in which the UE has received the registration reject message for the current PLMN based on the transmission and/or reception of the registration reject message. In addition, the transition of each apparatus to each state may be performed based on transmission and/or reception of the registration complete message and completion of the registration procedure.

Furthermore, each apparatus may perform processing based on information transmitted and/or received in the registration procedure, based on completion of the registration procedure. For example, in a case that information indicating that a part of the request from the UE has been rejected is transmitted and/or received, the reason for rejection of the request from the UE may be recognized. Furthermore, each apparatus may perform the present procedure again or may perform the registration procedure on the core network_A or another cell based on the reason for the rejection of the request from the UE.

Moreover, the UE may store the identification information received along with the registration accept message and/or the registration reject message or may recognize determination of the network based on the completion of the registration procedure.

Furthermore, the UE may delete stored one or multiple pieces of NSSAI based on completion of the registration procedure. Specifically, the UE_A 10 may delete the stored first rejected NSSAI and/or third rejected NSSAI and/or first NSSAI in a case that the UE_A 10 has transitioned to the deregistered state on both types of the access (the 3GPP access and the non-3GPP access) for the current PLMN based on completion of the present procedure.

Furthermore, the UE_A 10 may delete the second rejected NSSAI associated with the current PLMN, the current registration area, and/or the access type thereof in a case that the UE_A 10 has transitioned to the deregistered state on the access (the 3GPP access and the non-3GPP access) for the current PLMN based on the completion of the present procedure, or in a case that the UE_A 10 has successfully performed the registration procedure in a new registration area, or in a case that the UE_A 10 has transitioned to the deregistered state or the registered state on certain access as a result of performing the registration procedure in a new registration area.

Furthermore, each apparatus may initiate the registration procedure again based on the expiry or stop of the back-off timer.

Furthermore, each apparatus may initiate the registration procedure again based on the updating of the NSSAI to be stored.

Furthermore, each apparatus may initiate the SM procedure by transmitting and/or receiving the SM message based on a transition to or maintaining of a state in which the UE is registered with the network (RM_REGISTERED state or 5GMM-REGISTERED state).

3.2. Network Slice-Specific Authentication and Authorization Procedure

Figure 7:
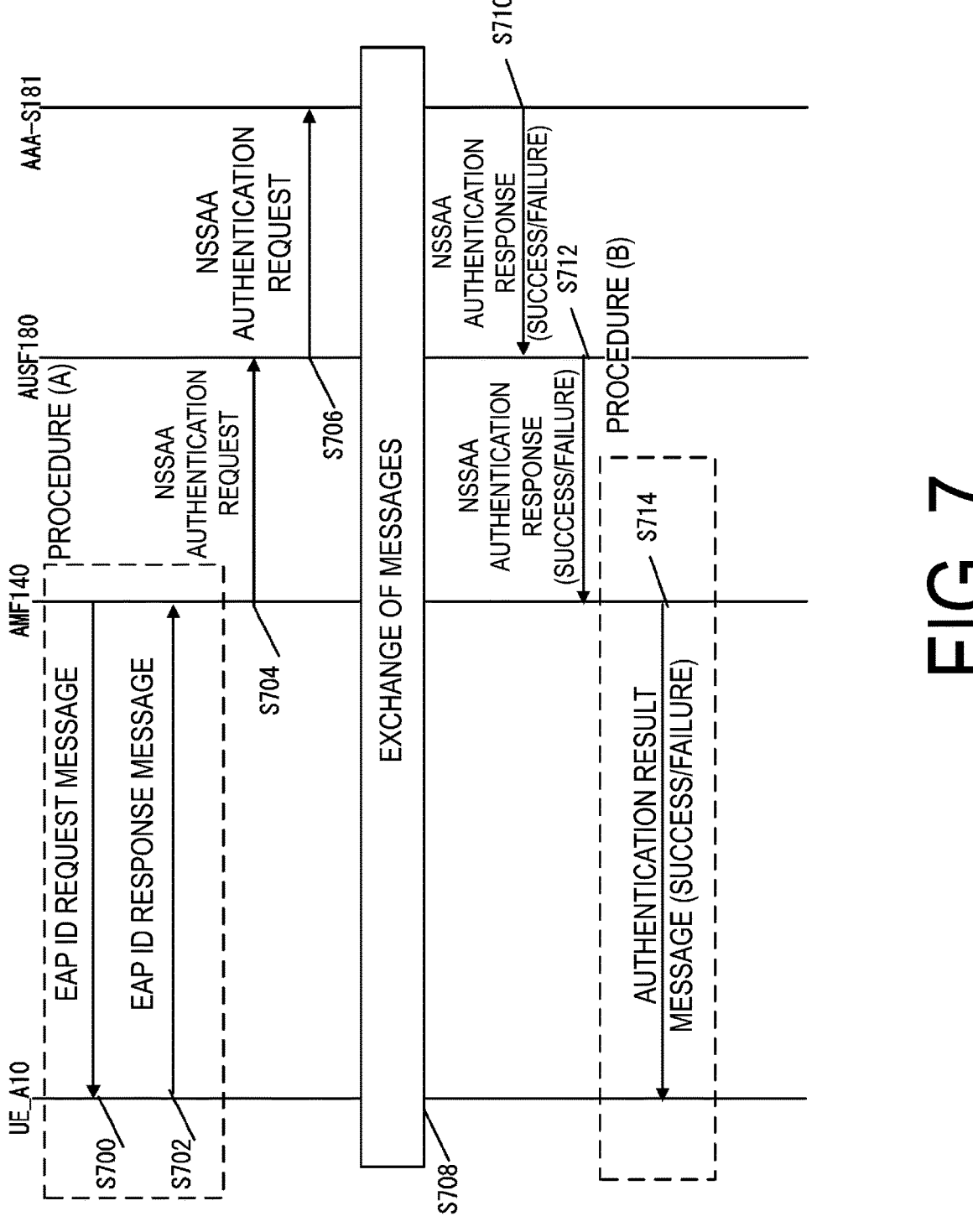
FIG. 7 is a diagram illustrating a network slice-specific authentication and authorization procedure.

Next, a Network Slice-Specific Authentication and Authorization (NSSAA) procedure will be described using FIG. 7. The NSSAA procedure will be hereinafter also referred to as the present procedure. The present procedure may be a procedure for performing, by the core network, an authentication and authorization procedure for a slice requiring the NSSAA procedure with respect to the UE. Here, the authentication procedure and the authorization procedure may be a re-authentication procedure and a re-authorization procedure.

The present procedure is a procedure performed by the PLMN and may be performed for each piece of S-NSSAI (mapped S-NSSAI) and/or UE that is subject to the NSSAA procedure. The present procedure may be performed at the completion of the registration procedure.

The present procedure may be initiated by the AMF 140. For example, the AMF 140 may initiate the present procedure based on reception of a registration request message from the UE_A 10. In a case that the AMF 140 stores that at least one of S-NSSAI requested from the UE_A 10 and mapped S-NSSAI of the S-NSSAI is S-NSSAI that requires the NSSAA procedure and does not store the result of the NSSAA of the S-NSSAI, the AMF 140 may initiate the present procedure. Here, the result of the NSSAA may be information indicating that the NSSAA has succeeded, information indicating that the NSSAA has failed, or both of the information. Furthermore, the information indicating that the NSSAA has succeeded may be allowed NSSAI. In other words, in a case that the S-NSSAI is stored as allowed NSSAI, the AMF 140 may recognize that the NSSAA of the S-NSSAI was successful and may retain the result of the NSSAA.

Alternatively, the AMF 140 may initiate the present procedure based on a request from an AAA-S 181. For example, in a case that the AAA-S 181 requests performance of NSSAA from the S-NSSAI again while the AMF 140 and/or the NW manages certain S-NSSAI as the allowed NSSAI based on the result of the NSSAA procedure already performed, the AMF may initiate the present procedure based on the request from the AAA-S 181. In this case, the present procedure may be an NSSAA procedure initiated by the AAA-S.

Hereinafter, the present procedure will be described. The AMF 140 transmits an EAP ID request message to the UE_A 10 via the 5G AN (or gNB or non-3GPP access) (S700). The EAP ID request message may be included in an authentication request message that is a NAS message and transmitted, or may be an authentication request message that is a NAS message. Note that the authentication request message that is a NAS message may be a NETWORK SLICE-SPECIFIC AUTHENTICATION COMMAND message of the 5GS. The AMF 140 includes one or multiple pieces of S-NSSAI corresponding to the EAP ID request message in an EAP ID request message or the authentication request message including the EAP ID request message and transmits the message. Here, the S-NSSAI may be S-NSSAI of the HPLMN or mapped S-NSSAI.

The AMF 140 requests one or multiple EAP IDs as identification information to be used to perform NSSAA for one or multiple pieces of the S-NSSAI from the UE_A 10 based on the transmission of the EAP ID request message.

The UE_A 10 transmits an EAP ID response message to the AMF 140 based on the reception of the EAP ID request message and/or the reception of the S-NSSAI and/or the reception of the authentication request message (S702). The EAP ID response message may be included in an authentication response message that is a NAS message and transmitted, or may be an authentication response message that is a NAS message. Note that the authentication response message that is a NAS message may be a NETWORK SLICE-SPECIFIC AUTHENTICATION COMPLETE message of the 5GS. The UE_A 10 may include the S-NSSAI received from the AMF 140 in the EAP ID response message or the authentication request message including the EAP ID response message and transmit the message. The UE_A 10 may include, in the EAP ID response message, the EAP ID that is identification information of the UE corresponding to the S-NSSAI received from the AMF 140 and transmit the message. Note that the UE_A 10 may include multiple EAP IDs and multiple pieces of S-NSSAI in the EAP ID response message, and may transmit the message in association with each EAP ID and each piece of the S-NSSAI.

The AMF 140 transmits an NSSAA authentication request message to the AAA-S 181 via an AUSF 180 based on the reception of the EAP ID response message from the UE_A 10 and/or the EAP ID and/or the authentication response message that is a NAS message (S704 and S706). The AM 140F may include the EAP ID response message received from the UE_A 10 in the NSSAA authentication request message, and transmit the authentication request message to the AUSF 180 and/or the AAA-S 181, or may include the EAP ID and/or the S-NSSAI included in the EAP ID response message received from the UE_A 10 in the NSSAA authentication request message and transmit the NSSAA authentication request message to the AUSF 180 and/or the AAA-S 181.

Note that the NSSAA authentication request message transmitted from the AMF 140 to the AUSF 180 may be the same as or may be different from the NSSAA authentication request message transmitted to the AAA-S 181 from the AUSF 180. Specifically, the AUSF 180 may transfer the NSSAA authentication request message received from the AMF 140 to the AAA-S 181, or may include the EAP ID and/or the S-NSSAI included in the authentication request message received from the AMF 140 in the NSSAA authentication request message and transmit the NSSAA authentication request message to the AAA-S 181.

The AAA-S 181 may initiate a procedure of exchanging a message required for authentication between the UE_A 10 and the AAA-S 181 based on the reception of the NSSAA authentication request message and/or at least one piece of information included in the NSSAA authentication request message (S708). Note that a message used in the procedure of exchanging messages between the AAA-S 181 and the UE_A 10 may be an EAP message.

Next, in response to the authentication request message received from the AMF 140, the AAA-S 181 transmits the NSSAA authentication response message to the AMF 140 via the AUSF 180 (S710 and S712).

Note that an NSSAA authentication response message transmitted from the AAA-S 181 to the AUSF 180 and the NSSAA authentication response message transmitted from the AUSF 180 to the AMF 140 may be the same or may be different messages. Specifically, the AUSF 180 may transfer the NSSAA authentication response message received from the AAA-S 181 to the AAA-S 181, or may include it in the NSSAA authentication response message and transmit the message to the AMF 140 based on the authentication result included in the authentication response message received from the AAA-S 181 and/or the S-NSSAI.

The AUSF 180 includes the authentication result and the S-NSSAI in the NSSAA authentication response message, and transmits the NSSAA authentication response message. Here, the authentication result may be information indicating success or failure. Here, the S-NSSAI included in the NSSAA authentication response message may be S-NSSAI of the HPLMN or mapped S-NSSAI.

The AMF 140 transmits an authentication result message to the UE_A 10 based on the reception of the NSSAA authentication response message (S714). The AMF 140 may include the NSSAA authentication response message or the authentication result and the S-NSSAI included in the NSSAA authentication response message in the authentication result message and transmit the authentication result message.

The authentication result message may be a NETWORK SLICE-SPECIFIC AUTHENTICATION RESULT message of the 5GS, or may be included in the NETWORK SLICE-SPECIFIC AUTHENTICATION RESULT message and transmitted.

Each apparatus may complete the present procedure based on the transmission and/or reception of the authentication result message. Each apparatus may update the stored information based on the information transmitted and/or received in the present procedure based on the completion of the present procedure. Specifically, the AMF 140 and/or the NW may store the authentication result for each piece of S-NS-SAI based on the transmission and/or reception of the authentication result. For example, in a case that "success" is transmitted and/or received as the authentication result, the AMF 140 and/or the NW may store, as information regarding the UE, the state that the NSSAA was "success" in association with the S-NSSAI transmitted and/or received together with the authentication result. Similarly, in a case that "failure" is transmitted and/or received as the authentication result, the AMF 140 and/or the NW may store, as information regarding the UE, the state that the NSSAA was "failure" in association with the S-NSSAI transmitted and/or received together with the authentication result.

In addition, in a case that the present procedure is a procedure initiated based on the reception of the registration request message from the UE_A 10, the AMF 140 may update the allowed NSSAI and/or the rejected NSSAI for the UE based on the transmission and/or reception of the authentication result. Specifically, for example, in a case that "success" is transmitted and/or received as the authentication result, the AMF 140 may store the S-NSSAI transmitted and/or received together with the authentication result to be included in the allowed NSSAI or as the mapped S-NSSAI of the S-NSSAI included in the allowed NSSAI, or may store the received S-NSSAI in associated with "allowed". Similarly, in a case that "failure" is transmitted and/or received as the authentication result, the AMF 140 may store the S-NSSAI transmitted and/or received together with the authentication result as third rejected NSSAI or the mapped S-NSSAI of the S-NSSAI included in the third rejected NSSAI, or may store the received S-NSSAI in associated with "rejected". Furthermore, in a case that the AMF transmits and/or receives "failure" or "success" as the authentication result, and further in a case that the UE_A 10 includes the S-NSSAI transmitted and/or received together with the authentication result in the pending NSSAI or stores the S-NSSAI as mapped S-NSSAI of the S-NSSAI included in the pending NSSAI, the UE_A 10 may delete the aforementioned S-NSSAI from the pending NSSAI or delete S-NS-SAI associated with the aforementioned S-NSSAI from the pending NSSAI.

In addition, the UE may store the authentication result for each piece of S-NSSAI based on the transmission and/or reception of the authentication result. Specifically, for example, in a case that "success" is transmitted and/or received as the authentication result, the UE may store, as information regarding the UE, the state that the NSSAA was "success" in association with the S-NSSAI transmitted and/or received together with the authentication result. Similarly, in a case that "failure" is transmitted and/or received as the authentication result, the UE may store, as information regarding the UE, the state that the NSSAA was "failure" in association with the S-NSSAI transmitted and/or received together with the authentication result.

In addition, each apparatus may perform processing based on update of the stored information based on the completion of the present procedure. For example, the AFM may initiate the UE configuration update procedure or a deregistration procedure initiated by the network in a case that the S-NS-SAI included in the allowed NSSAI and/or the rejected NSSAI for the UE is changed based on the completion of the present procedure. The AMF may use the UE configuration update procedure to signal the UE of new allowed NSSAI and new rejected NSSAI. The AMF may use the deregistration procedure initiated by the network to signal the UE of new rejected NSSAI.

3.3. UE Configuration Update Procedure

Figure 8:
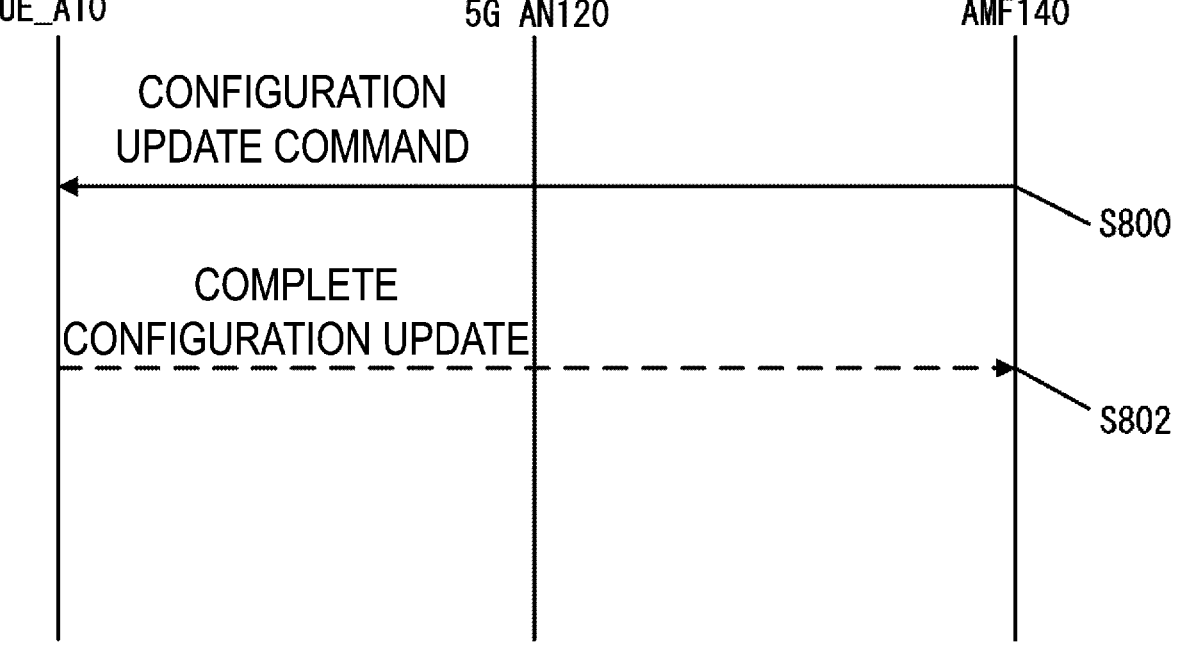
FIG. 8 is a diagram illustrating a UE configuration modification/update procedure.

Next, the UE configuration update procedure (generic UE configuration update procedure) will be described with reference to FIG. 8. The UE configuration update procedure is hereinafter also referred to as the present procedure. The present procedure is a procedure for the core network to update the configuration information of the UE. The present procedure may be a procedure for mobility management that is initiated and performed by the network with respect to the UE registered with the network.

Furthermore, apparatuses in the core network, such as the AMF, may initiate the present procedure based on update of a configuration of the network and/or update of the operator policy. Note that the present procedure may be triggered by detection of mobility of the UE, detection of a state change in the UE, and/or the access network, and/or the core network, or a state change in the network slice. Furthermore, the present procedure may be triggered by reception of a request from the DN and/or an application server of the DN, a change in a configuration of the network, or a change in the operator policy. Furthermore, the present procedure may be triggered by expiration of the running timer. Note that a trigger for the apparatus in the core network to initiate the present procedure is not limited to these. In other words, the present procedure may be performed at any timing after the above-described registration procedure and/or PDU session establishment procedure are completed. Furthermore, the present procedure may be performed at any timing in a state in which each apparatus has established a 5GMM context and/or in a state in which each apparatus is in a 5GMM connected mode.

In addition, during the present procedure, each apparatus may transmit and/or receive a message including identification information for changing the configuration information of the UE and/or identification information for stopping or changing the function being performed by the UE. Furthermore, each apparatus may update the configuration information to a configuration indicated by the network, or may initiate the behavior indicated by the network based on completion of the present procedure.

The UE may update the configuration information of the UE based on control information transmitted and/or received in the present procedure. Furthermore, the UE may stop the function being performed, or may initiate a new function, along with the update of the configuration information of the UE. In other words, the apparatus in the core network may initiate the present procedure and further transmit a control message and control information of the present procedure to the UE to cause the UE to update the configuration information of the UE that can be identified using these pieces of control information. Furthermore, by causing the configuration information of the UE to be updated, the apparatus in the core network may stop of the function performed by the UE, or may cause the UE to initiate a new function.

First, the AMF 140 transmits a configuration update command message to the UE_A 10 via the 5G AN 120 (or gNB) (S800), and thereby initiates a UE configuration update procedure.

Furthermore, the new AMF 141 may include at least one of the tenth to 16th identification information in the configuration update command message and transmit the message in a case that the configuration information of the UE has been updated.

The UE_A 10 receives, from the network, the configuration update command message and/or one or multiple pieces of information of the 10th to the 16th identification information. More specifically, the UE receives, from the new AMF 141, the configuration update command message and/or one or multiple pieces of information of the 10th to the 16th identification information.

The UE_A 10 may recognize the received information based on the reception of at least one piece of information of the 10th to the 16th identification information. Specifically, the UE may perform storage and/or update of information about the NSSAI, and start and/or stop of a back-off timer, and details thereof are described in the NSSAI update procedure in section 3.5.

Since the maximum number of UE connected to each slice has been reached, the UE_A 10 may recognize a state in which the UE is temporarily prohibited from transmitting the MM message and/or the SM message using the S-NSSAI indicated by the 10th identification information, and/or the S-NSSAI indicated by the 14th identification information, and/or the S-NSSAI related to the mapped S-NSSAI indicated by the 15th identification information. Note that, here, the MM procedure may be the registration request message, and the SM message may be the PDU session establishment request message.

The AMF 140 may include one or more pieces of the NSSAI about the UE_A 10 (which means the configured NSSAI, the allowed NSSAI, the rejected NSSAI, the pending NSSAI, the first NSSAI hereinbelow) in the configuration update command message and transmit the message. Note that, by transmitting one or more pieces of the NSSAI, the AMF may indicate configuration information of new UE or may request update of the configuration information of the UE. Note that information indicating support of each function and information indicating a request for use of each function may be transmitted and/or received as the same piece of identification information, or may be transmitted and/or received as different pieces of identification information.

Furthermore, the AMF 140 may include a TAI list indicating new registration areas in the configuration update command message and transmit the message.

Furthermore, in a case that multiple pieces of identification information are transmitted and/or received, two or more pieces of identification information of these pieces of identification information may be configured as one or multiple pieces of identification information. Note that information indicating support of each function and information indicating a request for use of each function may be transmitted and/or received as the same piece of identification information, or may be transmitted and/or received as different pieces of identification information.

Note that the AMF 140 may select and determine whether to include each piece of the NSSAI and the TAI list in the configuration update command message based on each piece of the received identification information, and/or the subscriber information, and/or the capability information of the network, and/or the operator policy, and/or the state of the network, and/or the registration information of the user, and/or the context stored in the AMF 140, and/or the like.

In addition, by transmitting the configuration update command message based on each piece of received identification information, and/or subscriber information, and/or capability information of the network, and/or the operator policy, and/or a state of the network, and/or registration information of the user, and/or a context stored in the AMF 140, and/or the like, the AMF 140 may indicate a request for update of the configuration information of the UE_A 10.

The UE_A 10 receives the configuration update command message from the AMF 140 via the 5G AN 120 (or gNB) (S800). The UE_A 10 may update the configuration information of the UE based on the configuration update command message, and/or the identification information included in the configuration update command message.

In addition, in a case that the UE_A 10 has received the TAI list, the received TAI list may be validated, and in a case that the UE_A 10 has already stored the valid TAI list, the old TAI list may be deleted or invalidated. Hereinafter, the valid TAI list may be referred to as a registration area. Note that, in a case that the UE_A 10 stores no valid TAI list and has received no TAI list from the core network during the present procedure, no valid TAI list may not be stored.

In a case that the rejected NSSAI is included in the control message by using an extended rejected NSSAI IE, the new AMF 141 may include the 16th identification information in the control message and transmit the control message. Alternatively, the new AMF 141 may include the 16th identification information in the extended rejected NSSAI IE and transmit the extended rejected NS SAI IE.

The new AMF 141 may indicate the valid range of the S-NSSAI included in the allowed NSSAI and/or the extended rejected NSSAI IE by transmitting the 16th identification information.

In addition, the UE_A 10 may appropriately store each piece of the received NSSAI. Furthermore, the stored information about the NS SAI of the UE_A 10 may be updated based on the received NSSAI. Furthermore, the information about the NSSAI stored in the UE_A 10 may be deleted and/or updated based on the state of the UE_A 10. The specific behavior of the method for updating the storage of the NSSAI by the UE_A 10 and the condition for updating are described in the NSSAI update procedure in section 3.5.

Note that the NSSAI update procedure in section 3.5 may be performed during the present procedure or after completion of the present procedure or may be performed based on completion of the present procedure after completion of the present procedure. Furthermore, the UE may transmit a configuration update completion (Configuration update complete) message to the AMF 140 via the 5G AN (gNB) as a response message to the configuration update command message based on the identification information included in the configuration update command message (S802).

In a case that the UE_A 10 has transmitted the configuration update completion command message, the AMF 140 receives the configuration update completion message via the 5G AN (gNB) (S802). In addition, each apparatus completes the present procedure based on transmission and/or reception of the configuration update command message and/or the configuration update completion message.

Furthermore, each apparatus may perform processing based on the information transmitted and/or received in the present procedure based on completion of the present procedure. For example, in a case that update information for the configuration information has been transmitted and/or received, each apparatus may update the configuration information. Furthermore, in a case that information indicating that the registration procedure needs to be performed is transmitted and/or received, the UE_A 10 may initiate the registration procedure based on completion of the present procedure.

Furthermore, the UE_A 10 may store identification information received together with the configuration information command message, or may recognize determination of the network based on completion of the present procedure. In addition, the UE may perform each procedure based on the stored information based on completion of the present procedure.

By transmitting and/or receiving the configuration update command message in the above-described procedure, the apparatuses in the core network can indicate to the UE to update the configuration information already applied by the UE and indicate to the UE to stop or change the function performed by the UE.

3.4. Network-Initiated Deregistration Procedure

Figure 9:
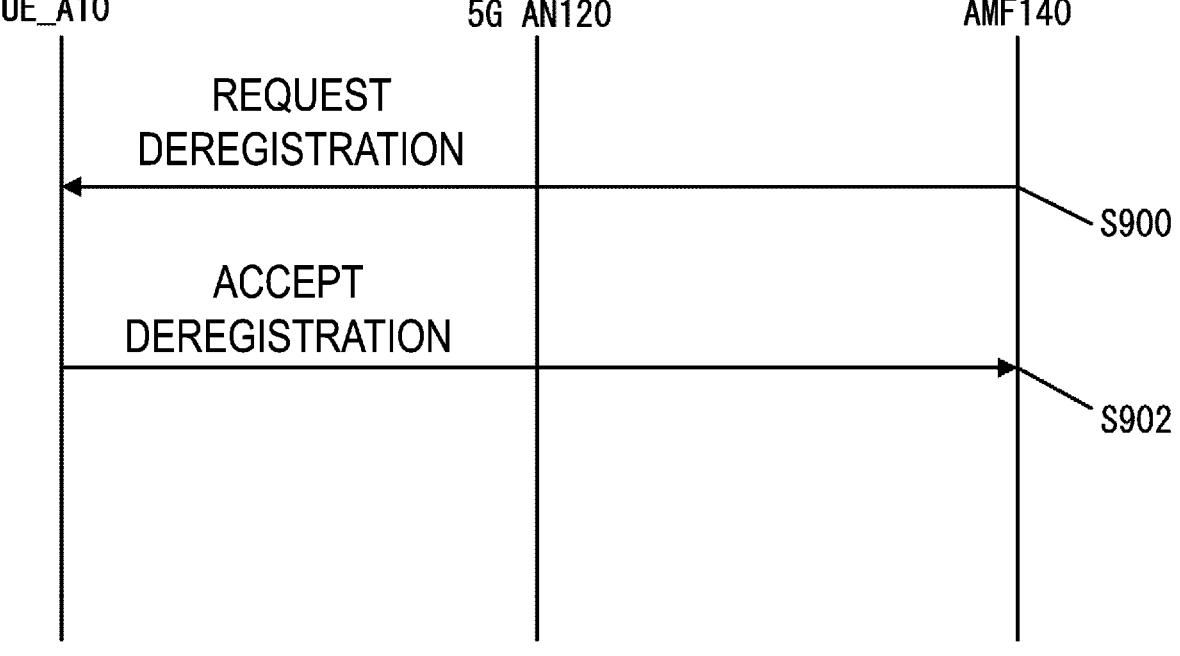
FIG. 9 is a diagram illustrating a deregistration procedure initiated by a network.

Next, a network-initiated deregistration procedure will be described by using FIG. 9. Hereinafter, the present procedure will refer to the network-initiated deregistration procedure. The network-initiated deregistration procedure is a procedure for deregistering UE from the access network_A, and/or the core network_A, the access network_B, and/or the core network_B, and/or the DN, and/or the PDN, the procedure being manually performed by the network. The present procedure may be a procedure for mobility management that is initiated by the network with respect to the UE registered with the network.

The AMF can perform the present procedure at any timing as long as the UE is registered with the network (RM-REGISTERED state or 5GMM-REGISTERED state). For example, the AMF may initiate the present procedure in response to update of the registration information of the UE. More specifically, the AMF may initiate the present procedure in a case that there is no allowed NSSAI in the registration information of the UE, based on completion of the NSSAA procedure. In other words, the AMF may initiate the present procedure in a case that there is no S-NSSAI allowed to the UE and there is no schedule to add S-NSSAI to the allowed NSSAI in any other procedure (for example, the NSSAA procedure) in the future.

First, the AMF 140 may initiate the present procedure by transmitting a deregistration request message to the UE_A 10 (S900). Here, although the deregistration request message is a NAS message transmitted and/or received over the N1 interface, the deregistration reject message is included in the RRC message and transmitted and/or received between the UE and the 5G AN (gNB).

The AMF 140 may include at least one piece of identification information of the NSSAI (which means the rejected NSSAI, the pending NSSAI, and the first NSSAI hereinbelow) in the deregistration request message and transmit the message. The AMF may further include a cause value and/or information indicating the access type for deregistration in the deregistration request message and transmit the message. Here, the cause value may be a 5GMM cause. Furthermore, in a case that the present procedure is initiated based on the result of the NSSAA procedure, or upon completion of the NSSAA, the cause value may be a value indicating that no network slice is available. In this case, it may be a 5GMM cause value #62 "No network slices available" in the 5GS.

Note that, by transmitting these pieces of identification information and/or the deregistration message, the AMF 140 may indicate that the network does not support each function, or request a transition to the deregistered state, or signal a change of the AMF 140, or subsequently indicate initiation of the registration procedure, or indicate information obtained by combing the above-described pieces of information. Furthermore, in a case that multiple pieces of identification information are transmitted and/or received, two or more pieces of identification information of these pieces of identification information may be configured as one or multiple pieces of identification information. Note that the information indicating support for each function and the information indicating a request for use of each function may be transmitted and/or received as the same piece of identification information, or may be transmitted and/or received as different pieces of identification information.

The UE_A 10 may recognize and store the rejected S-NSSAI and the reason for the rejection and determine a behavior or the UE based on the reception of at least one piece of the NSSAI and/or reception of the cause value and/or reception of other identification information and/or on the state of the UE.

Furthermore, the new AMF 141 may include at least one of the tenth to 16th identification information in the deregistration request message and transmit the message in a case that the configuration information of the UE has been updated.

Note that the 10th to the 16th identification information may be included in the allowed NSSAI, and/or the rejected NSSAI, and/or the pending NSSAI and/or the first NSSAI and transmitted, or may be NSSAI of the above-described NSSAI.

In a case that the 13th identification information indicating application to all the PLMNs is included in the control message, the new AMF 141 may include the 15th identification information in the control message as well.

The UE_A 10 receives, from the network, the control message and/or one or multiple pieces of information of the 10th to the 16th identification information. More specifically, the UE receives, from the new AMF 141, the control message and/or one or multiple pieces of information of the 10th to the 16th identification information.

The UE_A 10 may recognize the received information based on the reception of at least one piece of information of the 10th to the 16th identification information. Specifically, the UE may perform storage and/or update of information about the NSSAI, and start and/or stop of a back-off timer, and details thereof are described in the NSSAI update procedure in section 3.5.

Since the maximum number of UE connected to each slice has been reached, the UE_A 10 may recognize a state in which the UE is temporarily prohibited from transmitting the MM message and/or the SM message using the S-NSSAI indicated by the 10th identification information, and/or the S-NSSAI indicated by the 14th identification information, and/or the S-NSSAI related to the mapped S-NSSAI indicated by the 15th identification information. Note that, here, the MM procedure may be a registration request message, and the SM message may be a PDU session establishment request message.

In addition, the UE_A 10 may appropriately store each piece of the received NSSAI. Furthermore, the stored information about the NS SAI of the UE_A 10 may be updated based on the received NSSAI. Furthermore, the information about the NSSAI stored in the UE_A 10 may be deleted and/or updated based on the state of the UE_A 10. The specific behavior of the method for updating the storage of the NSSAI by the UE_A 10 and the condition for updating are described in the NSSAI update procedure in section 3.5.

Note that the NSSAI update procedure in section 3.5 may be performed during the present procedure or after completion of the present procedure or may be performed based on completion of the present procedure after completion of the present procedure.

The UE_A 10 receives the deregistration request message via the 5G AN (gNB). The UE_A 10 receives the deregistration request message to recognize the content of various types of identification information included in the deregistration request message.

In response to the reception of the deregistration request message, the UE_A 10 may transmit a deregistration accept message (DEREGISTRATION ACCEPT message) to the AMF 140 via the 5G AN (or gNB). Note that the deregistration accept message is a NAS message transmitted and/or received over the N1 interface. In addition, the RRC message may be a control message transmitted and/or received between the UE and the 5G AN (or the gNB).

Each apparatus may transition to a state in which the UE is not registered with the network (RM_DEREGISTERED state or 5GMM-DEREGISTERED state) based on the transmission and/or reception of the registration accept message. In addition, the transition of each apparatus to each state may be performed based on completion of the present procedure.

Furthermore, each apparatus may perform processing based on the information transmitted and/or received in the present procedure based on the completion of the deregistration procedure. For example, the UE_A 10 may initiate the registration procedure based on the completion of the deregistration procedure.

3.5. NSSAI Update Procedure

Hereinafter, the procedure for updating each piece of NSSAI stored in the UE_A 10 will be described. Note that the NSSAI update procedure by the UE may be performed during the other procedures described in section 3, or may be performed based on completion during each procedure.

In a case that the UE_A 10 has received the configured NSSAI, the UE_A 10 may store the received configured NSSAI as "configured NSSAI associated with the current PLMN". That is, the UE_A 10 may replace the "configured NSSAI associated with the current PLMN stored in the UE_A 10" with the "received configured NSSAI".

Furthermore, in a case that the UE_A 10 has received the configured NSSAI, the UE_A 10 may delete the mapped S-NSSAI of the S-NSSAI included in the "configured NSSAI associated with the current PLMN stored in the UE_A 10. Furthermore, in a case that one or multiple pieces of mapped S-NSSAI are included in the "received configured NSSAI", the UE_A 10 may store the one or multiple pieces of mapped S-NSSAI.

Furthermore, in a case that the UE_A 10 has received the configured NSSAI, the UE_A 10 may delete the "rejected NSSAI associated with the current PLMN stored in the UE_A 10".

Alternatively, in a case that the UE_A 10 has received the configured NS SAI, the UE_A 10 may delete at least one of "first rejected NSSAI associated with the current PLMN stored in the UE_A 10", "second rejected NSSAI associated with the current PLMN stored in the UE_A 10", and "third rejected NSSAI associated with the current PLMN stored in the UE_A 10".

Furthermore, in a case that the UE_A 10 has received the configured NSSAI, the UE_A 10 may delete the "first NSSAI stored in the UE_A 10" and/or "first NSSAI associated with the current PLMN stored in the UE_A 10" and/or one or multiple pieces of "first NSSAI associated with the EPLMN of the current PLMN stored in the UE_A 10".

Furthermore, in a case that the UE_A 10 has received the configured NSSAI, the UE_A 10 may delete "pending NSSAI stored in the UE_A 10" and/or "pending NSSAI associated with the current PLMN stored in the UE_A 10" and/or one or multiple pieces of "first pending NSSAI associated with the EPLMN of the current PLMN stored in the UE_A 10".

Furthermore, in a case that the UE_A 10 receives the allowed NSSAI, the UE_A 10 may store the received allowed NSSAI as "allowed NSSAI associated with current PLMN and current access type". That is, the UE_A 10 may replace the "allowed NSSAI associated with the current PLMN and the current access type" stored in the UE_A 10 with the "received allowed NSSAI".

Furthermore, in a case that the UE_A 10 has received the TAI list and the allowed NSSAI from the new AMF 141, and further in a case that at least one TAI included in the TAI list belongs to the EPLMN, the UE_A 10 may store the received allowed NSSAI as "allowed NSSAI associated with the EPLMN to which the TAI included in the TAI list belongs and the current access type".

Note that, in a case that the allowed NSSAI is to be stored, the UE_A 10 may store the allowed NSSAI in association with a registration area, or may store the S-NSSAI included in the allowed NSSAI in association with a registration area.

In a case that the UE_A 10 has received the allowed NSSAI, the UE_A 10 may delete the mapped S-NSSAI of the S-NSSAI included in "allowed NSSAI deleted based on reception" or "old allowed NSSAI updated based on reception". Furthermore, in a case that mapped S-NSSAI is included in the "received allowed NSSAI", the UE_A 10 may store one or multiple pieces of mapped S-NSSAI.

However, in a case that the S-NSSAI included in the old allowed NSSAI is included in the pending NSSAI and is received by the UE_A 10, the mapped S-NSSAI of the S-NSSAI may not be deleted.

In a case that the UE_A 10 has received an MM message including the allowed NSSAI and the pending NSSAI, the UE_A 10 may perform control based on the reception of the pending NSSAI before performing control based on the reception of the allowed NSSAI.

To be more specific, in a case that S-NSSAI #1 is included in the old allowed NSSAI stored in the UE_A 10 and the UE_A 10 has received pending NSSAI including the S-NSSAI #1 and new allowed NSSAI not including the S-NSSAI #1 from the network, the UE_A 10 may update each piece of the stored NSSAI based on the reception of the pending NSSAI before updating each piece of the stored NSSAI based on the reception of the allowed NSSAI.

Similarly, in a case that the UE_A 10 has received an MM message including the allowed NSSAI and the rejected NSSAI, the UE_A 10 may perform control based on the reception of the rejected NSSAI before performing control based on the reception of the allowed NSSAI.

To be more specific, in a case that the S-NSSAI #1 is included in the old allowed NSSAI stored in the UE_A 10 and the UE_A 10 has received rejected NSSAI including S-NSSAI #2 that is mapped S-NSSAI of the S-NSSAI #1 and new allowed NSSAI not including the S-NSSAI #1 from the network, the UE_A 10 may update each piece of the stored NSSAI based on the reception of the rejected NSSAI before updating each piece of the stored NSSAI based on the reception of the allowed NSSAI.

In a case that the UE_A 10 has received the allowed NSSAI, the UE_A 10 may delete the S-NSSAI of the "rejected NSSAI associated with the current PLMN stored in the UE_A 10".

In a case that the UE_A 10 has received the allowed NSSAI, the UE_A 10 may delete the S-NSSAI included in the received allowed NSSAI from the first rejected NSSAI and/or the second rejected NSSAI stored in the UE_A 10 under the following conditions. The condition for deleting the S-NSSAI from the first rejected NSSAI and/or the second rejected NSSAI stored in the UE_A 10 may be: a case that the UE_A 10 is not roaming; a case that the mapped S-NSSAI of the S-NSSAI is not stored in the UE_A 10 as a set of pieces of mapped S-NSSAI of the first rejected NSSAI and/or the second rejected NSSAI; a case that the mapped S-NSSAI of the S-NSSAI is stored in at least one piece of UE_A 10 in the set of pieces of mapped S-NSSAI of the first rejected NSSAI and/or the second rejected NSSAI stored in the UE_A 10 and further all pieces of the mapped S-NSSAI are included in the allowed NSSAI received by the UE; a case that the mapped S-NSSAI of the S-NSSAI is not included in the allowed NSSAI received by the UE_A 10; or a case that the S-NSSAI is not associated with multiple pieces of mapped S-NSSAI.

In a case that the UE_A 10 has received the allowed NSSAI, the UE_A 10 need not delete the S-NSSAI included in the received allowed NSSAI from the first rejected NSSAI and/or the second rejected NSSAI stored in the UE_A 10. The condition for not deleting the S-NSSAI from the first rejected NSSAI and/or the second rejected NSSAI stored in the UE_A 10 may be a case that the UE_A 10 is roaming, and/or a case that the UE_A 10 stores the mapped S-NSSAI of the S-NSSAI in the list (set) of pieces of the mapped S-NSSAI of the first rejected NSSAI and/or the second rejected NSSAI and/or the mapped S-NSSAI is associated with multiple pieces of mapped S-NSSAI, and/or a case that none of the pieces of mapped S-NSSAI is not included in the new allowed NSSAI and/or pending NSSAI.

Note that the condition for deleting the S-NSSAI included in the received allowed NSSAI from the first NSSAI and/or the pending NSSAI stored in the UE_A 10 may be the same as the condition for deleting the S-NSSAI included in the received allowed NSSAI from the first rejected NSSAI and/or the second rejected NSSAI stored in the UE_A 10.

In a case that the UE_A 10 stores mapped S-NSSAI of the first rejected NSSAI and/or mapped S-NSSAI of the second rejected NSSAI during roaming, and in a case that the UE_A 10 receives an allowed NSSAI IE including the list of the mapped S-NSSAI of the new allowed NSSAI, the UE_A 10 deletes the S-NSSAI included in the new allowed NSSAI from the stored first rejected NSSAI and/or the stored second rejected NSSAI, except a case that the UE_A 10 stores one or multiple pieces of mapped S-NSSAI not included in the list of pieces of mapped S-NSSAI of the new allowed NSSAI, in the list of pieces of the mapped S-NSSAI of the first rejected NSSAI stored in the UE_A 10 and/or in the list of pieces of the mapped S-NSSAI of the second rejected NSSAI stored in the UE_A 10.

In other words, in a case that the UE_A 10 stores mapped S-NSSAI of the first rejected NSSAI and/or mapped S-NSSAI of the second rejected NSSAI during roaming, the UE_A 10 deletes the S-NSSAI included in the new allowed NSSAI from the stored first rejected NSSAI and/or the stored second rejected NSSAI except in a case that the UE_A 10 receives an allowed NSSAI IE including the list of the mapped S-NSSAI of the new allowed NSSAI, and a case that there are one or multiple pieces of mapped S-NSSAI not included in the list of pieces of mapped S-NSSAI of the new allowed NSSAI, the one or multiple pieces of mapped S-NSSAI being included in the list of pieces of the mapped S-NSSAI of the first rejected NSSAI and/or the list of pieces of the mapped S-NSSAI of the second rejected NSSAI stored in the UE_A 10.

In other words, in a case that the UE_A 10 stores the mapped S-NSSAI of the first rejected NSSAI and/or the mapped S-NSSAI of the second rejected NSSAI during roaming, and has received an allowed NSSAI IE including the list of pieces of the mapped S-NSSAI of the new allowed NSSAI, the S-NSSAI to be deleted from the mapped S-NSSAI of the first rejected NSSAI and/or the second rejected NSSAI stored in the UE_A 10 is included in the received allowed NSSAI, and further the S-NSSAI included in the list of piece of the mapped S-NSSAI of the allowed NSSAI mapped to the S-NSSAI includes all pieces of the S-NSSAI included in the list of pieces of the mapped S-NSSAI of the first rejected NSSAI and/or the S-NSSAI included in the list of pieces of the mapped S-NSSAI of the second rejected NSSAI mapped to the S-NSSAI.

In a case that the UE_A 10 stores neither the mapped S-NSSAI of the first rejected NSSAI nor the mapped S-NSSAI of the second rejected NSSAI in a case that the UE_A 10 is not roaming or in a case that the UE_A 10 is roaming, and a case that the UE_A 10 has received the allowed NSSAI IE including new allowed NSSAI, the UE_A 10 deletes the S-NSSAI included in the new allowed NSSAI from the stored first rejected NSSAI and/or second rejected NSSAI.

The UE_A 10 may behave not to delete the S-NSSAI of the current PLMN or SNPN included in the new allowed NSSAI from the first rejected NSSAI and/or the second rejected NSSAI in a case that the UE has received a first indication and the allowed NSSAI during roaming.

The UE_A 10 may behave to delete the S-NSSAI of the current PLMN or SNPN included in the new allowed NSSAI from the first rejected NSSAI and/or the second rejected NSSAI in a case that the UE has received a second indication and the allowed NSSAI during roaming.

In a case that the UE_A 10 stores the first information including the S-NSSAI and the mapped S-NSSAI in each NSSAI during roaming, the UE_A 10 may delete the combination of the S-NSSAI and the mapped S-NSSAI included in the received allowed NSSAI from the first rejected NSSAI and/or the second rejected NSSAI and a set of mapped S-NSSAI of the first rejected NSSAI and/or a set of mapped S-NSSAI of the second rejected NSSAI.

To be specific, in a case that the UE_A 10 has received the allowed NSSAI, the UE_A 10 may delete the S-NSSAI included in the received allowed NSSAI and/or the mapped S-NSSAI of the received allowed NSSAI from at least one of the "first rejected NSSAI associated with the current PLMN stored in the UE_A 10", "second rejected NSSAI associated with the current PLMN stored in the UE_A 10", "second rejected NSSAI associated with the current PLMN and the current registration area stored in the UE_A 10", and "third rejected NSSAI associated with the current PLMN stored in the UE_A 10", and may delete the S-NSSAI included in the received allowed NSSAI and/or the mapped S-NSSAI of the received allowed NSSAI from all pieces of the NSSAI.

Furthermore, in a case that the UE_A 10 has received the allowed NSSAI, the UE_A 10 may delete the S-NSSAI included in the received allowed NSSAI from the "pending NSSAI associated with the current PLMN stored in the UE_A 10". Furthermore, in a case that the UE_A 10 has received the allowed NSSAI, the UE_A 10 may delete the mapped S-NSSAI or the S-NSSAI included in the received allowed NSSAI from the "pending NSSAI associated with all PLMN stored in the UE_A 10". Furthermore, in a case that the UE_A 10 has received the allowed NSSAI, the UE_A 10 may delete the S-NSSAI included in the received allowed NSSAI from the "pending NSSAI associated with the EPLMN stored in the UE_A 10".

Furthermore, the UE may stop the back-off timer in a case that the back-off timer that restricts use of certain S-NSSAI is running, that the S-NSSAI is included in new allowed NSSAI, or that the S-NSSAI is mapped S-NSSAI of the allowed NSSAI.

Here, in a roaming scenario, in a case that the S-NSSAI included in the pending NSSAI is the S-NSSAI of the HPLMN, and that the UE_A 10 has received the allowed NSSAI, the UE_A 10 may delete the mapped S-NSSAI of the S-NSSAI included in the received new allowed NSSAI from the "pending NSSAI stored in the UE_A 10". At this time, in the roaming scenario, the allowed NS SAI is associated with a PLMN ID or an SNPN ID indicating the current PLMN or the current SNPN, i.e., the RPLMN or the RSNPN, while the S-NSSAI included in the pending NSSAI may be the S-NSSAI of the HPLMN.

Furthermore, in a case that the UE_A 10 has received the allowed NSSAI, the UE_A 10 may delete the S-NSSAI included in the received allowed NSSAI from the "first NSSAI associated with the current PLMN stored in the UE_A 10". Furthermore, in a case that the UE_A 10 has received the allowed NSSAI, the UE_A 10 may delete the mapped S-NSSAI or the S-NSSAI included in the received allowed NSSAI from the "first NSSAI associated with all PLMN stored in the UE_A 10".

Furthermore, in a case that the UE_A 10 has received rejected NSSAI, the UE_A 10 may store the S-NSSAI included in the received rejected NSSAI as appropriate rejected NSSAI based on a reject cause value with which the S-NSSAI is associated. In other words, the UE may add the "S-NSSAI included in the received rejected NSSAI" to the rejected NSSAI stored in the UE_A 10.

To be specific, in a case that the UE_A 10 has received the reject cause value "S-NSSAI not available in the current PLMN or SNPN" and the rejected S-NSSAI associated with the reject cause value, the UE_A 10 may add the S-NSSAI to first rejected NS SAI associated with the current PLMN.

Furthermore, in a case that the UE_A 10 has received the reject cause value "S-NSSAI not available in the current registration area" and the rejected S-NSSAI associated with the reject cause value, the UE_A 10 may add the "received rejected S-NSSAI" to "second rejected NSSAI associated with the current PLMN and the current registration area".

Furthermore, in a case that the UE_A 10 has received the reject cause value "S-NSSAI not available due to failed or revoked NSSAA" and the rejected S-NSSAI associated with the reject cause value, the UE_A 10 may add the "received rejected S-NSSAI" to the "third rejected NSSAI". At this time, the "third rejected NSSAI" may then be associated with the current PLMN or may be common to all PLMNs.

Note that, in a case that the UE_A 10 has received the TAI list together with the rejected NSSAI, the current registration area is indicated by the received TAI list. On the other hand, in a case that the UE_A 10 has not received the TAI list together with the rejected NSSAI, the current registration area is indicated by the TAI list previously received and stored in the UE_A 10.

Furthermore, in a case that the UE_A 10 has received the reject cause value "S-NSSAI not available due to failed or revoked NS SAA" and the rejected NSSAI including the rejected S-NSSAI associated with the reject cause value, the UE_A 10 may add and/or store the S-NSSAI to and/or in the "third rejected NSSAI". Note that, in a case that the UE stores the third rejected NSSAI associated with the current PLMN, the received S-NSSAI may be added to and/or stored in the third rejected NSSAI associated with the current PLMN.

Furthermore, in a case that the UE_A 10 has received the rejected NSSAI, the UE_A 10 may delete the S-NSSAI included in the received rejected NSSAI from the "allowed NSSAI associated with the current PLMN stored in the UE_A 10".

Here, in a case that the UE_A 10 has received the rejected NSSAI including the S-NSSAI of the HPLMN, and further in a case that the mapped S-NSSAI of the S-NSSAI included in the "allowed NSSAI associated with the current PLMN stored in the UE_A 10" is included in the rejected NSSAI received by the UE_A 10, the UE_A 10 may delete the S-NSSAI from the "allowed NSSAI associated with the current PLMN stored in the UE_A 10".

Furthermore, in a case that the UE_A 10 has received the rejected NSSAI, the UE_A 10 may delete the S-NSSAI included in the received rejected NSSAI from the "pending NSSAI associated with the current PLMN stored in the UE_A 10". Furthermore, in a case that the UE_A 10 has received the rejected NSSAI, the UE_A 10 may delete the mapped S-NSSAI or the S-NSSAI included in the received allowed NSSAI from the "pending NSSAI associated with all PLMNs stored in the UE_A 10". Furthermore, in a case that the UE_A 10 has received the rejected NSSAI, the UE_A 10 may delete the S-NSSAI included in the received allowed NSSAI from the "pending NSSAI associated with the EPLMN stored in the UE_A 10".

Furthermore, in a case that the UE_A 10 has received the allowed NSSAI, the UE_A 10 may delete the S-NSSAI included in the received allowed NSSAI from the "first NSSAI associated with the current PLMN stored in the UE_A 10". Furthermore, in a case that the UE_A 10 has received the allowed NSSAI, the UE_A 10 may delete the mapped S-NSSAI or the S-NSSAI included in the received allowed NSSAI from the "first NSSAI associated with all PLMN stored in the UE_A 10".

In a case that the UE_A 10 has received one or multiple pieces of S-NSSAI included in the rejected NSSAI, the UE_A 10 may store the S-NSSAI based on the reject cause value associated with each piece of the S-NSSAI. Specifically, the UE_A 10 may store the S-NSSAI included in the received rejected NSSAI included in each piece of the rejected NSSAI stored in the UE_A 10 and/or a set of the mapped S-NSSAI of each piece of the rejected NSSAI.

Furthermore, to be more specific, in a case that the UE_A 10 has received the rejected NSSAI IE, and further in a case that rejected S-NSSAI #1 included in the rejected NSSAI IE includes the S-NSSAI #1 and the reject cause value indicating "S-NSSAI not available in the current PLMN or SNPN", the UE_A 10 may include and store the S-NSSAI #1 in the first rejected NSSAI stored in the UE.

Similarly, in a case that the UE_A 10 has received the rejected NSSAI IE, and further in a case that the rejected S-NSSAI #1 included in the rejected NSSAI IE includes the S-NSSAI #1 and the reject cause value indicating "S-NSSAI not available in the current registration area", the UE_A 10 may include and store the S-NSSAI #1 in the second rejected NSSAI stored in the UE.

Similarly, in a case that the UE_A 10 has received the rejected NSSAI IE, and further in a case that the rejected S-NSSAI #1 included in the rejected NSSAI IE includes the S-NSSAI #1 and the reject cause value indicating "S-NSSAI not available due to failed or revoked NSSAA", the UE_A 10 may include and store the S-NSSAI #1 in the third rejected NSSAI stored in the UE.

Alternatively, in a case that the UE_A 10 has received an extended rejected NSSAI IE, and further in a case that the rejected S-NSSAI #1 included in the extended rejected NSSAI IE includes the S-NSSAI #1, mapped S-NSSAI #1, and the rejection cause value indicating "S-NSSAI not available in the current PLMN or SNPN", the UE_A 10 may include and store the S-NSSAI #1 in the first rejected NSSAI stored in the UE, and the UE_A 10 may include and store the mapped S-NSSAI1 #1 in a set of mapped S-NSSAI of the first rejected NSSAI. Alternatively, under the same condition, the UE_A 10 may include and store the combination of the S-NSSAI #1 and the mapped S-NSSAI1 #1 in the first rejected NSSAI stored in the UE.

Similarly, in a case that the UE_A 10 has received the rejected NSSAI IE, and further in a case that the rejected S-NSSAI #1 included in the rejected NSSAI IE includes the S-NSSAI #1 and the reject cause value indicating "S-NSSAI not available in the current registration area", the UE_A 10 may include and store the S-NSSAI #1 in the second rejected NSSAI stored in the UE. Alternatively, under the same condition, the UE_A 10 may include and store the combination of the S-NSSAI #1 and the mapped S-NSSAI1 #1 in the first rejected NSSAI stored in the UE.

Similarly, in a case that the UE_A 10 has received the rejected NSSAI IE, and further in a case that the rejected S-NSSAI #1 included in the rejected NSSAI IE includes the S-NSSAI #1 and the reject cause value indicating "S-NSSAI not available due to failed or revoked NSSAA", the UE_A 10 may include and store the S-NSSAI #1 in the third rejected NSSAI stored in the UE. Alternatively, under the same condition, the UE_A 10 may include and store the combination of the S-NSSAI #1 and the mapped S-NSSAI1 #1 in the first rejected NSSAI stored in the UE.

In a case the UE_A 10 has received the rejected NSSAI, the UE_A 10 may delete, from the allowed NSSAI stored in the UE_A 10, the S-NSSAI included in the first rejected NSSAI and/or the second rejected NSSAI included in the received rejected NSSAI under the following condition. The condition for deleting the S-NSSAI from the allowed NSSAI stored in the UE_A 10 may be: a case that the UE_A 10 is not roaming; a case that the mapped S-NSSAI of the S-NSSAI is included a set of pieces of mapped S-NSSAI of the allowed NSSAI but is not stored in the UE_A 10; a case that the mapped S-NSSAI of the S-NSSAI is stored in at least one piece of UE_A 10 in the set of pieces of mapped S-NSSAI of the allowed NSSAI stored in the UE_A 10 and further all pieces of the mapped S-NSSAI are included in the first rejected NSSAI and/or the second rejected NSSAI received by the UE; a case that the mapped S-NSSAI of the S-NSSAI is not included in the first rejected NSSAI and/or the second rejected NSSAI received by the UE_A 10; or a case that the S-NSSAI is not associated with multiple pieces of mapped S-NSSAI.

Note that the case that the mapped S-NSSAI of the S-NSSAI is not included in the first rejected NSSAI and/or the second rejected NSSAI received by the UE_A 10 may be a case that the UE_A 10 has received the first rejected NSSAI and/or the second rejected NSSAI included in the rejected NSSAI IE, or a case that the UE_A 10 has received the extended rejected NSSAI IE not including the mapped S-NSSAI, including the rejected S-NSSAI IE, and including the first rejected NSSAI and/or the second rejected NSSAI.

In a case the UE_A 10 has received the rejected NSSAI, the UE_A 10 may delete, from the allowed NSSAI stored in the UE_A 10, the S-NSSAI included in the first rejected NSSAI and/or the second rejected NSSAI included in the received rejected NSSAI. The condition for not deleting the S-NSSAI from the allowed NSSAI stored in the UE_A 10 may be a case that the UE_A 10 is roaming, and/or a case that the UE_A 10 stores the mapped S-NSSAI for the S-NSSAI in the list (set) of pieces of mapped S-NSSAI of the allowed NSSAI and/or the mapped S-NSSAI is associated with multiple pieces of mapped S-NSSAI, and/or a case that none of the pieces of mapped S-NSSAI is included in the first rejected NSSAI and/or the second rejected NSSAI included in the extended rejected NSSAI IE received by the UE_A 10.

Note that the condition for deleting the S-NSSAI included in the first rejected NSSAI and/or the second rejected NSSAI included in the received rejected NSSAI from the first NSSAI stored in the UE_A 10 may be the same as the condition for deleting the S-NSSAI included in the first rejected NSSAI and/or the second rejected NSSAI included in the received rejected NSSAI from the allowed NSSAI stored in the UE_A 10.

In a case that the UE_A 10 has received the first rejected NSSAI or the second rejected NSSAI during roaming and one or multiple pieces of mapped S-NSSAI of the S-NSSAI included in the allowed NSSAI are not all included in the first rejected NSSAI and/or the second rejected NSSAI, and other mapped S-NSSAI or some mapped S-NSSAI is included in the first rejected NSSAI and/or the second rejected NSSAI in association with the S-NSSAI, the UE_A 10 may behave not to delete the above-described S-NSSAI from the allowed NSSAI.

In a case that the UE_A 10 has received a first indication and the first rejected NSSAI and/or the second rejected NSSAI during roaming, the UE_A 10 may behave not to delete the S-NSSAI of the current PLMN or SNPN that is included in the first rejected NSSAI and/or the second rejected NSSAI from the allowed NSSAI.

In a case that the UE_A 10 has received a second indication and the first rejected NSSAI and/or the second rejected NSSAI during roaming, the UE_A 10 may delete the S-NSSAI of the current PLMN or SNPN that is included in the first rejected NSSAI and/or the second rejected NSSAI from the allowed NSSAI.

Note that the second indication may be information "indicating that all pieces of the S-NSSAI of the current PLMN of the associated rejected S-NSSAI have been rejected" indicated by the 16th identification information.

In a case that the UE_A 10 includes and stores first information including the S-NSSAI and the mapped S-NS-SAI in each piece of NSSAI during roaming, the UE_A 10 may delete the combination of the S-NSSAI included in the received extended rejected NSSAI IE and the mapped S-NSSAI from the allowed NSSAI and the set of the mapped S-NSSAI of the allowed NSSAI.

In a case that the UE_A 10 has received the rejected NSSAI, the UE_A 10 may delete the S-NSSAI included in the received rejected NSSAI from the allowed NSSAI of the current PLMN or SNPN and/or the set of mapped S-NSSAI of the allowed NSSAI of the current PLMN or SNPN.

To be specific, in a case that the UE_A 10 has received the third rejected NSSAI, and further a case that the UE is roaming, the UE_A 10 may delete the S-NSSAI included in the third rejected NSSAI from the set of mapped S-NSSAI of the stored allowed NSSAI.

In a case that the UE_A 10 has received the third rejected NS SAI, and further a case that the UE is not roaming, the UE_A 10 may delete the S-NSSAI included in the stored allowed NSSAI and the third rejected NSSAI.

In a case that the UE_A 10 has received the first rejected NSSAI and/or the second rejected NSSAI included in the extended rejected NSSAI IE, and further a case that the UE is roaming, the UE_A 10 may delete the mapped S-NSSAI included in the first rejected NSSAI and/or the second rejected NSSAI included in the received extended rejected NSSAI IE from the set of the mapped S-NSSAI of the stored allowed NSSAI.

In a case that the UE_A 10 has received the rejected NSSAI, the UE_A 10 may delete the S-NSSAI included in the first rejected NSSAI and/or the second rejected NSSAI included in the received rejected NSSAI from the pending NSSAI stored in the UE_A 10 under the following condition. The condition for deleting the S-NSSAI from the pending NSSAI stored in the UE_A 10 may be: a case that the UE_A 10 is not roaming; a case that the mapped S-NSSAI of the S-NSSAI is included in the set of pieces of mapped S-NSSAI of the allowed NSSAI but is not stored in the UE_A 10; a case that the mapped S-NSSAI of the S-NSSAI is stored in at least one piece of UE_A 10 in the mapped S-NSSAI of the pending NSSAI stored in the UE_A 10 and further all pieces of the mapped S-NSSAI are included in the first rejected NSSAI and/or the second rejected NSSAI received by the UE; a case that the mapped S-NSSAI of the S-NSSAI is not included in the second rejected NSSAI and/or received by the UE_A 10; or a case that the S-NSSAI is not associated with multiple pieces of mapped S-NSSAI.

Note that the case that the mapped S-NSSAI of the S-NSSAI is not included in the first rejected NSSAI and/or the second rejected NSSAI received by the UE_A 10 may be a case that the UE_A 10 has received the first rejected NSSAI and/or the second rejected NSSAI included in the rejected NSSAI IE, or a case that the UE_A 10 has received the extended rejected NSSAI IE not including the mapped S-NSSAI, including the rejected S-NSSAI IE, and including the first rejected NSSAI and/or the second rejected NSSAI.

In a case of that the UE_A 10 has received the rejected NS SAI, the UE_A 10 may not delete, from the pending NSSAI stored in the UE_A 10, the S-NSSAI included in the first rejected NSSAI and/or the second rejected NSSAI included in the received rejected NSSAI. The condition for not deleting the S-NSSAI from the pending NSSAI stored in the UE_A 10 may be a case that the UE_A 10 is roaming, and/or a case that the UE_A 10 stores the mapped S-NSSAI of the S-NSSAI in the list (set) of pieces of mapped S-NSSAI of the pending NSSAI and/or the mapped S-NSSAI is associated with multiple pieces of mapped S-NSSAI, and/or a case that none of the pieces of mapped S-NSSAI is included in the first rejected NSSAI and/or the second rejected NSSAI included in the extended rejected NSSAI IE received by the UE_A 10.

In other words, in a case that the UE_A 10 has received the first rejected NSSAI or the second rejected NSSAI during roaming and one or multiple pieces of mapped S-NSSAI of the S-NSSAI included in the pending NSSAI are not all included in the first rejected NSSAI and/or the second rejected NSSAI, and other mapped S-NSSAI or some mapped S-NSSAI is included in the first rejected NSSAI and/or the second rejected NSSAI in association with the S-NSSAI, the UE_A 10 may behave not to delete the above-described S-NSSAI from the pending NSSAI.

In a case that the UE_A 10 has received the first indication and the first rejected NSSAI and/or the second rejected NSSAI during roaming, the UE_A 10 may behave not to delete the S-NSSAI of the current PLMN or SNPN that is included in the first rejected NSSAI and/or the second rejected NSSAI from the pending NSSAI.

In a case that the UE_A 10 has received the second indication and the first rejected NSSAI and/or the second rejected NSSAI during roaming, the UE_A 10 may behave not to delete the S-NSSAI of the current PLMN or SNPN that is included in the first rejected NSSAI and/or the second rejected NSSAI from the pending NSSAI.

In a case that the UE_A 10 includes and stores first information including the S-NSSAI and the mapped S-NS-SAI in each piece of NSSAI during roaming, the UE_A 10 may delete the combination of the S-NSSAI included in the received extended rejected NSSAI IE and the mapped S-NSSAI from the pending NSSAI and the set of the mapped S-NSSAI of the allowed NSSAI.

In a case that the UE_A 10 has received the rejected NSSAI, the UE_A 10 may delete the S-NSSAI included in the received rejected NSSAI from the allowed NSSAI of the current PLMN or SNPN and/or the set of mapped S-NSSAI of the allowed NSSAI of the current PLMN or SNPN.

To be specific, in a case that the UE_A 10 has received the third rejected NSSAI, and further a case that the UE is roaming, the UE_A 10 may delete the S-NSSAI included in the third rejected NSSAI from the set of mapped S-NSSAI of the stored allowed NSSAI.

In a case that the UE_A 10 has received the third rejected NS SAI, and further a case that the UE is not roaming, the UE_A 10 may delete the S-NSSAI included in the stored pending NSSAI and the third rejected NSSAI.

In a case that the UE_A 10 has received the first rejected NSSAI and/or the second rejected NSSAI included in the extended rejected NSSAI IE, and further a case that the UE is roaming, the UE_A 10 may delete the mapped S-NSSAI included in the first rejected NSSAI and/or the second rejected NSSAI included in the received extended rejected NSSAI IE from the set of the mapped S-NSSAI of the stored pending NSSAI.

Furthermore, in a case that the UE_A 10 has received the rejected NSSAI, the UE_A 10 may delete the S-NSSAI included in the received rejected NSSAI from the "first NSSAI associated with the current PLMN stored in the UE_A 10". Furthermore, in a case that the UE_A 10 has received the rejected NSSAI, the UE_A 10 may delete the mapped S-NSSAI or the S-NSSAI included in the received allowed NSSAI from the "first NSSAI associated with all PLMNs stored in the UE_A 10". Furthermore, in a case that the UE_A 10 has received the rejected NSSAI, the UE_A 10 may delete the S-NSSAI included in the received allowed NSSAI from the "first NSSAI associated with the EPLMN stored in the UE_A 10".

Furthermore, in a case that the back-off timer restricting use of certain S-NSSAI is running, the UE may stop the back-off timer in a case that the S-NSSAI or mapped S-NSSAI of the S-NSSAI is included in the first to third rejected NSSAI.

Furthermore, in a case that the UE_A 10 has received the pending NSSAI, the UE_A 10 may replace the pending NSSAI stored in the UE_A 10 with new pending NSSAI. To be specific, in a case that the UE_A 10 has received the pending NSSAI included in the registration accept message during the registration procedure for the current PLMN or SNPN, the UE_A 10 may replace the pending NSSAI associated with the current PLMN or SNPN stored in the UE_A 10 with the new pending NSSAI.

Alternatively, in a case that the S-NSSAI included in the pending NSSAI is the S-NSSAI of the HPLMN, the UE_A 10 may replace the pending NSSAI stored in the UE_A 10 with new pending NSSAI upon receiving the pending NSSAI included in the registration accept message during the registration procedure for the current PLMN or SNPN.

Furthermore, in a case that the UE_A 10 stores the mapped S-NSSAI of the pending NSSAI, the UE_A 10 may delete the mapped S-NSSAI of the pending NSSAI, store the mapped S-NSSAI of the new pending NSSAI, or perform both processes.

Note that the mapped S-NSSAI of the pending NSSAI may be stored based on the mapped S-NSSAI of the old allowed NSSAI.

Furthermore, the UE may stop the back-off timer in a case that the back-off timer that restricts use of certain S-NSSAI is running, a case that the S-NSSAI is included in new pending NSSAI, or a case that the S-NSSAI is mapped S-NSSAI of the pending NSSAI.

Furthermore, the UE_A 10 may perform the following operation for each piece of the 10th identification information based on the reception of at least one or multiple pieces of the 10th to the 16th identification information and/or the reception of a control message, The UE_A 10 may include and store the S-NSSAI indicated by the 10th identification information, and/or the S-NSSAI indicated by the 14th identification information, and/or the S-NSSAI related to the mapped S-NSSAI indicated by the 15th identification information in appropriate first NSSAI. Specifically, the UE may add the received S-NSSAI indicated by the 14th identification information to the first NSSAI associated with information indicated in the 11th identification information and/or the 13th identification information.

Alternatively, the UE_A 10 may add the mapped S-NSSAI indicated by received 15th identification information to the first NSSAI, or add the S-NSSAI related to the mapped S-NSSAI indicated by the received 15th identification information to the first NSSAI associated with the current PLMN, or to the first NSSAI associated with the current PLMN and the current access type (the registered access type, 3GP access or non-3GPP access), or to the first NSSAI associated with the current PLMN and all the access types.

In the roaming case, the UE may recognize whether the information indicated as 10th is the S-NSSAI of the HPLMN or the S-NSSAI of the current PLMN (VPLMN) based on information indicated in the 13th identification information. Specifically, in a case that the 13th identification information is valid for the current PLMN, the UE may determine that the S-NSSAI included in the 10th identification information is the S-NSSAI of the VPLMN. Alternatively, to be specific, in a case that the 13th identification information is valid for all current PLMNs, the UE may determine that the S-NSSAI included in the 10th identification information is the S-NSSAI of the HPLMN.

In the roaming case, the UE may determine the S-NSSAI to which the back-off timer is applied based on information indicated by the 13th identification information. Specifically, in a case that the 13th identification information is valid for the current PLMN, the UE may enable the back-off timer for the S-NSSAI of the current PLMN, and may restrict initiation of the MINI procedure using the S-NSSAI of the current PLMN for the current PLMN while the back-off timer is running.

Alternatively, to be specific, in a case that the 13th identification information is valid for all of the current PLMNs, the UE may enable the back-off timer for the S-NSSAI of the HPLMN, and may restrict initiation of the MINI procedure using the S-NSSAI of the HPLMN for all of the PLMNs while the back-off timer is running. Here, the MM procedure using the S-NSSAI of the HPLMN includes a case in which the S-NSSAI of the HPLMN is likely to include the S-NSSAI managed as the mapped S-NSSAI in requested NSSAI.

In other words, while the back-off timer valid for all PLMNs is running, the UE may transition to a state in which transmitting the corresponding S-NSSAI included in the requested NSSAI and transmitting the corresponding S-NSSAI as mapped S-NSSAI of the requested NSSAI are restricted in all of the PLMNs.

Furthermore, in a case that the S-NSSAI included in the first NSSAI stored in the UE is included in the allowed NSSAI stored in the UE and associated with the PLMN and access type requested by the UE in the present procedure and with other access types, the S-NSSAI may be deleted from the allowed NSSAI.

Furthermore, in a case the 15th identification information has been received, the UE_A 10 may store the S-NSSAI indicated by the 15th identification information as the mapped S-NSSAI of the S-NSSAI indicated by the 14th identification information.

In a case that the received 13th identification information is information indicating application to all of the PLMNs, the UE may delete the S-NSSAI associated with the mapped S-NSSAI indicated by the 15th identification information from the allowed NSSAI corresponding to the PLMNs other than the current PLMN.

The UE_A 10 may recognize that the S-NSSAI indicated in the 10th identification information has reached the maximum number of UE connected each slice based on the reception of the 10th identification information and/or the 11th identification information, and/or the reception of the control message, Here, the S-NSSAI indicated in the 10th identification information may be the S-NSSAI indicated in the 14th identification information and/or the mapped S-NSSAI indicated in the 15th identification information.

The UE_A 10 may use the received value of the back-off timer to start the counting of the back-off timer associated with the S-NSSAI or to start the back-off timer and manage the back-off timer based on the reception of at least one or multiple pieces of information of the 10th to the 16th identification information and/or the reception of the control message. Here, the value of the back-off timer may be the value of the timer indicated in the 10th identification information and/or the 12th identification information, and the S-NSSAI may be the S-NSSAI indicated by the first identification information, and/or the 10th identification information, and/or the 14th identification information, and/or may be the mapped S-NSSAI indicated by the 15th identification information.

While the back-off timer is running, the UE_A 10 may be in a state in which the UE is prohibited from transmitting the MM message and the SM message using S-NSSAI associated with the back-off timer, or mapped S-NSSAI associated with the back-off timer (S-NSSAI of the HPLMN), or S-NSSAI associated with the mapped S-NSSAI associated with the back-off timer, or S-NSSAI included in NSSAI associated with the back-off timer, or mapped S-NSSAI of the S-NSSAI included in the NSSAI associated with the back-off timer.

Furthermore, in a case that the 13th identification information has been received, the UE_A 10 may apply the back-off timer according to the valid range indicated by the 13th identification information.

Specifically, in a case that the 13th identification information is information indicating the application within the current PLMN, the UE_A 10 may apply the back-off timer within the current PLMN. Specifically, although the UE_A 10 need not stop the counting of the back-off timer or the back-off timer according to a change of the PLMN (PLMN change), the regulation by the back-off timer associated with the PLMN before movement may be released. In other words, although the UE maintains the back-off timer in a case that the PLMN is changed, the regulation on the PLMN before movement may be released.

Alternatively, the UE_A 10 may stop the counting of the back-off timer associated with the current PLMN or stop the back-off timer in response to a change of the PLMN. In other words, in a case that the PLMN is changed, the UE_A 10 may stop the back-off timer and the regulation on the PLMN before movement may be released.

Alternatively, in a case that the 13th identification information is information indicating the application to all the PLMNs, the UE_A 10 may apply the back-off timer to all the PLMNs. In other words, even in a case that the PLMN is changed, the UE_A 10 may maintain the back-off timer instead of stopping the back-off timer. In a case that the PLMN is changed while the back-off timer is running, the UE_A 10 may maintain the state in which the MM message and the SM message are prohibited, the MM message and the SM message using the S-NSSAI of the moving destination PLMN associated with the mapped S-NSSAI of the S-NSSAI with which the back-off timer is associated, or the S-NSSAI of the moving destination PLMN associated with the mapped S-NSSAI, or the mapped S-NSSAI.

Alternatively, in a case that the 13th identification information is information indicating the application to a current registration area, the UE_A 10 may apply the back-off timer to the current registration area. In other words, in response to the UE_A 10 moving out of the registration area, the UE_A 10 may stop the counting of the back-off timer or stop the back-off timer.

Furthermore, the UE_A 10 may manage, and/or store the first NSSAI associated with the 11th identification information and/or the 13th identification information or one or multiple pieces of S-NSSAI included in the first NSSAI.

Here, in response to the stop or expiry of the back-off timer, the limitation may be released and the UE_A 10 may transition to a state in which the UE_A 10 can transmit the MM message and the SM message using the S-NSSAI with which the back-off timer is associated, and/or the S-NSSAI related to the mapped S-NSSAI with which the back-off timer is associated, and/or the mapped S-NSSAI with which the back-off timer is associated. In other words, in response to the stop or expiry of the back-off timer, the UE_A 10 may transition to the state in which the UE_A 10 can transmit the MINI message using, for requested NSSAI, the S-NSSAI with which the back-off timer is associated, and/or the S-NSSAI related to the mapped S-NSSAI with which the back-off timer is associated, and/or the mapped S-NSSAI with which the back-off timer is associated.

Furthermore, in response to the stop or expiry of the back-off timer, the UE_A 10 may transition to a state in which the UE_A 10 can transmit the MINI message using the NSSAI associated with the back-off timer. In other words, in response to the stop or expiry of the back-off timer, the UE_A 10 may transition to the state in which the UE_A 10 can transmit the MM message using, for the requested NSSAI, the NSSAI associated with the back-off timer.

Furthermore, in response to the stop or expiry of the back-off timer, the UE_A 10 may delete, from the first NSSAI, the S-NSSAI with which the back-off timer is associated, the mapped S-NSSAI with which the back-off timer is associated, or the S-NSSAI associated with the mapped S-NSSAI with which the back-off timer is associated.

Specifically, in a case that the back-off timer is valid for a registered PLMN, the UE_A 10 may delete, from the first NSSAI associated with the current PLMN, the S-NSSAI with which the back-off timer is associated, the mapped S-NSSAI with which the back-off timer is associated, or the S-NSSAI associated with the mapped S-NSSAI with which the back-off timer is associated in response to the stop or expiry of the back-off timer.

Specifically, in a case that the back-off timer is valid for a registered PLMN, the UE_A 10 may delete, from the first NSSAI applied to all PLMNs, the S-NSSAI with which the back-off timer is associated, the mapped S-NSSAI with which the back-off timer is associated, or the S-NSSAI related to the mapped S-NSSAI with which the back-off timer is associated in response to the stop or expiry of the back-off timer.

Specifically, in a case that the back-off timer is valid for all PLMNs, the UE_A 10 may delete, from the first NSSAI applied to all of the PLMNs, the S-NSSAI related to the back-off timer, the mapped S-NSSAI with which the back-off timer is associated, or the S-NSSAI related to the mapped S-NSSAI with which the back-off timer is associated in response to the stop or expiry of the back-off timer.

Furthermore, in a case that the back-off timer is valid for all PLMNs, the UE_A 10 may delete, from the first NSSAI applied to each of all of the PLMNs, the S-NSSAI related to the back-off timer, the mapped S-NSSAI with which the back-off timer is associated, or the S-NSSAI related to the mapped S-NSSAI with which the back-off timer is associated in response to the stop or expiry of the back-off timer.

That is, in a case that the S-NSSAI with which the back-off timer is associated, the mapped S-NSSAI with which the back-off timer is associated, or the S-NSSAI related to the mapped S-NSSAI with which the back-off timer is associated is included in multiple pieces of the first NSSAI and stored in the UE_A 10, the UE_A 10 may delete the corresponding S-NSSAI from all pieces of the corresponding first NS SAI.

Specifically, for example, in a case that a back-off timer #1 associated with the S-NSSAI #1 is managed as being valid for all of the PLMNs, the UE may delete the S-NSSAI #1 from the first NSSAI #1 associated with PLMN #1 and delete S-NSSAI #2 associated with the mapped S-NSSAI of the S-NSSAI #1 from the first NSSAI #2 associated with PLMN #2 in response to stop or expiry of the back-off timer #1.

In addition, in a case that the UE_A 10 has received the TAI list, the received TAI list may be validated, and in a case that the UE_A 10 has already stored the valid TAI list, the old TAI list may be deleted or invalidated. Hereinafter, the valid TAI list may be referred to as a registration area. Note that, in a case that the UE_A 10 stores no valid TAI list and has received no TAI list from the core network during the present procedure, no valid TAI list may not be stored.

In a case that the UE_A 10 deletes the S-NSSAI from the first NSSAI while the back-off timer for which the S-NSSAI is valid is running, the UE_A 10 may stop its back-off timer.

Similarly, in the UE_A 10, in a case that the back-off timer is valid or the first NSSAI is deleted while the back-off timer is running, the UE_A 10 may stop the back-off timer.

Alternatively, the UE_A 10 with the running back-off timer may stop and/or delete the back-off timer regardless of update or deletion of the first NSSAI. Specific examples of the conditions for deleting the first NSSAI and/or stopping the back-off timer are described below.

In a case that the UE_A 10 transitions to the deregistered state in one access type for the current PLMN or SNPN and is also in the deregistered state for the other access type, the UE_A 10 may delete the first NSSAI and/or the S-NSSAI included in the first NSSAI that is information regardless of the access type.

In a case that the UE_A 10 transitions to the deregistered state in one access type for the current PLMN or SNPN and is also in the deregistered state for the other access type, the UE_A 10 may stop and delete back-off timer for which the first NSSAI and/or the S-NSSAI included in the first NSSAI regardless of the access type are valid.

In a case that the UE_A 10 has received the allowed NSSAI including the S-NSSAI included in the first NSSAI with which the current PLMN or SNPN is associated from the current PLMN or SNPN, the UE_A 10 may delete the S-NSSAI from the first NSSAI regardless of the access type.

In a case that the UE_A 10 has received the allowed NSSAI including the S-NSSAI included in the first NSSAI with which the current PLMN or SNPN is associated from the current PLMN or SNPN, the UE_A 10 may stop or delete the back-off timer for which the S-NSSAI included in the first NSSAI is valid regardless of the access type.

In a case that the UE_A 10 has received the rejected NSSAI including the S-NSSAI included in the first NSSAI with which the current PLMN or SNPN is associated from the current PLMN or SNPN, the UE_A 10 may delete the S-NSSAI from the first NSSAI regardless of the access type.

In a case that the UE_A 10 has received the rejected NSSAI including the S-NSSAI included in the first NSSAI with which the current PLMN or SNPN is associated from the current PLMN or SNPN, the UE_A 10 may stop or delete the back-off timer for which the S-NSSAI included in the first NSSAI is valid regardless of the access type.

In a case that the UE_A 10 has received the pending NSSAI for NSSAA or the mapped S-NSSAI(s) of the pending NSSAI including the S-NSSAI included in the first NSSAI with which the current PLMN or SNPN is associated from the current PLMN or SNPN, the UE_A 10 may delete the S-NSSAI from the first NSSAI regardless of the access type.

In a case that the UE_A 10 has received the pending NSSAI for NSSAA or the mapped S-NSSAI(s) of the pending NSSAI including the S-NSSAI included in the first NSSAI with which the current PLMN or SNPN is associated from the current PLMN or SNPN, the UE_A 10 may stop or delete the back-off timer for which the S-NSSAI included in the first NSSAI is valid.

In a case that the UE_A 10 has transitioned to the deregistered state in an access type for the current PLMN or SNPN, the UE_A 10 may delete the first NSSAI associated with the access type and/or the S-NSSAI included in the first NSSAI.

In a case that the UE_A 10 has transitioned to the deregistered state in an access type for the current PLMN or SNPN, the UE_A 10 may stop or delete the back-off timer for which the first NSSAI associated with the access type and/or the S-NSSAI included in the first NSSAI are valid.

In a case that the UE_A 10 has received the allowed NSSAI including the S-NSSAI included in the first NSSAI from the current PLMN or SNPN through access indicated by an access type, the UE_A 10 may delete the S-NSSAI from the first NSSAI. At this time, the first NSSAI and/or the S-NSSAI included in the first NSSAI may be associated with the current PLMN or SNPN and its access type.

In a case that the UE_A 10 has received the allowed NSSAI including the S-NSSAI included in the first NSSAI from the current PLMN or SNPN through access indicated by an access type, the UE_A 10 may stop or delete the back-off timer for which the S-NSSAI included in the first NSSAI is valid. At this time, the first NSSAI and/or the S-NSSAI included in the first NSSAI may be associated with the current PLMN or SNPN and its access type.

In a case that the UE_A 10 has detected a change in the AMF, the UE_A 10 may delete the first NSSAI. Additionally or alternatively, the UE_A 10 may stop or delete the back-off timer for which first NSSAI is valid.

As described above, the UE stores and manages information on each piece of NSSAI. Furthermore, the UE may start and stop a back-off timer valid for a PLMN or SNPN or all PLMNs for each piece of NSSAI or S-NSSAI.

4. Embodiments According to Aspect of Present Invention

Embodiments according to an aspect of the present invention may be a combination of one or multiple procedures described in section 3. For example, in the present embodiment, the UE may transition to the registered state based on the completion of the initial registration procedure described in section 3.1, and further perform the registration procedure for movement and periodic registration update in section 3.1.

In addition, in the case of the transition to the registered state based on completion of the initial registration procedure described in section 3.1, each procedure described in sections 3.2 to 3.4 may be performed. Note that, during each procedure, the UE_A 10 may perform the NSSAI update procedure described in section 3.5 based on the information received from the NW and/or the state of the UE, and may update and/or delete the stored information related to NSSAI.

Specific examples of the embodiments according to an aspect of the present invention will be described below.

4.1. First Embodiment

A first embodiment (the present embodiment below) will be described below. In the present embodiment, an embodiment in which the UE_A 10 updates stored first rejected NSSAI and/or second rejected NSSAI based on reception of a control message including allowed NSSAI will be described.

First, the UE_A 10 initiates a registration procedure by transmitting a registration request message to the current PLMN or SNPN (NW) at the time of roaming.

To be specific, the UE_A 10 transmits a first registration request message including requested NSSAI including an S-NSSAI IE #1 consisting of S-NSSAI #1 and mapped S-NSSAI #a, an S-NSSAI IE #2 consisting of S-NSSAI #1 and mapped S-NSSAI #b, an S-NSSAI IE #3 consisting of S-NSSAI #1 and mapped S-NSSAI #c, an S-NSSAI IE #4 consisting of S-NSSAI #1 and mapped S-NSSAI #d, and an S-NSSAI IE #5 consisting of S-NSSAI #1 and mapped S-NSSAI #e based on allowed NSSAI and a set of mapped S-NSSAI of the allowed NSSAI and/or configured NSSAI and a set of mapped S-NSSAI of the configured NSSAI associated with the current PLMN or SNPN stored in the UE_A 10.

Furthermore, the UE_A 10 receives a registration accept message from the NW. Specifically, the UE receives an extended rejected NSSAI IE including an allowed NSSAI IE including the S-NSSAI IE #1 consisting of the S-NSSAI #1 and the mapped S-NSSAI #a, a rejected S-NSSAI IE #1 consisting of the S-NSSAI #1, the mapped S-NSSAI #b, and the reject cause value indicating the "S-NSSAI not available in the current PLMN or SNPN", a rejected S-NSSAI IE #2 consisting of the S-NSSAI #1, the mapped S-NSSAI #c, and the reject cause value indicating the "S-NSSAI not available in the current PLMN or SNPN", a rejected S-NSSAI IE #3 consisting of the S-NSSAI #1, the mapped S-NSSAI #d, and the reject cause value indicating "S-NSSAI not available in the current registration area", and a rejected S-NSSAI IE #4 consisting of the S-NSSAI #1, the mapped S-NSSAI #e, and the reject cause value indicating "S-NSSAI not available in the current registration area".

The UE_A 10 updates the stored information of the NSSAI based on the reception of the allowed NSSAI and the rejected NSSAI. For example, the UE_A 10 replaces and updates the allowed NSSAI and the set of the mapped S-NSSAI of the allowed NSSAI with the received information. Furthermore, the UE_A 10 adds and updates the received rejected NSSAI and the set of the mapped S-NSSAI of the rejected NSSAI.

In detail, the UE_A 10 may include and store the S-NSSAI #1 in the allowed NSSAI, the mapped S-NSSAI #a in the set of the mapped S-NSSAI of the allowed NSSAI, the S-NSSAI #1 in the first rejected NSSAI, the mapped S-NSSAI #b and the mapped S-NSSAI #c in the set of the mapped S-NSSAI of the first rejected NSSAI, the S-NSSAI #1 in the second rejected NSSAI, and the mapped S-NSSAI #d and the mapped S-NSSAI #e in the set of the mapped S-NSSAI of the second rejected NSSAI.

Furthermore, the UE receives a configuration update command message from the NW. The UE_A 10 updates the stored information based on the allowed NSSAI included in the configuration update command message.

For example, in a case that the UE_A 10 has received an allowed NSSAI IE including the S-NSSAI IE #1 consisting of the S-NSSAI #1 and the mapped S-NSSAI #a, the S-NSSAI IE #2 consisting of the S-NSSAI #1 and the mapped S-NSSAI #b, and the S-NSSAI IE #3 consisting of the S-NSSAI #1 and the mapped S-NSSAI #c, the UE_A 10 stores the S-NSSAI #1 in the allowed NSSAI, stores the mapped S-NSSAI #a, #b and #c in the mapped S-NSSAI of the allowed NSSAI, deletes the S-NSSAI #1 from the first rejected NSSAI, and deletes the mapped S-NSSAI #b and #c from the mapped S-NSSAI of the first rejected NSSAI.

For example, in a case that the UE_A 10 has received an allowed NSSAI IE including the S-NSSAI IE #1 consisting of the S-NSSAI #1 and the mapped S-NSSAI #a and the S-NSSAI IE #2 consisting of the S-NSSAI #1 and the mapped S-NSSAI #b, the UE_A 10 stores the S-NSSAI #1 in the allowed NSSAI, stores the mapped S-NSSAI #a and #b and the mapped S-NSSAI of the allowed NSSAI, does not delete the S-NSSAI #1 from the first rejected NSSAI, and deletes the mapped S-NSSAI #b from the mapped S-NSSAI of the first rejected NSSAI.

For example, in a case that the UE_A 10 has received an allowed NSSAI IE including the S-NSSAI IE #1 consisting of the S-NSSAI #1 and the mapped S-NSSAI #a, the S-NSSAI IE #2 consisting of the S-NSSAI #1 and the mapped S-NSSAI #d, and the S-NSSAI IE #3 consisting of the S-NSSAI #1 and the mapped S-NSSAI #e, the UE_A 10 stores the S-NSSAI #1 in the allowed NSSAI, stores the mapped S-NSSAI #a, #d and #e in the mapped S-NSSAI of the allowed NSSAI, deletes the S-NSSAI #1 from the second rejected NSSAI, and deletes the mapped S-NSSAI #d and #e from the mapped S-NSSAI of the first rejected NSSAI.

For example, in a case that the UE_A 10 has received an allowed NSSAI IE including the S-NSSAI IE #1 consisting of the S-NSSAI #1 and the mapped S-NSSAI #a and the S-NSSAI IE #2 consisting of the S-NSSAI #1 and the mapped S-NSSAI #d, the UE_A 10 stores the S-NSSAI #1 in the allowed NSSAI, stores the mapped S-NSSAI #a and #d in the mapped S-NSSAI of the allowed NSSAI, does not delete the S-NSSAI #1 from the second rejected NSSAI, and deletes the mapped S-NSSAI #d from the mapped S-NSSAI of the first rejected NSSAI.

As described above, the UE_A 10 can update the stored information of the stored one or multiple pieces of NSSAI based on the received NSSAI.

Note that the above-described first rejected NSSAI or second rejected NSSAI may be replaced with the first NSSAI.

4.2. Second Embodiment

A first embodiment (the present embodiment below) will be described below. In the present embodiment, a mode in which the UE_A 10 performs generation and registration procedure of requested NSSAI based on stored configured NSSAI and the list of pieces of the mapped S-NSSAI of the configured NSSAI, and the first rejected NSSAI and the list of pieces of mapped S-NSSAI of the first rejected NSSAI, and/or the second rejected NSSAI and the list of the mapped S-NSSAI of the second rejected NSSAI will be described.

First, the UE_A 10 initiates a registration procedure by transmitting a registration request message to the current PLMN or SNPN (NW) at the time of roaming.

To be specific, for example, as an initial state, the UE_A 10 stores S-NSSAI #1 as configured NSSAI associated with the current PLMN or SNPN stored in the UE_A 10 and mapped S-NSSAI #a, mapped S-NSSAI #b, and mapped S-NSSAI #c as the S-NSSAI further mapped to the S-NSSAI #1 as a set of the mapped S-NSSAI of the configured NSSAI.

Furthermore, in a case that the UE_A 10 stores the S-NSSAI #1 as the first rejected NSSAI associated with the current PLMN or SNPN stored in the UE_A 10 and the mapped S-NSSAI #b as the set of mapped S-NSSAI of the first rejected NSSAI further as the S-NSSAI mapped to the S-NSSAI #1, the UE performs control such that the S-NSSAI IE #2 consisting of the S-NSSAI #1 and the mapped S-NSSAI #b is not transmitted in the requested NSSAI.

In other words, the UE may perform control such that the S-NSSAI to which the mapped S-NSSAI (mapped S-NSSAI #a and mapped S-NSSAI #c) is mapped is included and transmitted in the requested NSSAI even if the S-NSSAI is the S-NSSAI included in the first rejected NSSAI based on the fact that there is mapped S-NSSAI included in the mappped S-NSSAI of the configured NSSAI that is not included in the list of mapped S-NSSAI of the first rejected NSSAI.

Furthermore, in a case that the UE_A 10 stores the S-NSSAI #1 as the second rejected NSSAI associated with the current PLMN or SNPN stored in the UE_A 10 and the mapped S-NSSAI #c as the set of mapped S-NSSAI of the second rejected NSSAI further as the S-NSSAI mapped to the S-NSSAI #1, the UE performs control such that the S-NSSAI IE #3 consisting of the S-NSSAI #1 and the mapped S-NSSAI #c is not transmitted in the requested NSSAI.

In other words, the UE may perform control such that the S-NSSAI to which the mapped S-NSSAI (mapped S-NSSAI #a) is mapped is included and transmitted in the requested NSSAI even if the S-NSSAI is the S-NSSAI included in the first rejected NSSAI and/or the second rejected NSSAI based on the fact that there is mapped S-NSSAI included in the mappped S-NSSAI of the configured NSSAI that is included in neither the list of the mapped S-NSSAI of the second rejected NSSAI nor the list of the mapped S-NSSAI of the first rejected NSSAI.

That is, in the above cases, the UE may transmit the registration request message by including the S-NSSAI IE #1 consisting of the S-NSSAI #1 and the mapped S-NSSAI #a in the requested NSSAI.

As described above, the UE_A 10 may generate the requested NSSAI based on the stored NSSAI.

Note that the above-described first rejected NSSAI or second rejected NSSAI may be replaced with the first NSSAI or pending NSSAI.

In other words, the UE_A 10 may generate the requested NSSAI based on the stored configured NSSAI and the list of the mapped S-NSSAI of the configured NSSAI, and the first rejected NSSAI and the list of the mapped S-NSSAI of the first rejected NSSAI, and/or the second rejected NSSAI and the list of the mapped S-NSSAI of the second rejected NSSAI, and/or the third rejected NSSAI, and/or the pending NSSAI and the list of the mapped S-NSSAI of the pending NSSAI, and/or the first NSSAI and the list of the mapped S-NSSAI of the first NSSAI.

5. Modifications

A program running on an apparatus according to the present invention may serve as a program that controls a central processing unit (CPU) and the like to cause a computer to function in such a manner as to realize the functions of the aforementioned embodiments according to the present invention. Programs or information handled by the programs are temporarily stored in a volatile memory such as a random access memory (RAM), a non-volatile memory such as a flash memory, a hard disk drive (HDD), or another storage apparatus system.

Note that a program for realizing the functions of the embodiments according to the present invention may be recorded on a computer-readable recording medium. The functions may be realized by causing a computer system to read the program recorded on the recording medium for execution. It is assumed that the "computer system" mentioned here refers to a computer system built into an apparatus, and the computer system includes an operating system and hardware such as a peripheral device. In addition, the "computer-readable recording medium" may be a semiconductor recording medium, an optical recording medium, a magnetic recording medium, a medium dynamically retaining the program for a short time, or any other computer-readable recording medium.

In addition, each functional block or various features of the apparatuses used in the aforementioned embodiments may be implemented or performed on an electric circuit, for example, an integrated circuit or multiple integrated circuits. An electric circuit designed to perform the functions described in the present specification may include a general-purpose processor, a digital signal processor (DSP), an application-specific integrated circuit (ASIC), a field programmable gate array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The aforementioned electric circuit may include a digital circuit or may include an analog circuit. In addition, in a case that a circuit integration technology that replaces the present integrated circuits appears with advances in semiconductor technologies, one or multiple aspects of the present invention can also use a new integrated circuit based on the technology.

Note that the invention of the present application is not limited to the above-described embodiments. Although apparatuses have been described as an example in the embodiments, the invention of the present application is not limited to these apparatuses, and is applicable to a terminal apparatus or a communication apparatus of a fixed-type or a non-stationary electronic apparatus installed indoors or outdoors, for example, an AV apparatus, a kitchen apparatus, a cleaning or washing machine, an air-conditioning apparatus, office equipment, a vending machine, and other household apparatuses.

Although, the embodiments of the present invention have been described in detail above referring to the drawings, the specific configuration is not limited to the embodiments and includes, for example, design changes within the scope that does not depart from the gist of the present invention. Furthermore, in the present invention, various modifications are possible within the scope of claims, and embodiments that are made by suitably combining technical means disclosed according to the different embodiments are also included in the technical scope of the present invention. In addition, a configuration in which elements described in the respective embodiments and having mutually the similar effects are substituted for one another is also included.

The invention claimed is:

1. A User Equipment (UE) comprising:

a transmission and reception circuitry;

at least one processor; and a storage coupled to the at least one processor and storing one or more computer-executable instructions that, when executed by the at least one processor, cause the transmission and reception circuitry to receive Allowed Network Slice Selection Assistance Information (NSSAI) and one or more first mapped Single Network Slice Selection Assistance Information (S-NSSAI) for the Allowed NSSAI, wherein:

the one or more computer-executable instructions, when executed by the at least one processor, further cause the UE to remove an S-NSSAI included in the Allowed NSSAI from rejected NSSAI stored in the storage, unless the storage stores the S-NSSAI associated with one or more second mapped S-NSSAI in the rejected NSSAI and the one or more second mapped S-NSSAI is not included in the one or more first mapped S-NS-SAI for the Allowed NSSAI, the one or more computer-executable instructions, when executed by the at least one processor, further cause the UE to remove one or more S-NSSAI included in the one or more first mapped S-NSSAI for the Allowed NSSAI from the one or more second mapped S-NSSAI for the rejected NSSAI stored in the storage, and the one or more computer-executable instructions, when executed by the at least one processor, further cause the transmission and reception circuitry to transmit a requested NSSAI including an S-NSSAI that is included in the Allowed NSSAI.

2. A User Equipment (UE) comprising:

a transmission and reception circuitry;

at least one processor; and a storage coupled to the at least one processor and storing one or more computer-executable instructions that, when executed by the at least one processor, cause the transmission and reception circuitry to receive Allowed Network Slice Selection Assistance Information (NSSAI) and one or more first mapped Single Network Slice Selection Assistance Information (S-NSSAI) for the Allowed NSSAI, wherein the one or more computer-executable instructions, when executed by the at least one processor, further cause the UE to remove an S-NSSAI included in the Allowed NSSAI from rejected NSSAI stored in the storage, unless the S-NSSAI included in the rejected NSSAI stored in the storage is associated with one or more second mapped S-NSSAI in the rejected NSSAI and the one or more second mapped S-NSSAI is not included in the one or more first mapped S-NS-SAI for the Allowed NSSAI, the one or more computer-executable instructions, when executed by the at least one processor, further cause the UE to remove one or more S-NSSAI included in the one or more first mapped S-NSSAI for the Allowed NSSAI from the one or more second mapped S-NSSAI for the rejected NSSAI stored in the storage, and the one or more computer-executable instructions, when executed by the at least one processor, further cause the transmission and reception circuitry to transmit a requested NSSAI including an S-NSSAI that is included in the Allowed NSSAI.

3. The UE according to claim 1, wherein in a case that the storage stores the S-NSSAI associated with the one or more second mapped S-NS-SAI in the rejected NSSAI, and in a case that the one or more second mapped S-NSSAI is not included in the one or more first mapped S-NSSAI for the Allowed NSSAI, the one or more computer-executable instructions, when executed by the at least one processor, cause the UE to not remove the S-NSSAI included in the Allowed NSSAI from the rejected NSSAI stored in the storage.

4. The UE according to claim 2, wherein in a case that the S-NSSAI included in the rejected NSSAI stored in the storage is associated with the one or more second mapped S-NSSAI in the rejected NSSAI, and in a case that the one or more second mapped S-NSSAI is not included in the one or more first mapped S-NSSAI for the Allowed NSSAI, the one or more computer-executable instructions, when executed by the at least one processor, cause the UE to not remove the S-NSSAI included in the Allowed NSSAI from the rejected NSSAI stored in the storage.

5. A communication control method performed by a User Equipment (UE), the communication control method comprising:

receiving Allowed Network Slice Selection Assistance Information (NSSAI) and one or more first mapped Single Network Slice Selection Assistance Information (S-NSSAI) for the Allowed NSSAI;

removing an S-NSSAI included in the Allowed NSSAI from rejected NSSAI stored in the UE, unless the S-NSSAI included in the rejected NSSAI stored in the UE is associated with one or more second mapped S-NSSAI in the rejected NSSAI and the one or more second mapped S-NSSAI is not included in the one or more first mapped S-NSSAI for the Allowed NSSAI;

removing one or more S-NSSAI included in the one or more first mapped S-NSSAI for the Allowed NSSAI from the one or more second mapped S-NSSAI for the rejected NSSAI stored in the UE; and transmitting a requested NSSAI including an S-NSSAI that is included in the Allowed NSSAI.

* * * * *